(12) United States Patent  (10) Patent No.: US 12,527,944 B2
Wang et al.  (45) Date of Patent: Jan. 20, 2026

(54) HEMOSTASIS VALVE, CATHETER SHEATH, AND METHOD FOR SEALING INTERVENTIONAL INSTRUMENT

(71) Applicant: VENUS MEDTECH (HANGZHOU) CO., LTD, Zhejiang (CN)

(72) Inventors: Xiang Wang, Hangzhou (CN); Yintao Zhao, Hangzhou (CN); Rongjun Lei, Hangzhou (CN); Feng Guo, Hangzhou (CN); Hou-Sen Lim, Hangzhou (CN)

(73) Assignee: Venus Medtech (Hangzhou) Co. Ltd., Hangzhou (CN)

( * ) Notice: Subject to any disclaimer, the term of this patent is extended or adjusted under 35 U.S.C. 154(b) by 829 days.

(21) Appl. No.: 17/854,867

(22) Filed: Jun. 30, 2022

(65) Prior Publication Data

US 2022/0339419 A1  Oct. 27, 2022

Related U.S. Application Data

(63) Continuation of application No. PCT/CN2020/141817, filed on Dec. 30, 2020.

(30) Foreign Application Priority Data

Dec. 31, 2019 (CN) .......................... 201911415412.0
Jul. 6, 2020 (CN) .......................... 202010639520.2

(51) Int. Cl.
*A61M 39/06* (2006.01)
*A61M 25/06* (2006.01)

(52) U.S. Cl.
CPC .... *A61M 39/0613* (2013.01); *A61M 25/0662* (2013.01); *A61M 2039/062* (2013.01)

(58) Field of Classification Search
CPC ...... A61M 39/0613; A61M 2039/0673; A61M 39/228; A61M 39/227; F16K 7/07
See application file for complete search history.

(56) References Cited

U.S. PATENT DOCUMENTS 2,590,215 A * 3/1952 Sausa ........................ F16K 7/07
 251/5
5,300,047 A  4/1994 Beurrier
(Continued)

FOREIGN PATENT DOCUMENTS

CN 103615565 A 3/2014
CN 105498071 A 4/2016
(Continued)

OTHER PUBLICATIONS

Office Action dated Jan. 5, 2024 for corresponding European Application No. 20 90 9350.
(Continued)

*Primary Examiner* — William R Carpenter
(74) *Attorney, Agent, or Firm* — Raymond Sun

(57) ABSTRACT

A hemostasis valve, a catheter sheath, and a method for sealing an interventional instrument (9), the hemostasis valve comprising a housing (1,100) and a sealing film (2,130) which is installed within the housing (1,100) and which is a tubular structure; an inner cavity (21) of the tubular structure serves as an instrument channel (11,131) and penetrates the housing (1,100); driving chambers (12, 150) which are located on the periphery of the sealing film (2,130) and which are used for being filled with a fluid are provided within the housing (1,100); the hemostasis valve further comprises an energy storage mechanism (3) that can link with the fluid; the energy storage mechanism (3) correspondingly stores or releases energy when the state of the sealing film (2,130) changes; and the sealing film (2,130) is driven to seal the instrument channel (11,131) during energy release. By means of the design of the energy storage mechanism (3), deformation energy of the sealing film (2,130) is stored, thereby achieving good compatibility and a good sealing effect when different instruments pass through; in addition, by means of the configuration of
(Continued)

parameters of the sealing film (2,130), the configuration of parameters of an energy storage structure, and the cooperation between the two, the advantages of good drawing operation feeling and small operating force changes of an instrument are achieved, and a structural basis is provided for other functions.

12 Claims, 20 Drawing Sheets

(56) References Cited

U.S. PATENT DOCUMENTS

| | | | | |
|---|---|---|---|---|
| 5,634,911 | A * | 6/1997 | Hermann | A61B 17/3423 604/246 |
| 2004/0172008 | A1 * | 9/2004 | Layer | A61M 39/0613 604/533 |
| 2008/0004569 | A1 * | 1/2008 | McCrystle | A61M 25/0017 604/104 |
| 2008/0109028 | A1 | 5/2008 | Styrc | |
| 2011/0282301 | A1 | 11/2011 | Nielsen | |
| 2013/0253565 | A1 * | 9/2013 | Myers | A61M 39/0613 606/194 |
| 2018/0126144 | A1 | 5/2018 | Furnish et al. | |
| 2018/0177896 | A1 | 6/2018 | Farhadi | |

FOREIGN PATENT DOCUMENTS

| | | | |
|---|---|---|---|
| CN | 107252374 A | 10/2017 | |
| CN | 109675176 A | 4/2019 | |
| CN | 110037759 A | 7/2019 | |
| FR | 1252650 A * | 2/1961 | F16K 7/07 |

OTHER PUBLICATIONS

International Search Report dated Mar. 29, 2021 for corresponding PCT Application No. PCT/CN2020/141817.

* cited by examiner

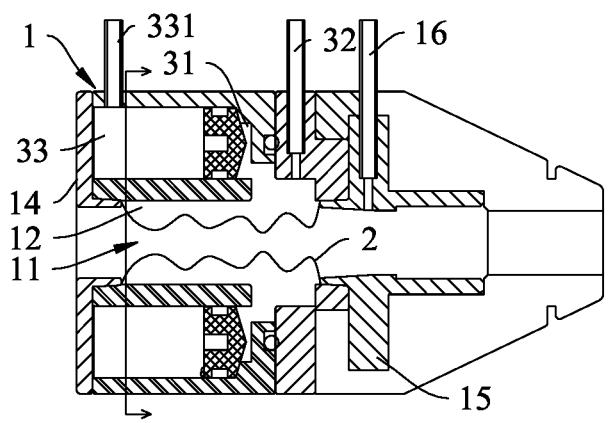
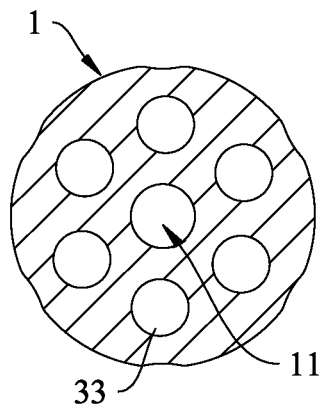
FIG. 27a
FIG. 27b
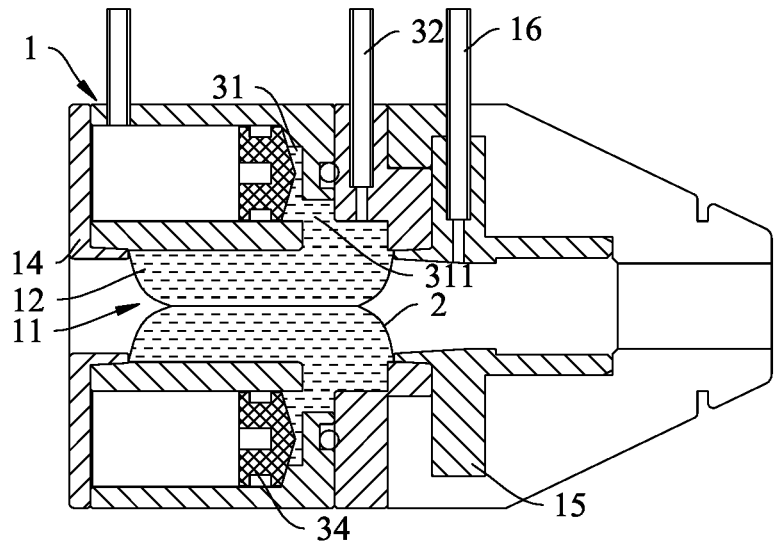
FIG. 27c
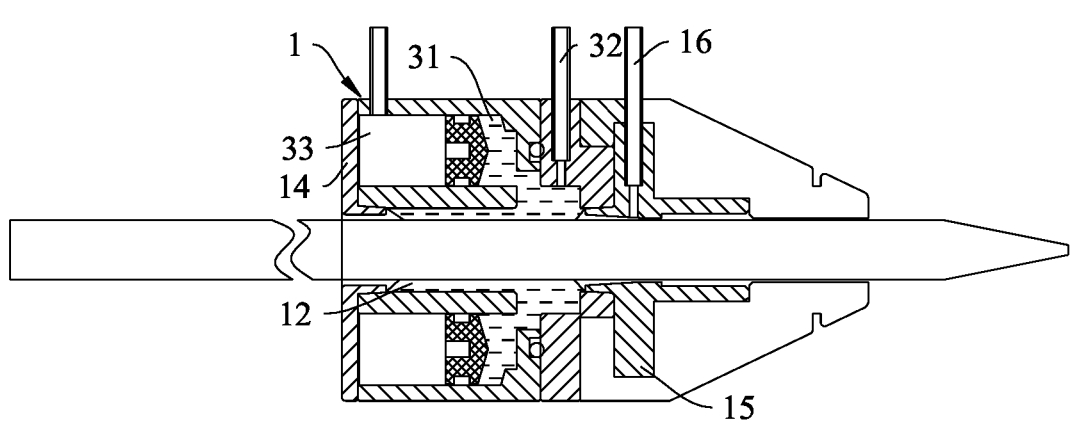
FIG. 27d

HEMOSTASIS VALVE, CATHETER SHEATH, AND METHOD FOR SEALING INTERVENTIONAL INSTRUMENT

TECHNICAL FIELD

The present application relates to the field of medical devices, in particular to hemostasis valves, catheter sheaths, and methods for sealing interventional instrument.

BACKGROUND

Interventional therapy is an advanced treatment technology developed in recent years between medication and surgery. In an interventional therapy, medical image equipment such as X-ray fluoroscopy, CT positioning, B-type ultrasonic instrument and the like are usually used for guidance. A catheter device loaded with an interventional instrument (such as a blood vessel stent, an artificial heart valve) or a drug is delivered to a diseased area in the human body through a vein or artery of a human body for the purpose of diagnosis and treatment of the disease.

The catheter sheath provides a passage for the catheter device to enter the human body, while also providing an outflow exit for blood or other body fluid. In order to prevent blood loss, a hemostasis valve is usually provided as a sealing device within the catheter sheath. In the prior art, a contradiction arises between the sealing function of the hemostasis valve and the passage convenience of the interventional instrument. In order to prevent the outflow of blood, it is often necessary to improve the sealing performance, but the passage performance of the interventional instrument through the hemostasis valve would be affected.

Technical improvements to hemostasis valves are further disclosed in the related arts. In a related art, for example, a hemostasis valve includes a housing and a tubular sealing membrane located in the housing, an annular closed chamber is formed between the outer periphery of the tubular sealing membrane and the housing. The volume of the closed chamber is adjusted by injecting a filler into the closed chamber so as to open and close the hemostasis valve. The inventors have found that after the sealing membrane is closed, a large friction occurs between the sealing membrane and the interventional instrument. In order to conveniently operate the position of the interventional instrument relative to the hemostasis valve, it is necessary to frequently adjust the pressure of the closed chamber to adjust the close state of the sealing membrane, resulting in complex operations, difficulty precision control, and affected treatment procedure.

SUMMARY

In order to solve the above technical problems, the present application discloses a hemostasis valve including a housing and a sealing membrane in a tubular structure and disposed in the housing. The lumen of the tubular structure serves as an instrument passage and passes through the housing. In the housing, a driving chamber for filling fluid is arranged at the outer periphery of the sealing membrane. The hemo stasis valve further includes an energy storage mechanism which is linked in motion with the fluid. The energy storage mechanism correspondingly stores or releases energy when the state of the sealing membrane changes, and drives the sealing membrane to seal the instrument passage closely when releasing energy.

Several alternatives are provided below, but are not intended to be additional limitations to the overall scheme described above, which are merely further additions or preferences. Without technical or logical contradictions, the alternatives can be combined with the above overall scheme, independently or in combination.

Optionally, the hemostasis valve has a working state in which the driving chamber is filled with fluid and an initial state in which the driving chamber is not filled with fluid, the fluid being an incompressible liquid.

Optionally, the fluid is physiological saline or water.

Optionally, the sealing membrane has a first state of being pressed by an interventional instrument to open the instrument passage, in which state the energy storage mechanism is driven by the fluid to store energy; and The sealing membrane has a second state of being driven by the fluid to close the instrument passage, in which state the energy storage mechanism releases energy to maintain a fluid pressure that keeps the sealing membrane in the second state.

Optionally, the driving chamber has an outer periphery, and the housing has a rigid structure at least at the outer periphery of the driving chamber.

Optionally, the housing as a whole is a rigid structure.

Optionally, the housing is made of a transparent material.

Optionally, a through-region is opened in the housing, and the sealing membrane is arranged in the through-region, and wherein the driving chamber is defined between the outer periphery of the sealing membrane and an inner wall of the through-region.

Optionally, a first end cap and a second end cap are respectively arranged at two open ends of the through section in a sealing manner, and wherein each end cap is provided with an avoidance hole corresponding to the instrument passage; and two axial ends of the sealing membrane are respectively sandwiched and fixed between the housing and the respective end caps at respective sides.

Optionally, one end of the instrument passage is configured as an entrance for instrument and the other end is configured as an exit for instrument, and the end cap on the exit for instrument is provided with a radially break-through exhaust vent.

Optionally, the exhaust vent is communicated with an exhaust valve; and

The exhaust valve is directly mounted to the exhaust vent or communicated with the exhaust vent through an external pipe line.

Optionally, each end cap is fixed to the housing by screw.

Optionally, the housing is further provided with a balancing chamber, and the driving chamber and the balancing chamber communicate with each other, and wherein the fluid in the driving chamber is linked in motion with the energy storage mechanism via the balancing chamber.

Optionally, the instrument passage has a radial direction, the balancing chamber is located outside the driving chamber in the radial direction of the instrument passage.

Optionally, the balancing chamber surrounds an outer periphery of the driving chamber.

Optionally, the balancing chamber and the driving chamber are opened to communicate with each other.

Optionally, the driving chamber and the balancing chamber are isolated from each other and communicated with each other only through a balancing hole.

Optionally, one end of the instrument passage is configured as an entrance for instrument and the other end is configured as an exit for instrument, and the balancing hole is adjacent to the exit for instrument.

Optionally, the balancing chamber has a chamber wall and the driving chamber has a chamber wall, and the chamber wall of the balancing chamber or the driving chamber is provided with a first pressure regulating hole.

Optionally, the first pressure regulating hole is communicated with a first regulating valve; and The first regulating valve is directly mounted to the first pressure regulating hole or communicated with the first pressure regulating hole through an external pipe line.

Optionally, the energy storage mechanism includes an energy storage chamber and an energy storage element disposed in the energy storage chamber, and wherein the energy storage element is configured for storing or releasing energy when state of the sealing membrane is changed.

Optionally, the energy storage mechanism includes:

The energy storage chamber, wherein the housing is further provided with a balancing chamber, and the driving chamber and the balancing chamber are communicated with each other;

A piston, slidably arranged between the balancing chamber and the energy storage chamber in a sealing manner; and The energy storage element, being a compressible gas and/or a spring member located in the energy storage chamber and interacting with the piston.

Optionally, a chamber wall of the energy storage chamber is provided with a second pressure regulating hole.

Optionally, one end of the instrument passage is configured as an entrance for instrument and the other end is configured as an exit for instrument, and the balancing chamber is adjacent to the exit for instrument in an axial direction of the instrument passage, while the energy storage chamber is adjacent to the entrance for instrument.

Optionally, the energy storage chamber has an open structure at a side facing away from the balancing chamber, at which a third end cap is disposed in a sealing manner, and the second pressure regulating hole is provided in the third end cap.

Optionally, the second pressure regulating hole is communicated with a second regulating valve; and The second regulating valve is directly mounted to the second pressure regulating hole or communicated with the second pressure regulating hole through an external pipe line.

Optionally, the energy storage chamber is provided with an adjusting member that abuts against the spring member, and at least a portion of the adjusting member is exposed outside the energy storage chamber as an adjusting and operating portion.

Optionally, the energy storage chamber has an open structure at a side facing away from the balancing chamber, at which a third end cap is disposed in a sealing manner, and the adjusting member is arranged on the third end cap.

Optionally, the adjusting member is an adjusting screw engaged with a chamber wall of the energy storage chamber in thread fit, and a head portion of the adjusting screw is configured as the adjusting and operating portion, and an end of the adjusting screw opposite to the head portion abuts against the spring member.

Optionally, a motion direction of the piston and an extension direction of the instrument passage are provided in parallel or at an angle to each other.

Optionally, the energy storage element is an elastic balloon placed in the energy storage chamber.

Optionally, the elastic balloon is suspended in the balancing chamber or fixed to a chamber wall of the balancing chamber.

Optionally, the elastic balloon is fixed on a chamber wall of the balancing chamber, and a third pressure regulating hole communicating with the elastic balloon is opened in the chamber wall of the balancing chamber.

Optionally, the third pressure regulating hole is communicated with a third regulating valve; and The third regulating valve is directly mounted to the third pressure regulating hole or communicated with the third pressure regulating hole through an external pipe line.

Optionally, the elastic balloon is of a hollow structure and is filled with a gas through which energy is stored or released.

Optionally, the elastic balloon is made of an elastic material, and energy is stored or released by deformation of the elastic material.

Optionally, the lumen of the sealing membrane is provided with a hydrophilic lubricating coating.

Optionally, the hemostasis valve further includes a pressure increase mechanism for feeding back change in blood pressure to the fluid.

Optionally, the pressure increase mechanism has an input port for collecting blood pressure and an output port posterior to pressure being increased, and wherein output of the pressure increase mechanism acts directly or indirectly on the fluid in the driving chamber.

Optionally, the pressure increase mechanism includes a support body, two cylindrical chambers having different cylinder diameters are provided inside the support body, and sliders are respectively slidably disposed in the respective cylindrical chambers in a sealing manner, and the sliders in the two cylindrical chambers are linked in motion with each other; and The input port communicates with a first cylindrical chamber having a greater cylinder diameter, and the output port communicates with a second cylindrical chamber having a smaller cylinder diameter.

Optionally, the two cylindrical chambers communicate with each other, and the communicating portion is a linkage chamber between the two sliders, and the two sliders are linked in motion with each other by medium pressure in the common linkage chamber.

Optionally, the slider in the first cylindrical chamber is a first slider, one side of the first slider is an input chamber communicating with the input port, and the other side is the common linkage chamber; and The slider in the second cylindrical chamber is a second slider, and one side of the second slider is an output chamber communicating with the output port and the other side is the common linkage chamber.

Optionally, the two cylindrical chambers are isolated from each other, and the two sliders are directly connected by a connecting member, and wherein two ends of the connecting member are respectively connected to the respective sliders through the respective cylindrical chambers in a sealing manner.

Optionally, the slider in the first cylindrical chamber is a first slider, one side of the first slider is an input chamber communicating with the input port, and the other side is a first linkage chamber;

The slider in the second cylindrical chamber is a second slider, one side of the second slider is an output chamber communicating with the output port, and the other side is a second linkage chamber; and The two ends of the connecting member respectively pass through the respective linkage chambers in a sealing manner and connect with the respective sliders.

Optionally, the hemostasis valve is provided with a blood pressure feedback hole that can communicate with a blood vessel in use, and the blood pressure feedback hole communicates with the input port through a feedback pipe line.

Optionally, one end of the instrument passage is configured as an entrance for instrument and the other end is configured as an exit for instrument, and the blood pressure feedback hole is located adjacent to the exit for instrument.

Optionally, the hemostasis valve is provided with an exhaust vent, and the exhaust vent and the blood pressure feedback hole are configured separately.

Optionally, the hemostasis valve is provided with an exhaust vent, the exhaust vent also serves as the blood pressure feedback hole, and an exhaust bypass is communicated with the feedback pipe line, and the exhaust bypass is provided with an exhaust valve.

Optionally, the support body and the housing are formed in one piece or separately.

Optionally, the two cylindrical chambers are arranged coaxially, side by side or one inserted into another.

Optionally, axes of the two cylindrical chambers are parallel or oblique or perpendicular to each other.

Optionally, the output port of the pressure increase mechanism is in communication with the driving chamber.

Optionally, the pressure increase mechanism includes a support body, two cylindrical chambers having different cylinder diameters are provided inside the support body, and sliders are respectively slidably disposed in the respective cylindrical chambers in a sealing manner, and the sliders in the two cylindrical chambers are linked in motion with each other;

The input port communicates with a first cylindrical chamber having a greater cylinder diameter, and the output port communicates with a second cylindrical chamber having a smaller cylinder diameter; and The two cylindrical chambers are communicated with each other, and the communicating portion is a linkage chamber located between the two sliders, and the two sliders are linked in motion with each other through medium pressure in the linkage chamber.

Optionally, a chamber wall of the linkage chamber is provided with a fourth pressure regulating hole communicating with the linkage chamber, and a fifth pressure regulating hole communicating with the output port is opened in a chamber wall of the cylindrical chamber having a small cylinder diameter.

Optionally, the pressure increase mechanism includes a support body, two cylindrical chambers having different cylinder diameters are provided inside the support body, and sliders are respectively slidably disposed in the respective cylindrical chambers in a sealing manner, and the sliders in the two cylindrical chambers are linked in motion with each other;

The input port communicates with a first cylindrical chamber having a greater cylinder diameter, and the output port communicates with a second cylindrical chamber having a smaller cylinder diameter; and The two cylindrical chambers are isolated from each other, the two sliders are directly connected through a connecting member, and wherein two ends of the connecting member are respectively connected to the respective sliders through the respective cylindrical chambers in a sealing manner.

Optionally, the chamber wall of the second cylindrical chamber is provided with:

A sixth pressure regulating hole communicated to one side of the slider in the second cylindrical chamber, and a seventh pressure regulating hole communicated to the other side of the slider in the second cylindrical chamber where the output port also communicated to.

Optionally, the pressure regulating holes are communicated with respective regulating valves, and the regulating valves are directly mounted to the respective pressure regulating holes or communicated with the respective pressure regulating holes through respective external pipe lines.

Optionally, the housing is further provided with a balancing chamber, and the driving chamber and the balancing chamber communicate with each other; and The output port of the pressure increase mechanism is in communication with the driving chamber and/or the balancing chamber.

Optionally, the hemostasis valve further includes an energy storage mechanism linked in motion with the fluid, the energy storage mechanism is configured for storing or releasing energy when state of the sealing membrane is changed, for driving the sealing membrane to close the instrument passage;

The fluid in the driving chamber is linked in motion with the energy storage mechanism via the balancing chamber; and The output of the pressure increase mechanism acts directly on the energy storage mechanism, or the output port of the pressure increase mechanism communicates with the driving chamber and/or the balancing chamber.

Optionally, the energy storage mechanism includes an elastic balloon disposed in the balancing chamber; and The output port of the pressure increase mechanism communicates with the balancing chamber.

Optionally, the energy storage mechanism includes an elastic balloon disposed in the balancing chamber; and The output port of the pressure increase mechanism is in communication with the elastic balloon.

Optionally, the energy storage mechanism includes:

An energy storage chamber in communication with the balancing chamber;

A piston slidably arranged between the balancing chamber and the energy storage chamber in a sealing manner; and A compressible gas and/or spring member located in the energy storage chamber and interacting with the piston; and wherein The output port of the pressure increase mechanism is in communication with the energy storage chamber.

Optionally, the energy storage mechanism includes:

An energy storage chamber in communication with the balancing chamber;

A piston slidably arranged between the balancing chamber and the energy storage chamber in a sealing manner; and A compressible gas and/or spring member located in the energy storage chamber and interacting with the piston; and wherein The output port of the pressure increase mechanism communicates with the balancing chamber.

Optionally, a blood pressure indicating device connected to the input port is further included.

Optionally, the blood pressure indicating device is a sphygmomanometer independent from the pressure increase mechanism, or the blood pressure indicating device and the pressure increase mechanism are formed in piece.

Optionally, the pressure increase mechanism is provided with at least a movable element reflecting blood pressure, and the pressure increase mechanism is provided with a blood pressure indicator, and wherein the blood pressure indicator indicates the position of the movable element.

Optionally, the pressure increase mechanism includes a support body, two cylindrical chambers having different cylinder diameters are provided inside the support body, and sliders are respectively slidably disposed in the respective cylindrical chambers in a sealing manner, and the sliders in the two cylindrical chambers are linked in motion with each other;

The input port communicates with a first cylindrical chamber having a greater cylinder diameter, and the output port communicates with a second cylindrical chamber having a smaller cylinder diameter; and The movable element is a slider in the first cylindrical chamber and/or a slider in the second cylindrical chamber.

The present application further provides an externally balanced hemostasis valve including a housing and a sealing membrane disposed in the housing and in a tubular structure. The lumen of the tubular structure serves as an instrument passage. A driving chamber at the outer periphery of the sealing membrane is arranged in the housing. A balloon which acts with the sealing membrane is arranged in the driving chamber, and the balloon and the sealing membrane abut against each other to close or open the instrument passage.

Optionally, the housing is a rigid cylindrical structure and surrounds around the outer periphery of the sealing membrane. Two axial ends of the sealing membrane are connected with the housing in a sealing manner. The driving chamber is defined between an axial middle portion of the sealing membrane and an inner wall of the housing.

Optionally, the housing includes:
A support portion, the balancing hole extends through a side wall of the support portion; and
Two end caps, respectively docked to the two axial ends of the support portion, and each end cap is provided with an avoidance hole corresponding to the instrument passage in position.

Optionally, the balancing hole is located adjacent the entrance of the instrument passage.

Optionally, the two axial ends of the sealing membrane are connected with the housing in at least one of the following ways:
Being bonded and fixed with the support portion;
Being bonded and fixed with the respective end caps at the respective sides;
Being sandwiched and fixed between the support portion and the respective end caps at the respective sides;
Being inserted in the support portion and sealed and fixed by inserts;
Being respectively inserted in the respective end caps at the respective sides and sealed and fixed by inserts; and
Being respectively inserted between the support portion and the respective end caps at the respective sides and sealed and fixed by inserts.

Optionally, the elastic balloon includes:
A balloon body made of an elastic material and having a hollow structure;
A first connector connected and communicated with the balloon body, and the first connector communicates with the balancing hole; and
A second connector connected and communicated with the balloon body, by means of which the balancing medium that can flow between the elastic balloon and the driving chamber can be injected.

Optionally, the first connector and the second connector are respectively located at two opposite sides of the balloon body, and are formed in one piece with the balloon body or separate from the balloon body.

Optionally, a sealing plug is arranged at the opening of the second connector.

Optionally, the second connector is connected with a control valve.

The present application further discloses an internally balanced hemostasis valve including a housing and a sealing membrane disposed in the housing and in a tubular structure. The lumen of the tubular structure serves as an instrument passage. A driving chamber at the outer periphery of the sealing membrane is arranged in the housing. A balloon which acts with the sealing membrane is arranged in the driving chamber, and the balloon and the sealing membrane abut against each other to close or open the instrument passage.

Optionally, the number of the balloon is one and the balloon surrounds the instrument passage at least once, or a plurality of balloons are distributed around the instrument passage and around the outer periphery of the sealing membrane, wherein the balloons can be distributed uniformly or non-uniformly in circumferential direction, and the shapes of the balloons can be the same or different.

Optionally, the number of balloons is 2, 3 or 4. In the longitudinal direction of the instrument passage, at least the middle portion of the balloon is configured as a deformation portion, and the deformation portions of the balloons act on the sealing membrane together.

Optionally, the balloon has an inflated state maintained by its own elasticity and/or by filler. The balloon in the inflated state presses the sealing membrane to close the instrument passage. As the interventional instrument passes through the instrument passage, the balloon has a yielding state achieved by its own deformation and/or by displacement, in which state the balloon allows the sealing membrane to deform to open the instrument passage.

Optionally, the housing is a rigid cylindrical structure and surrounds around the outer periphery of the sealing membrane, and two axial ends of the sealing membrane are connected with the housing in a sealing manner. The driving chamber is defined between an axial middle portion of the sealing membrane and an inner wall of the housing.

Optionally, the housing includes:
A support portion through which the instrument passage passes, and
Two end caps, respectively docked to the two axial ends of the support portion, and each end cap is provided with an avoidance hole corresponding to the instrument passage in position.

Optionally, the two axial ends of the sealing membrane are connected with the housing in at least one of the following ways:
Being bonded and fixed with the support portion;
Being bonded and fixed with the respective end caps at the respective sides;
Being sandwiched and fixed between the support portion and the respective end caps at the respective sides;
Being inserted in the support portion;
Being respectively inserted in the respective end caps at the respective sides; and
Being respectively inserted between the support portion and the respective end caps at the respective sides.

Optionally, the support portion includes a spherical middle section and two diameter reduced sections respectively connected to the two sides of the middle section. Two end caps are respectively inserted and fixed to the corresponding diameter reduced sections, and the driving chamber is located inside the middle section.

Optionally, the housing or the end caps are provided with positioning grooves, the balloon extends along the longitudinal direction of the instrument passage, and the two ends of the balloon are respectively inserted and fixed in the respective positioning grooves at the respective sides.

Optionally, the support portion or at least one end cap is opened with an injection channel, at least one end of the balloon is opened and communicates with the injection channel, and the support portion or at least one end cap defines an injection port communicating with the injection channel.

Optionally, the injection port is fitted with a sealing plug, or the injection port is inserted with a connection tube in a sealing manner, and the connection tube is fitted with a control valve.

The present application further discloses a hemostasis valve including a housing and a sealing membrane in a tubular structure and disposed in the housing. The lumen of the tubular structure serves as an instrument passage and passes through the housing. In the housing, a driving chamber for filling fluid is arranged at the outer periphery of the sealing membrane. A balancing chamber and an energy storage chamber are also arranged in the housing, wherein the balancing chamber communicates with the driving chamber. A piston is slidably arranged between the balancing chamber and the energy storage chamber, and an energy storage element is arranged in the energy storage chamber. The energy storage element stores or releases energy through interaction with the piston when the sealing membrane is deformed.

The present application further discloses a hemostasis valve including a housing and a sealing membrane in a tubular structure and disposed in the housing. The lumen of the tubular structure serves as an instrument passage and passes through the housing. In the housing, a driving chamber for filling fluid is arranged at the outer periphery of the sealing membrane. A balancing chamber and an energy storage chamber are also arranged in the housing, wherein the balancing chamber communicates with the driving chamber. The balancing chamber and/or the energy storage chamber are provided with an elastic balloon as an energy storage element, and the elastic balloon is subjected to a fluid action to store or release energy when the sealing membrane is deformed.

The present application further discloses a hemostasis valve including a housing and a sealing membrane in a tubular structure and disposed in the housing. The lumen of the tubular structure serves as an instrument passage and passes through the housing. In the housing, a driving chamber for filling fluid is provided at the outer periphery of the sealing membrane. The hemostasis valve further includes a pressure increase mechanism, having an input port for collecting blood pressure and an output port posterior to pressure being increased, and feeding back the change in the blood pressure to the fluid through the output port.

The present application further discloses a hemostasis valve including a housing and a sealing membrane in a tubular structure and disposed in the housing. The lumen of the tubular structure serves as an instrument passage and passes through the housing. In the housing, a driving chamber for filling fluid is arranged at the outer periphery of the sealing membrane. A balancing chamber and an energy storage chamber are also arranged in the housing, wherein the balancing chamber communicates with the driving chamber. A piston is slidably arranged between the balancing chamber and the energy storage chamber, and an energy storage element is arranged in the energy storage chamber. The energy storage element stores or releases energy through interaction with the piston when the sealing membrane is deformed. The hemostasis valve further includes a pressure increase mechanism, having an input port for collecting blood pressure, and an output port posterior to pressure being increased and communicating at least one of the driving chamber, the balancing chamber, and the energy storage chamber, for feeding back a change in blood pressure to the fluid.

The present application further discloses a hemostasis valve including a housing and a sealing membrane in a tubular structure and disposed in the housing. The lumen of the tubular structure serves as an instrument passage and passes through the housing. In the housing, a driving chamber for filling fluid is arranged at the outer periphery of the sealing membrane. A balancing chamber and an energy storage chamber are also arranged in the housing, wherein the balancing chamber communicates with the driving chamber. The balancing chamber and/or the energy storage chamber are provided with an elastic balloon as an energy storage element, and the elastic balloon is subjected to a fluid action to store or release energy when the sealing membrane is deformed. The hemostasis valve further includes a pressure increase mechanism, having an input port for collecting blood pressure, and an output port posterior to pressure being increased and communicating at least one of the driving chamber, the balancing chamber, and the energy storage chamber, for feeding back a change in blood pressure to the fluid.

The present application further discloses a hemostasis valve having multi chambers including a housing and a sealing membrane disposed in the housing and in a tubular structure. The lumen of the tubular structure serving as an instrument passage. In a radial direction of the instrument passage, the housing is provided with a driving chamber at an outer periphery of the sealing membrane for filling fluid and balancing chambers outside the driving chamber, and wherein the driving chamber and the balancing chambers communicate with each other and the balancing chambers surround an outer periphery of the driving chamber; and The hemostasis valve further including an energy storage mechanism linked in motion with the fluid, the fluid in the driving chamber being linked in motion with the energy storage mechanism through the balancing chamber, and the energy storage mechanism configured for storing or releasing energy when state of the sealing membrane is changed and for driving the sealing membrane to close the instrument passage when releasing energy.

Optionally, a plurality of balancing chambers are provided at intervals on the outer periphery of the driving chamber, and the energy storage mechanism is provided for each balancing chamber.

Optionally, the number of said balancing chambers is 2 to 8.

Optionally, the balancing chambers are evenly spaced on the outer periphery of the driving chamber.

Optionally, the balancing chambers communicate with the driving chamber through separate balancing holes.

Optionally, at least two of the balancing chambers communicate with the driving chamber through a common balancing hole.

Optionally, the balancing chambers communicate with the driving chamber through the same balancing hole.

Optionally, the energy storage mechanism includes:

An energy storage chamber, wherein the housing is further provided with a balancing chamber, and the driving chamber and the balancing chamber are communicated with each other;

A piston, slidably arranged between the balancing chamber and the energy storage chamber in a sealing manner; and An energy storage element, being a compressible gas and/or a spring member located in the energy storage chamber and interacting with the piston;

The housing is provided with at least two cylindrical chambers for the piston sliding, and the cylindrical chambers are divided into the balancing chamber and the energy storage chamber by the piston.

Optionally, the piston is engaged with an inner wall of the respective cylindrical chamber in a sealing manner by a sealing edge at an outer periphery of the piston, in a sliding direction of the piston, at least two circles of sealing portions are provided between the sealing edge and the inner wall of the cylindrical chamber.

Optionally, the housing is provided with at least two cylindrical chambers for the piston sliding, and the cylindrical chambers are respectively provided with the respective energy storage elements, and wherein the energy storage performances of the energy storage elements are the same or different.

Optionally, the hemostasis valve further includes a pressure regulating structure provided with a fluid line for supplying the fluid, and the fluid line is directly or indirectly communicated with the balancing chamber or the driving chamber or the balancing hole.

Optionally, a plurality of balancing chambers are provided and distributed circumferentially outside the driving chamber, and the balancing chambers communicate with the driving chamber through separate balancing holes; and wherein one side of each of the balancing holes is linked in motion with the driving chamber, and the other side extends radially to an outer peripheral wall of the housing, which other side is closed in the outer peripheral wall or communicates with the fluid line.

Optionally, the housing has a rigid structure at least at the outer periphery of the driving chamber.

Optionally, the driving chamber is further communicated with a fluid line and is connected to an external fluid source through the fluid line.

Optionally, the fluid line is configured with a control valve.

Optionally, the driving chamber is further communicated with a balancing chamber, through which the fluid in the driving chamber is linked in motion with the energy storage mechanism. The fluid line can be communicated with the driving chamber in at least one of the following ways:

Directly communicated with the driving chamber; or
Directly communicated with the balancing chamber; or
Directly communicated with and between the driving chamber and the balancing chamber.

Optionally, the external fluid source is provided by a pressure regulating structure.

Optionally, the pressure regulating structure is driven manually, electrically or pneumatically.

Optionally, the pressure regulating structure has at least one storage chamber with which the fluid line is in communication.

Optionally, a cylindrical chamber is formed in the housing, and the energy storage mechanism includes:

A piston slidably disposed in the cylindrical chamber and dividing the cylindrical chamber into a balancing chamber and an energy storage chamber; and An energy storage element in the energy storage chamber, the energy storage element being a gas and/or a spring element interacting with the piston.

Optionally, the housing has an annular shape and has an annular wall within which the cylindrical chamber is located.

Optionally, the cylindrical chamber is a straight cylindrical structure, and an axis of the straight cylindrical structure and an axis of the housing are parallel to each other.

Optionally, the instrument passage extends through the housing along the axis of the housing.

Optionally, one or more cylindrical chambers are provided.

Optionally, the number of the cylindrical chambers is 2 to 8.

Optionally, the cylindrical chambers are distributed along the circumferential direction of the housing one after another.

The present application provides an energy storage mechanism, by which the deformation energy of the sealing membrane is stored, so that the posture and the configuration of the sealing membrane can be adaptively adjusted during the relative displacement of the instrument and the hemostasis valve, thereby achieving good compatibility and good sealing effect for different instruments passing through. Further, by setting parameters of the sealing membrane, parameters of the energy storage mechanism and engagement between the two, the instrument pulling experience is good, and the change in operating force is small, which two also provide a structural basis for adjusting the experience of pulling the instrument.

The present application further provides a catheter sheath including an axially extending sheath having an axial through-lumen, the sheath having a proximal end and a distal end, the proximal end of the sheath being connected with the hemostasis valve described above.

Optionally, the distal end of the sheath is provided with a developing ring.

Optionally, the hemostasis valve is provided with a pipe joint connected to the sheath, and the pipe joint is engaged with the sheath through a sealing element and provided with an engaging structure for preventing separation of the sheath from the pipe joint.

Optionally, the tubular wall of the sheath has a coiled wall structure and a coiled cross section. The tubular wall has an expanded configuration in which a corresponding portion of the coiled wall structure is expanded and a pre-defined configuration in which the coiled wall structure is restored by itself.

Optionally, the tubular wall is made of an elastic material capable of automatically switching between the expanded configuration and the pre-defined configuration.

Optionally, the outer diameter of the tubular wall in the pre-defined configuration is 4 to 9 mm.

Optionally, the tubular wall in the pre-defined configuration is coiled more than one circle, wherein an exceeding portion extending beyond 360 degrees overlaps with a partial portion within 360 degrees.

Optionally, the overlapped portions have smooth contact surfaces.

Optionally, the tubular wall in the pre-defined configuration is coiled less than 720 degrees.

Optionally, the starting end and the terminal end of the coiled wall structure in the circumferential direction are connected by a flexible surrounding film.

Optionally, the turning portion of the flexible surrounding film is provided with a crease line.

Optionally, the flexible surrounding film has a wall thickness of 0.1 to 1 mm.

Optionally, the flexible surrounding film is a circumferentially closed tubular structure having a cross-sectional perimeter greater than the cross-sectional perimeter of the tubular wall that is fixedly attached to the outer wall of the flexible surrounding film.

Optionally, the distal periphery of the tubular wall is surrounded with an elastic sleeve.

Optionally, the distal end of the tubular wall is connected to the sheath handle and the connection is surrounded by the elastic sleeve.

Optionally, the elastic sleeve has an axial length of 5 to 50 cm.

Optionally, the outer side of the tubular wall is surrounded with a constraint sleeve for constrain the tubular wall in the pre-defined configuration, and the constraint sleeve is expanded and torn in the expanded configuration of the tubular wall.

Optionally, the constraint sleeve extends axially along the tubular wall 204 and beyond the proximal end of the tubular wall, where the portion exceeding the proximal end of the tubular wall has a shrunken structure.

Optionally, the coiled wall structure has a chamfered structure adjacent the proximal end of the tubular wall at the terminal end in the circumferential direction.

Further, the present application provide a method for sealing interventional instrument, including: providing an instrument passage by a deformable sealing membrane, closing the instrument passage by driving fluid to deform the sealing membrane at an outer periphery of the sealing membrane, and maintaining sealing between the interventional instrument and the instrument passage by means of an energy storage mechanism which is linked in motion with the fluid for storing or releasing energy when the sealing membrane is deformed during the interventional instrument entry and exiting the instrument passage.

The present application further provides a method for sealing interventional instrument with hemostasis valve, wherein the hemostasis valve including a housing and a sealing membrane disposed in the housing and having a tubular structure, a lumen of the tubular structure configured as an instrument passage and passing through the housing, the housing being provided with a driving chamber at an outer periphery of the sealing membrane for filling fluid and an energy storage mechanism linked in motion with the fluid, and wherein the method for sealing interventional instrument includes:

Injecting fluid into the driving chamber, the fluid driving the sealing membrane to close the instrument passage and acting on the energy storage mechanism to pre-store energy to maintain state of the sealing membrane;

Inserting the interventional instrument into the instrument passage, wherein the sealing membrane is pressed and deformed by the interventional instrument and the energy storage mechanism is driven by the fluid to store energy; and Withdrawing the interventional instrument from the instrument passage, wherein the energy storage mechanism releases energy and the instrument passage is closed by deformation of the sealing membrane driven by the fluid.

In the present application, the method for sealing interventional instrument can be implemented base on the hemostasis valves as described above.

The present application provides an energy storage mechanism, by which the deformation energy of the sealing membrane is stored, so that the posture and the configuration of the sealing membrane can be adaptively adjusted during the relative displacement of the instrument and the hemostasis valve, thereby achieving good compatibility and good sealing effect for different instruments passing through. Further, by setting parameters of the sealing membrane, parameters of the energy storage mechanism and engagement between the two, the instrument pulling experience is good, and the change in operating force is small, which two also provide a structural basis for adjusting the experience of pulling the instrument.

Specific advantageous will be further explained in connection with specific structures or steps in specific embodiments.

BRIEF DESCRIPTION OF THE DRAWINGS

FIG. 1b is a schematic view of the housing of the hemostasis valve shown in FIG. 1a;

FIG. 5b is a schematic view of the instrument entering the hemostasis valve shown in FIG. 5a;

FIG. 10b is a schematic view of another embodiment of the hemostasis valve shown in FIG. 10a;

FIG. 11b is a schematic view showing another communication of the pressure increase mechanism with the hemostasis valve shown in FIG. 11a;

FIG. 15 is a schematic view of the externally balanced hemostasis valve shown in FIG. 14 with an interventional instrument passed there through;

FIG. 20 is a schematic view of the internally balanced hemostasis valve shown in FIG. 19 with no interventional instrument passed there through;

FIG. 21 is a schematic view of the internally balanced hemostasis valve shown in FIG. 19 with an interventional instrument passed there through;

FIGS. 24a to 27d are schematic views of other embodiments of hemostasis valves having multi chambers.

Figure 1A:
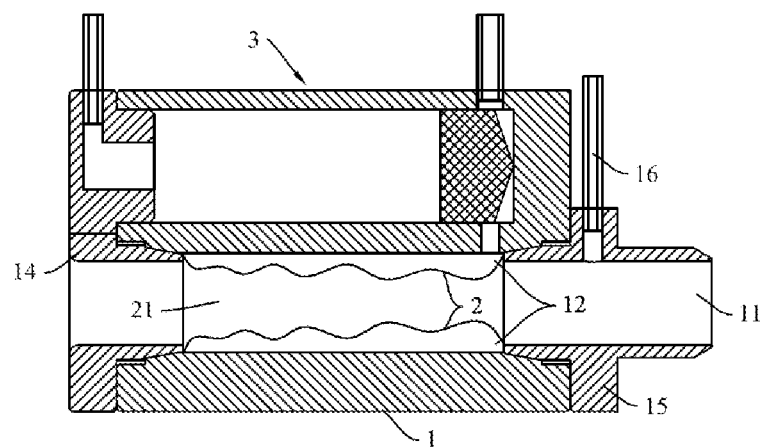
FIG. 1a is a schematic view of an embodiment of a hemostasis valve in an initial state.
Figure 1B:
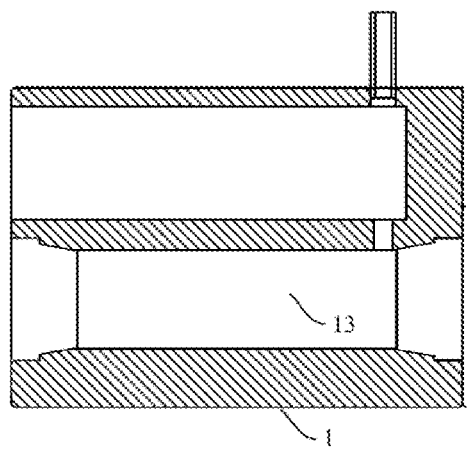

In the figures, reference numerals are listed below:

1, housing; 11, instrument passage; 12, driving chamber; 13, through-region; 14, first end cap; 15, second end cap; 16, exhaust vent; 161, blood pressure feedback hole;

2, sealing membrane; 21, lumen;

3, energy storage mechanism; 31, balancing chamber; 311, balancing hole; 32, first pressure regulating hole; 33, energy storage chamber; 331, second pressure regulating hole; 332, third end cap; 34, piston; 341, spring member; 342, adjusting member; adjusting and operating portion 343, elastic balloon 35, third pressure regulating hole 351, 4, pressure increase mechanism; 40, support body; 401, first cylindrical chamber; 402, second cylindrical chamber; 41, input port; 42, output port; 43, first slider; 431, input chamber; 432, connecting member; 44, second slider; 441, output chamber; 442, common linkage chamber, 443, first linkage chamber, 444, second linkage chamber, 451, fourth pressure regulating hole, 452, fifth pressure regulating hole, 453, sixth pressure regulating hole, 454, seventh pressure regulating hole, 9, interventional instrument; 91, sheath;

100, housing; 110, support portion; 120, end cap; 121, avoidance hole; 122, pipe joint; 130, sealing membrane; 131, instrument passage; 140, elastic balloon; 141, balloon body; 142, first connector; 143, second connector; 150, driving chamber; 151, balancing hole; 160, interventional instrument; 170, sheath; 111, middle section; 112, diameter reduced section; 144, balloon; 145, deformation portion; 152, injection channel; 153, injection port; 154, connection tube;

204, tubular wall; 205, joint; 206, elastic sleeve; 207, terminal end edge; 208, pressed portion; 209, starting end; 210, terminal end; 211, exceeding portion; 212, non-exceeding portion; 213, overlapping region; 214, flexible surrounding film; 215, folded portion; 216, turning portion; 217, turning portion.

DESCRIPTION OF THE EMBODIMENTS

The technical solutions according to the embodiments of the present disclosure will be described in combination with the drawings according to the embodiments of the present disclosure. The described embodiments represent some but not all the possible embodiments.

It should be noted that, when a component is "connected" with another component, it may be directly connected to another component or may be indirectly connected to another component through a further component. When a component is "provided" on another component, it may be directly provided on another component or may be provided on another component through a further component.

Unless otherwise defined, all technical and scientific terms used herein have the same meaning as commonly understood by a person skilled in the art. The terms in the description of the present disclosure are used to describe specific embodiments, and not to limit the present disclosure. The term "and/or" used herein includes any combinations of one or more of the listed options, as well as the combination of all of the listed options.

Referring to FIGS. 1a to 5c, a hemostasis valve according to an embodiment of the present application is disclosed, including a housing 1 and a sealing membrane 2 provided in the housing 1 and having a tubular structure. A lumen 21 of the tubular structure serves as an instrument passage 11 and passes through the housing 1. A driving chamber 12 for filling fluid is provided within the housing 1 and surrounding the sealing membrane 2. The hemostasis valve further includes an energy storage mechanism 3 which is linked in motion with the fluid. The energy storage mechanism 3 stores or releases energy when the state of the sealing membrane 2 changes, and drives the sealing membrane 2 to close the instrument passage 11 when releasing energy.

The sealing membrane 2 separates two separate spaces within the housing 1, i.e., the instrument passage 11 and the driving chamber 12, which are isolated by the sealing membrane 2. The instrument passage 11 is open at two ends thereof for passage of an interventional instrument 9.

The sealing membrane 2 is of tubular structure and the lumen 21 serves as the instrument passage 11. The instrument passage 11 needs to pass through the housing 1 to ensure the passage of the interventional instrument 9 through the housing 1, so that the lumen 21 of the sealing membrane 2 serving as the instrument passage 11 can be understood as that the lumen 21 of the sealing membrane 2 forms at least part of the instrument passage 11.

With regard to the linkage in motion, the fluid within the driving chamber 12 can drive the sealing membrane 2 to change its state, thereby closing or opening the instrument passage 11. The instrument passage 11 is a passage through which the interventional instrument 9, such as a catheter, a guide wire, or the like, enters and exits the human body during an interventional treatment. Therefore, it can be understood that the area surrounded by the tubular structure forms at least part of the instrument passage 11. In order to allow the entry of the interventional instrument 9, corresponding entrance and exit communicating with the instrument passage 11 can be opened in the housing 1, in which case the instrument passage 11 can also be regarded as passing through the housing 1. The driving chamber 12 functions to confine the fluid and direct the work from the fluid onto the sealing membrane 2. When the sealing membrane 2 closes the instrument passage 11, at least a portion of the tubular structure of the sealing membrane 2 tends to move radially, thereby reducing the lumen diameter of the instrument passage 11 so as to close the instrument passage 11. No matter the interventional instrument 9 is in or out of the instrument passage 11, the sealing membrane 2 can close the instrument passage 11 or open the instrument passage 11. When the interventional instrument 9 is located in the instrument passage 11, the lumen 21 of the sealing membrane 2 radially closes to seal the outer periphery of the interventional instrument 9 so as to close the instrument passage 11. When the interventional instrument 9 is out of the instrument passage 11, the sealing membrane 2 moves radially until the walls of the lumen 21 contact against with each other so as to close the instrument passage 11.

In principle, the fluid drives the sealing membrane 2 primarily by pressure. When the fluid pressure in the driving chamber 12 is sufficient to overcome the resistance in the instrument passage 11, the driving chamber 12 can drive the sealing membrane 2 to deform to change the lumen 21 of the sealing membrane 2. The closing effect of the instrument passage 11 depends on the fluid pressure in the driving chamber 12.

The fluid pressure in the driving chamber 12 can be changed by means of various methods, for example, by connecting an external pressure source, changing the fluid temperature, changing the physical properties of the fluid, or the like. The energy storage mechanism 3 in this embodiment is capable of self-adaptively adjusting the pressure of the fluid. When the state of the sealing membrane 2 changes, the energy storage mechanism 3 can adaptively store or release energy and drive the sealing membrane 2 to close the instrument passage 11 with the stored energy. Compared with the case where an external energy source is connected, this embodiment can effectively improve the integration of the hemostasis valve, improve the degree and effect of changing the configuration of the sealing membrane 2, so that the instrument passage 11 with a larger lumen diameter can be provided for the intervention instruments 9 with different outer dimensions.

It should be noted that the tubular structure of the sealing membrane 2 herein is not strictly limited to a round tube. In practice, the lumen diameter of the sealing membrane 2 may vary in the axial direction. In the cross section, the lumen of the sealing membrane 2 may have a regular shape such as a rectangular shape, or a shape with changed ends such as an hourglass shape, a pear shape, a spherical shape, or an irregular shape.

In one embodiment, the lumen of the sealing membrane 2 is provided with a hydrophilic lubricating coating (not shown). The lumen of the sealing membrane 2 is the portion in contact with the interventional instrument 9 in practice. The hydrophilic lubricating coating can reduce the friction force of the lumen of the sealing membrane 2, so that even if the sealing membrane 2 tightens the outer periphery of the interventional instrument 9 under the action of the fluid, the interventional instrument 9 can still pass relatively smoothly through the instrument passage 11. Further, the hydrophilic lubricating coating can also realize other function by adjusting the coating material. For example, the life of the sealing membrane 2 can be increased by adding a wear-resistant material to the coating material. For another example, the sealing membrane 2 can be self-cleaned by adjusting the physical and chemical properties of the coating surface.

The energy directly acted on the sealing membrane 2 comes from the driving chamber 12. In one embodiment, the hemostasis valve has a working state in which the driving chamber 12 is filled with fluid as shown in FIG. 1c, and an initial state in which the driving chamber 12 is not filled with fluid as shown in FIG. 1a, wherein the fluid is an incompressible liquid.

In the initial state, the driving chamber 12 should be filled with atmospheric air. In some special applications, the driving chamber 12 in the initial state can be set to a vacuum state. In this embodiment, the incompressible liquid is relative to a gas but it does not mean that the fluid is absolutely incompressible. The incompressible property of the liquid can facilitate an operator such as a medical worker to accurately control the degree of deformation of the sealing membrane 2. Specifically, in one embodiment, the fluid is physiological saline or water. Using the physiological saline or water as the above-mentioned fluid has the advantage of easy availability in the medical field, and more importantly, the fluid would not affect the interventional site even if the sealing of the sealing membrane 2 fails in the case of an accident, ensuring the safety.

During the operation of the sealing membrane 2, the energy storage mechanism 3 can improve the performance of the sealing membrane 2. Specifically, in one embodiment, the sealing membrane 2 has a first state in which it is pressed by the interventional instrument 9 to open the instrument passage 11 as shown in FIG. 1d, and the energy storage mechanism 3 is driven by the fluid to storage energy. It can be readily understood that, when the energy storage mechanism 3 is in the energy storage state, the fluid still has a high pressure to allow the instrument passage 11 to close, that is, the energy storage mechanism 3 in the energy storage state can still drive the sealing membrane 2 to close the instrument passage 11.

Figure 1C:
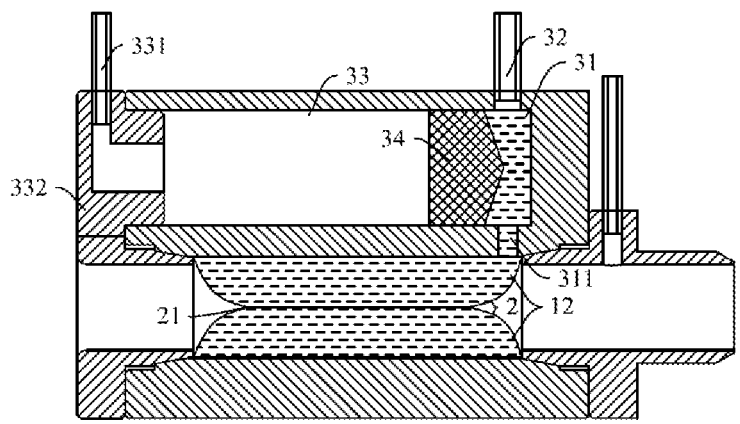
FIG. 1c is a schematic view of the hemostasis valve shown in FIG. 1a in the working state.
Figure 1D:
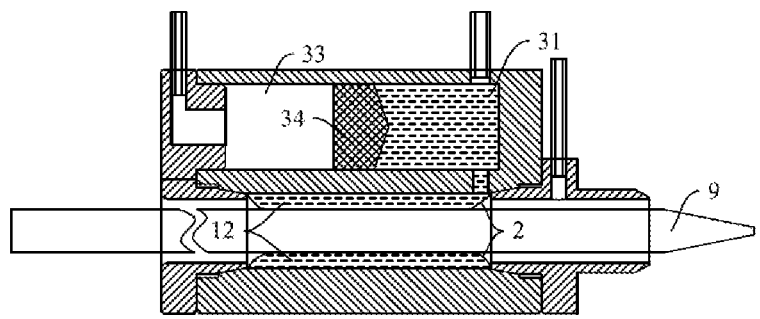
FIG. 1d is a schematic view of the instrument entering the hemostasis valve shown in FIG. 1c.
Figure 2A:
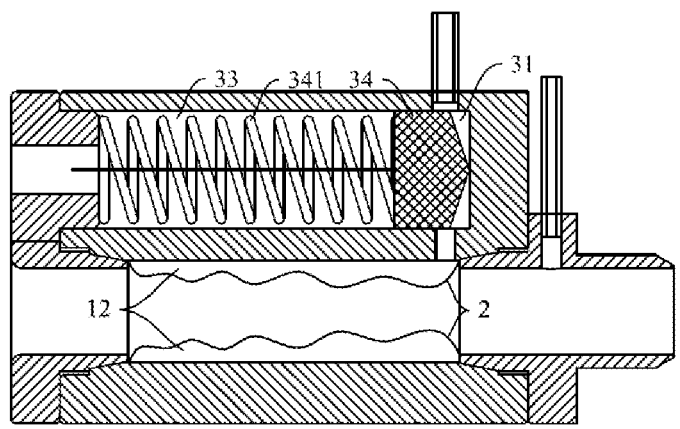
FIG. 2a is a schematic view of another embodiment of a hemostasis valve in an initial state.
Figure 2B:
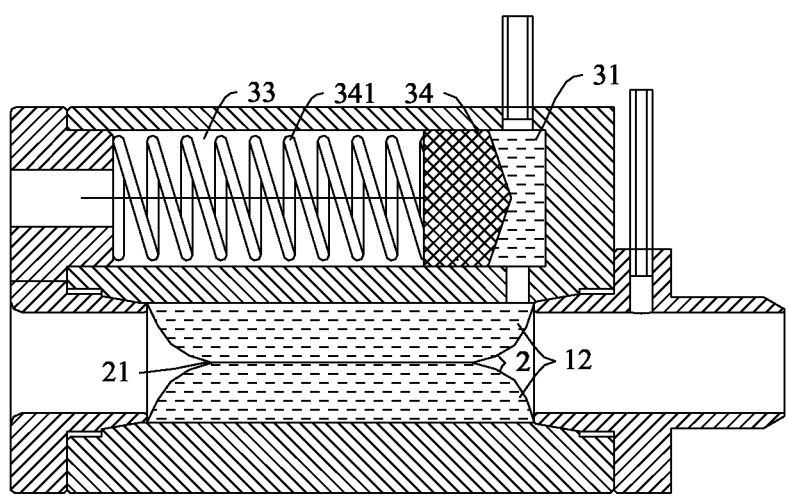
FIG. 2b is a schematic view of the hemostasis valve shown in FIG. 2a in the working state.
Figure 2C:
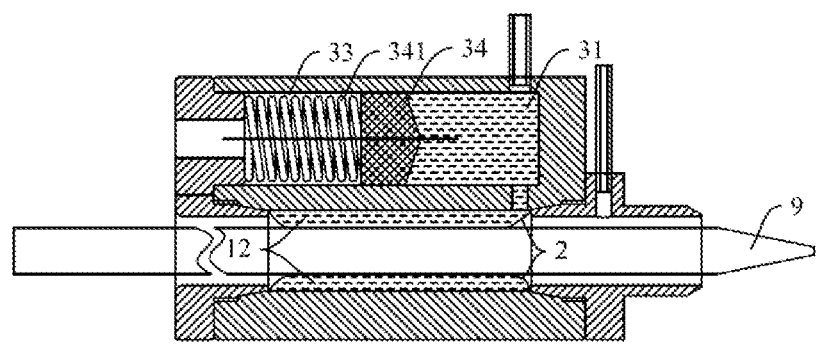
FIG. 2c is a schematic view of the instrument entering the hemostasis valve shown in FIG. 2b.
Figure 2D:
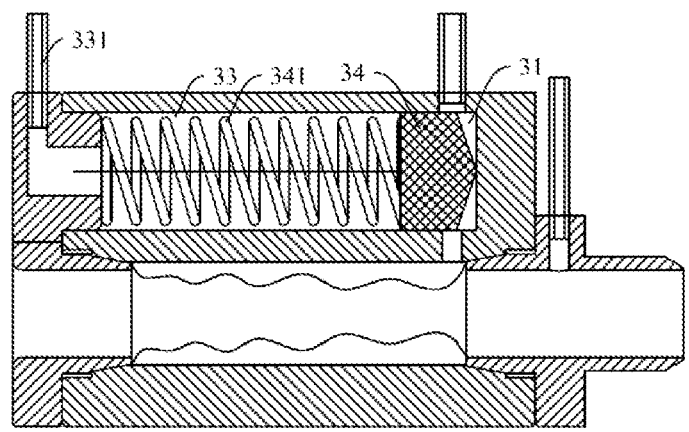
FIG. 2d is a schematic view of another embodiment of the hemostasis valve shown in FIG. 2a in an initial state.
Figure 2E:
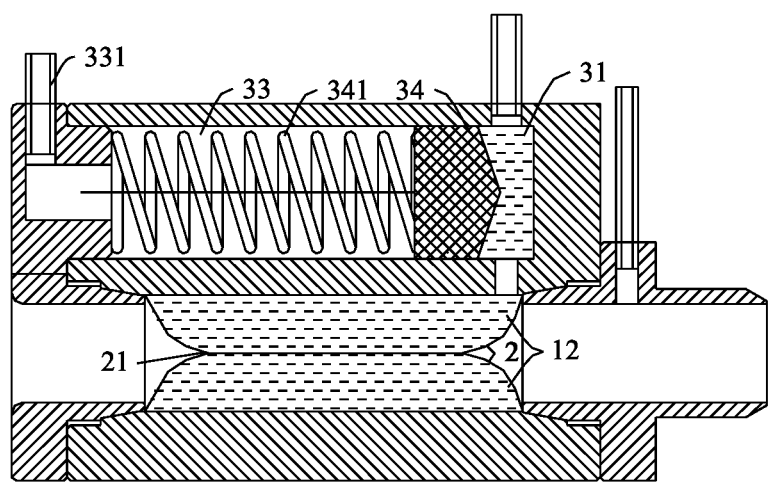
FIG. 2e is a schematic view of the hemostasis valve shown in FIG. 2d.
Figure 2F:
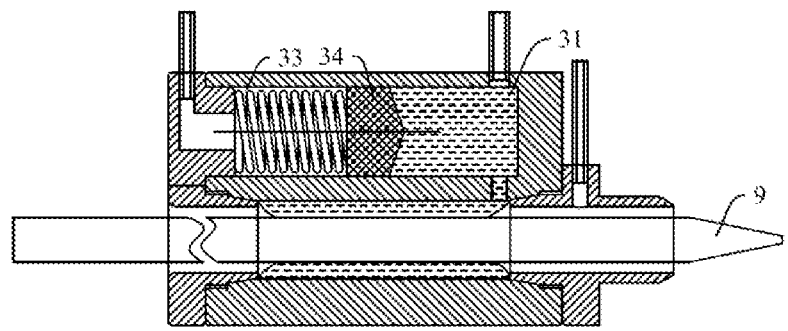
FIG. 2f is a schematic view of the instrument entering the hemostasis valve shown in FIG. 2e.
Figure 3:
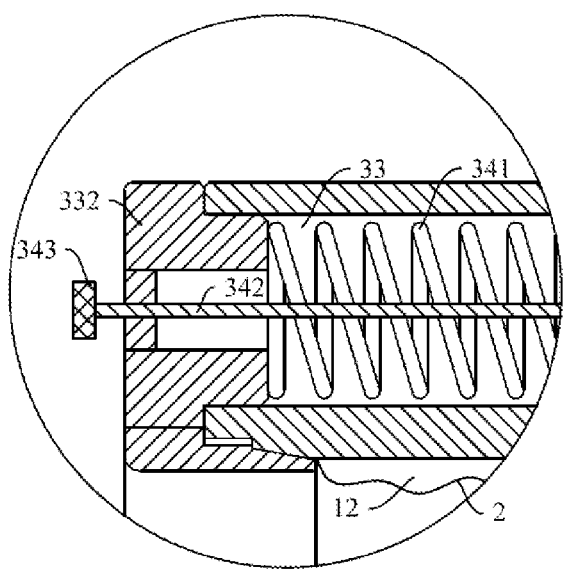
FIG. 3 is a schematic view of a mechanism with an adjusting member.

The sealing membrane 2 has a second state in which it is driven by the fluid to close the instrument passage 11 as shown in FIG. 1c, and the energy storage mechanism 3 releases energy to maintain the fluid pressure to keep the sealing membrane 2 in the second state.

In practice, it is contradictory to select the preset pressure of the fluid in the driving chamber 12 under the presence of the interventional instrument 9 in the instrument passage 11 with respect to the absence of the interventional instrument 9 in the instrument passage 11, for example, in the case where the energy storage mechanism 3 is not provided.

When the interventional instrument 9 enters the hemostasis valve, the sealing membrane 2 needs to open the instrument passage 11 to avoid interference with the interventional instrument 9. The sealing membrane 2 thus works on the fluid in the driving chamber 12. If the preset pressure of the fluid in the driving chamber 12 is too high, the driving force required to deform the sealing membrane 2 will be too high, and a great driving force would be required for the interventional instrument 9 to press the sealing membrane 2 to open the instrument passage 11, which would make the operation inconvenient. If the preset pressure of the fluid in the driving chamber 12 is too low, the closing pressure from the sealing membrane 2 when closing the instrument passage 11 would be insufficient, which would easily cause the sealing failure.

The energy storage mechanism 3 in this embodiment can well solve the above problems. When the interventional instrument 9 enters the hemo stasis valve, the sealing membrane 2 needs to open the instrument passage 11 to avoid interference with the interventional instrument 9. At this time, the sealing membrane 2 will work on the fluid in the driving chamber 12, and the energy storage mechanism 3 will store and absorb the energy from the fluid to reduce the difficulty of the entry of the interventional instrument 9, which provides a good operating experience for the entry of the interventional instrument 9. When the interventional instrument 9 exits the hemo stasis valve, the sealing membrane 2 needs to close the instrument passage 11 to perform hemostasis. At this time, the fluid in the driving chamber 12 will work on the sealing membrane 2, and the energy storage mechanism 3 releases energy to work on the fluid, so as to ensure the sealing effect of the sealing membrane 2 to the instrument passage 11.

When the sealing membrane 2 changes its state, the sealing membrane 2 and the fluid work with each other. In order to ensure the effectiveness of the work done, in one embodiment, the housing 1 has a rigid structure at least at the outer periphery of the driving chamber 12.

The housing 1 can limit the work of the driving chamber 12 in other undesired directions, so as to ensure that all the energy of the fluid works on the sealing membrane 2, thereby improving the deformation and the sealing effect of the sealing membrane 2 under a certain of energy. The rigidity mentioned in this embodiment is relative to the deformable flexible sealing membrane 2, and does not refer to the rigidity of a physically rigid body. In practice, the housing 1 can be made of plastic or the like, which may be slightly deformed under the action of the fluid, but the slight deformation does not affect the effect of the sealing membrane 2. The same applies to the rigidity described below. In various applications, the housing 1 can be made of a common material such as metal, plastic, or can be made of organic material or inorganic material, or can be made of synthetic material or natural material, or the like.

In one embodiment, the housing 1 as a whole is of a rigid structure.

The fluid exerts a force on the surrounding component(s), so that the housing 1 may be deformed when the fluid pressure is high. In the case where the housing 1, as a whole, is not rigid, the housing 1 may be deformed to absorb the energy of the fluid, affecting the working effect of the sealing membrane 2. This embodiment can solve this problem.

In order to facilitate observation of the state of the sealing membrane 2, in one embodiment, the housing 1 is made of a transparent material.

The transparent material is relative to a material the interior of which cannot be observed. Therefore, as long as the internal structure of a material can be observed and this material can meet the requirements for use according to this embodiment, this material should be regarded as the transparent material as described in this embodiment. For example, a translucent material or the like can be regarded as the transparent material as described in this embodiment. In some particular embodiments, the housing 1 can be locally made of a transparent material. For example, an observation window or the like can be provided at a portion where the internal structure needs to be observed. With regard to the engagement between the housing 1 and the sealing membrane 2, in one embodiment, a through-region 13 is opened in the housing 1, and the sealing membrane 2 is arranged in the through-region 13. The driving chamber 12 is formed between the outer periphery of the sealing membrane 2 and the inner wall of the through-region 13.

The through-region 13 accommodates the sealing membrane 2, and thus the effect from the external environment on the interior of the through-region 13 in the other directions except the extension direction of the instrument passage 11 can be avoided, thereby improving the stability of the operation of the sealing membrane 2. At the same time, the through-region 13 functions to provide the driving chamber 12, which improves the integration of the components of the hemo stasis valve, facilitates the control of the size of the hemo stasis valve and the use in the treatment procedure.

In one embodiment, a first end cap 14 and a second end cap 15 are respectively mounted on the two open ends of the through section 13 in a sealing manner, and each end cap is provided with an avoidance hole corresponding to the instrument passage 11. Two axial ends of the sealing membrane 2 are respectively sandwiched and fixed between the housing 1 and the respective end caps on the respective sides.

The first end cap 14 and the second end cap 15 can fix the sealing membrane 2 so that the movement direction of the sealing membrane 2 can be guided. The avoidance hole can further serve as a guide during operation, ensuring the contact between the interventional instrument 9 and the sealing membrane 2 when the former enters the instrument passage 11, thereby reducing the possibility of damage to the sealing membrane 2 caused by the interventional instrument 9.

In one embodiment, one end of the instrument passage 11 is an entrance for the interventional instrument 9 and the other end is an exit for the interventional instrument 9. The end cap on the exit for the interventional instrument 9 is provided with a radially break-through exhaust vent 16.

When using a medical instrument such as a catheter entering the human body, it is usually necessary to remove gas from the interior of the instrument. The exhaust vent 16 can solve the problem of carrying gas before use of the instrument. At the same time, the operator can remove the gas in the hemostasis valve by injecting physiological saline into the exhaust vent 16 before use. Further, the exhaust vent 16 can be further served as an interface that can provide a structural basis for a particular application.

With regard to the arrangement of the exhaust vent 16, in one embodiment, the exhaust vent 16 communicates with an exhaust valve (not shown).

The exhaust valve is directly mounted on the exhaust vent 16 or communicated with the exhaust vent 16 through an external pipe line.

The exhaust valve can be flexibly mounted, depending on different cases. For example, the arrangement in which the exhaust valve is directly mounted to the exhaust vent 16 can improve the integration of the hemo stasis valve and facilitates the operation. Alternatively, the arrangement in which the exhaust valve is connected to the exhaust vent 16 through an external pipe line can reduce the external size of the hemostasis valve and improve the adaptability.

With regard to the assembling of the components, in one embodiment, the end caps are respectively fixed to the housing 1 by screws (not shown).

The end cap needs to provide a relatively closed space within the housing 1, and in some embodiments the end cap needs to fix the sealing membrane 2, so that the assembly stability of the end cap affects the operation stability of the hemostasis valve. Alternatively, the end cap can be installed by means of its own structure. In order to improve the convenience of assembly, screws are preferred.

With regard to the arrangement of the energy storage mechanism 3, in one embodiment, a balancing chamber 31 is further provided in the housing 1, and the driving chamber 12 and the balancing chamber 31 communicate with each other, wherein the fluid in the driving chamber 12 is linked in motion with the energy storage mechanism 3 through the balancing chamber 31.

The balancing chamber 31 functions to constrain the movement of the energy storage mechanism 3. In particular embodiments, the balancing chamber 31 can communicate with the driving chamber 12 over a large area. Therefore, the balancing chamber 31 should be understood from the principle of the energy storage mechanism 3, rather than a space structurally isolated from the driving chamber 12. In one embodiment, for example, the balancing chamber 31 can be opened to communicate with the driving chamber 12 (not shown).

With regard to the arrangement of the balancing chamber 31, in one embodiment, the balancing chamber 31 is located outside the driving chamber 12 in the radial direction of the instrument passage 11.

The driving chamber 12 is a portion for directly driving the sealing membrane 2, so that it is reasonable to provide the driving chamber 12 and the sealing membrane 2 close to each other. The arrangement of providing the balancing chamber 31 outside of the driving chamber 12 in the radial direction of the instrument passage 11 reduces the length of the hemostasis valve in the axial direction of the instrument passage 11, facilitating the operation during treatment.

In one embodiment, the balancing chamber 31 surrounds the outer periphery of the driving chamber 12.

When the interventional instrument 9 enters the instrument passage 11, the fluid is pressed by the sealing membrane 2 and thus radially diffused. The balancing chamber 31 surrounding the outer periphery of the driving chamber 12 can adapt to the diffusion tendency of the fluid, with a good dynamic response.

The balancing chamber 31 can constrain the energy storage mechanism 3. In one embodiment, the driving chamber 12 and the balancing chamber 31 are isolated from each other and communicate with each other only through a balancing hole 311.

The balancing hole 311 is used for allowing the fluid to pass through, so that the energy storage mechanism 3 can store or release the energy from the fluid in the driving chamber 12. The arrangement that the driving chamber 12 and the balancing chamber 31 are isolated from each other can avoid the influence of the fluid in the driving chamber 12 on the operation of the energy storage mechanism 3, thereby improving the operation stability of the energy storage mechanism 3.

With regard to the arrangement of the balancing hole 311, in one embodiment, one end of the instrument passage 11 is the entrance for the interventional instrument 9 and the other end is the exit for the interventional instrument 9, and the balancing hole 311 is adjacent to the exit for the interventional instrument 9.

The instrument passage 11 is a passage through which the interventional instrument 9 enters the hemostasis valve. When the interventional instrument 9 enters the hemostasis valve, the interventional instrument 9 first contacts a portion of the sealing membrane 2. Accordingly, the fluid in the driving chamber 12 will be gradually influenced by the interventional instrument 9. The balancing hole 311 adjacent to the exit for the interventional instrument 9 allows the fluid to adapt to the entry of the interventional instrument 9 into the hemostasis valve and thus the dynamic changes of the fluid can be better reflected through the balancing hole 311 into the balancing chamber 31.

In order to better regulate the fluid pressure, in one embodiment, the chamber wall of the balancing chamber 31 or the driving chamber 12 is provided with a first pressure regulating hole 32.

The first pressure regulating hole 32 allows a pressure regulation of the interior of the driving chamber 12 from the external. In some applications, an external pressure source can be provided to regulate the pressure of the fluid in the driving chamber 12. At the same time, the first pressure regulating hole 32 can be further served as an interface that can provide a structural basis for a particular application.

In one embodiment, the first pressure regulating hole 32 communicates with a first regulating valve (not shown).

The first regulating valve is directly mounted to the first pressure regulating hole 32 or communicated with the first pressure regulating hole 32 through an external pipe line.

The first regulating valve can be flexibly mounted, depending on different cases. For example, the arrangement in which the first regulating valve is directly mounted to the first pressure regulating hole 32 can improve the integration of the hemostasis valve and facilitates the operations of the operator such as the medical worker. Alternatively, the arrangement in which the first regulating valve is connected to the first pressure regulating hole 32 through an external pipe line can reduce the external size of the hemostasis valve and improve the adaptability.

In a further optimization of the energy storage mechanism 3, the energy storage mechanism 3 includes an energy storage chamber 33 and an energy storage element arranged in the energy storage chamber 33. The energy storage element stores or releases energy when the state of the sealing membrane 2 changes, and drives the sealing membrane 2 to close the instrument passage 11 when releasing energy.

Specifically, in one embodiment, the energy storage mechanism 3 includes:

an energy storage chamber 33; a balancing chamber 31 is further provided in the housing 1, and the driving chamber 12 and the balancing chamber 31 are communicated with each other;

a piston 34, slidably arranged between the balancing chamber 31 and the energy storage chamber 33 in a sealing manner; and an energy storage element, which is a compressible gas and/or a spring member located in the energy storage chamber 33 and interacting with the piston 34.

In this embodiment, the piston 34 moves so as to realize the energy storage or release of the energy storage mechanism 3. During the energy storage process, energy is absorbed by the compressible gas and/or the spring member 341, and during the energy release process, the compressible gas and/or the spring member 341 does work to release energy. The energy storage chamber 33 is a functional term in connection with the energy storage process of the energy storage mechanism 3. During the energy release process, the energy storage element in the energy storage chamber 33 actually functions to release energy.

The piston 34 is configured to slide between the balancing chamber 31 and the energy storage chamber 33 in a sealing manner. In fact, the piston 34 serves as a division boundary between the balancing chamber 31 and the energy storage chamber 33, so that the space of the balancing chamber 31 and the energy storage chamber 33 relatively changes. When the energy storage mechanism 3 releases energy, the piston 34 moves toward the balancing chamber 31, and part of the balancing chamber 31 becomes part of the energy storage chamber 33. When the energy storage mechanism 3 storages energy, the piston 34 moves toward the energy storage chamber 33, and part of the energy storage chamber becomes part of the balancing chamber 31. The piston 34 provided in a sealing manner prevents the fluid in the balancing chamber 31, and thus the fluid in the driving chamber 12, from entering the energy storage chamber 33, which is especially important in the case where the hemostasis valve is not connected to an external pressure source. During some treatments, the energy storage mechanism 3 may have to be adjusted accordingly. In one embodiment, the chamber wall of the energy storage chamber 33 is provided with a second pressure regulating hole 331.

The second pressure regulating hole 331 allows to adjust the stored energy of the energy storage mechanism 3, so as to perform fine adjustment according to different treatment procedures and improve the adaptability of the hemostasis valve. At the same time, the second pressure regulating hole 331 can be further served as an interface that can provide a structural basis for a particular application.

In one embodiment, one end of the instrument passage 11 is the entrance for the interventional instrument 9 and the other end is the exit for the interventional instrument 9, and in the axial direction of the instrument passage 11, the balancing chamber 31 is adjacent to the exit for the interventional instrument 9, and the energy storage chamber 33 is adjacent to the entrance for the interventional instrument 9.

The instrument passage 11 is a passage through which the interventional instrument 9 enters the hemostasis valve. When the interventional instrument 9 enters the hemostasis valve, the interventional instrument 9 first contacts a portion of the sealing membrane 2. Accordingly, the fluid in the driving chamber 12 will be gradually influenced by the interventional instrument 9. The balancing chamber 31 is the portion directly communicated with the driving chamber 12, so that balancing chamber 31 adjacent to the exit for the interventional instrument 9 allows the fluid to adapt to the entry of the interventional instrument 9 into the hemostasis valve and thus the dynamic changes of the fluid can be better reflected through the balancing chamber 31 into the energy storage mechanism 3.

In one embodiment, the energy storage chamber 33 has an open structure on a side facing away from the balancing chamber 31 and a third end cap 332 is arranged there in a sealing manner, and a second pressure regulating hole 331 is provided in the third end cap 332.

The third end cap 332 forms the side wall of the energy storage chamber 33, so it is important to assemble the third end cap 332 in a sealing manner to maintain the pressure in the energy storage chamber 33. At the same time, the second pressure regulating hole 331 is provided in the third end cap 332 so as to avoid opening a hole in the energy storage chamber 33, thereby reducing the process difficulty and avoiding the possibility of leakage.

With regard to the arrangement of the second pressure regulating hole 331, in one embodiment, the second pressure regulating hole 331 communicates with a second regulating valve (not shown);

The second regulating valve is directly mounted to the second pressure regulating hole 331 or communicated with the second pressure regulating hole 331 through an external pipe line.

The second regulating valve can be flexibly mounted, depending on different cases. For example, the arrangement in which the second regulating valve is directly mounted to the second pressure regulating hole 331 can improve the integration of the hemostasis valve and facilitates the operations of the operator such as the medical worker. Alternatively, the arrangement in which the second regulating valve is connected to the second pressure regulating hole 331 through an external pipe line can reduce the external size of the hemo stasis valve and improve the adaptability.

With regard to the detailed structure of the energy storage chamber 33, in one embodiment, an adjusting member 342 is disposed in the energy storage chamber 33 and abuts against the spring member 341, and at least a portion of the adjusting member 342 is exposed outside the energy storage chamber 33 as an adjusting and operating portion 343.

The adjusting member 342 functions to adjust the parameters of the spring member 341 such as the preload and the spring-back speed, so that the operator such as the medical worker can adjust the parameters of the hemo stasis valve to adapt to different treatment procedures. The adjusting and operating portion 343 is exposed outside the energy storage chamber 33 for convenient operation, so that disassembly of the hemostasis valve is avoided, and fine adjustment in the treatment procedure can be realized. In the case where the spring member 341 is not provided, the second pressure regulating hole 331 communicating with the energy storage chamber 33 can be regarded as an alternative of the adjusting member 342.

With regard to the assembly of the adjusting member 342, in one embodiment, the energy storage chamber 33 has an open structure on the side facing away from the balancing chamber 31 and a third end cap 332 is mounted there in a sealing manner, and the adjusting member 342 is disposed on the third end cap 332.

The third end cap 332 is fixed to the housing 1, with a good strength, capable of bearing the load from the spring member 341, and is easy to be adjusted and assembled.

With regard to the detailed structure of the adjusting member 342, in one embodiment, the adjusting member 342 is an adjusting screw engaged with the chamber wall of the energy storage chamber 33 in a thread fit. The head portion of the adjusting screw is used as the adjusting and operating portion 343, and the end of the adjusting screw opposite to the head portion abuts against the spring member 341.

The adjusting screw is simple and reliable, and the most importantly, is high in adjusting precision, which is convenient for the operator such as the medical worker to finely adjust the working parameters of hemostasis valve. At the same time, the thread fit allows a sealing fit to be conveniently realized in addition to realizing adjustment.

With regard to the detailed arrangement of the piston 34, in one embodiment, the movement direction of the piston 34 and the extension direction of the instrument passage 11 are parallel to or at an angle to each other.

The piston 34 functions to transmit the pressure of the fluid to the energy storage mechanism 3, and the movement direction thereof does not affect the function of the piston 34, but relates to the overall arrangement of the hemostasis valve. In practice, the piston 34 can be arranged as required. For example, the distribution in which the movement direction of the piston 34 and the extension direction of the instrument passage 11 are parallel to each other results in a more regular overall configuration. For another example, the distribution in which the movement direction of the piston 34 is at an angle to the extension direction of the instrument passage 11 results in a more compact and practical overall configuration in some particular applications.

The energy storage mechanism 3 can operate by using other structures. In one embodiment, the energy storage element is an elastic balloon disposed inside or outside the energy storage chamber. In the figure, the balancing chamber 31 is used to provide the function of the energy storage chamber. The elastic balloon 35 can cooperatively store or release energy, thereby further improving the energy storage or release.

Specifically, in one embodiment, the elastic balloon 35 is suspended in the balancing chamber 31 or fixed to the chamber wall of the balancing chamber 31.

The elastic balloon 35 is self-deformed to storage and release energy, and thus various fixing methods can be used.

Figure 5A:
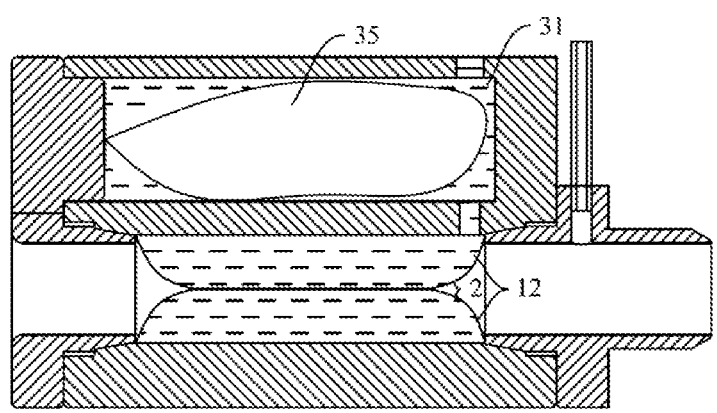
FIG. 5a is a schematic view of another embodiment of the hemostasis valve shown in FIG. 4a in an working state.
Figure 5B:
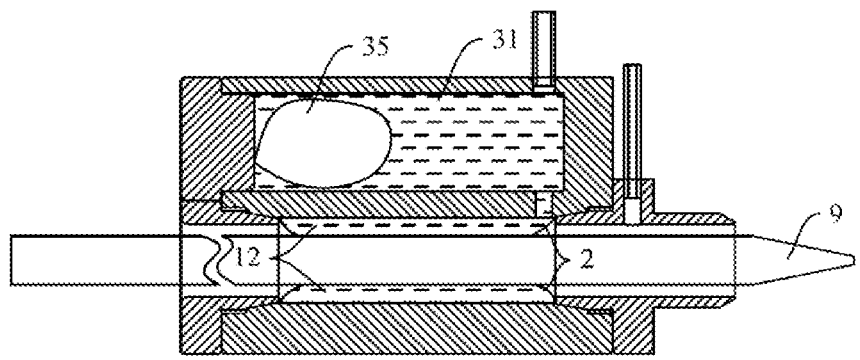
Figure 5C:
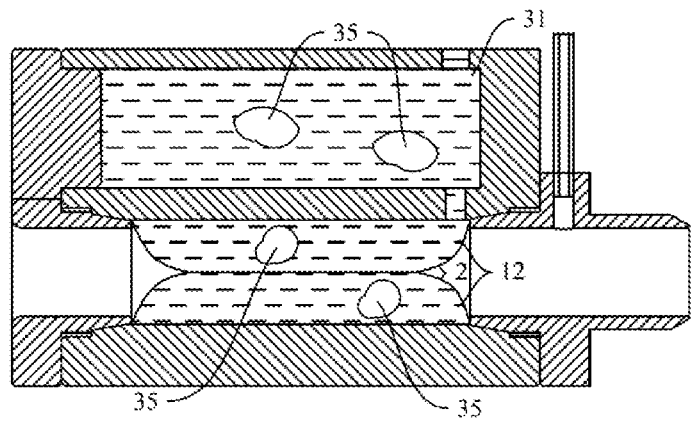
FIG. 5c is a schematic view of a further embodiment of the hemostasis valve shown in FIG. 4a in an working state.

For example, referring to FIG. 5c, a plurality of elastic balloons 35 are suspended within the balancing chamber 31. This arrangement allows the elastic balloons 35 to sufficiently deform, and the change in position of the elastic balloon 35 can be used to provide an additional function in some special applications. For example, the change in position of the elastic balloon 35 can be used to indicate the change in the density of the fluid in the balancing chamber 31. It should be noted that the suspension is relative to fixation, the specific position of the elastic balloon 35 within the energy storage chamber 33 is determined according to the density of the medium stored in the elastic balloon 35 and the density of the medium in the energy storage chamber 33.

Referring again, for example, to FIGS. 4a-5b, the elastic balloon 35 is fixed to the chamber wall of the balancing chamber 31. This arrangement enables the position of the elastic balloon 35 to be fixed, avoiding damage to the elastic balloon 35 caused by the friction between the elastic balloon 35 and the balancing chamber 31 during storage or in use.

Figure 4A:
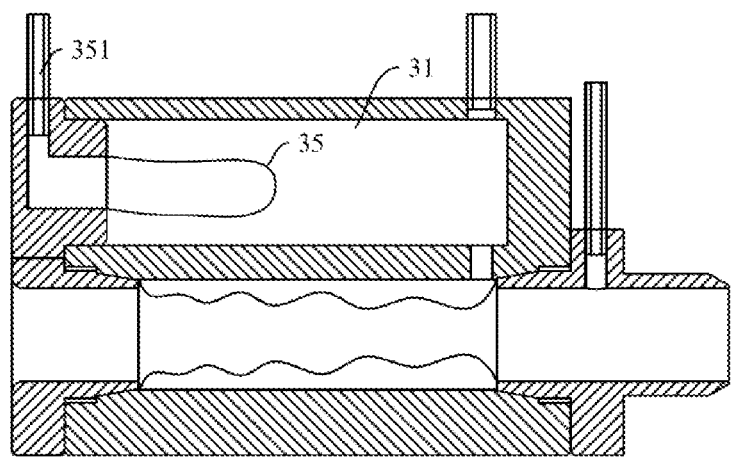
FIG. 4a is a schematic view of a further embodiment of a hemostasis valve in an initial state.
Figure 4B:
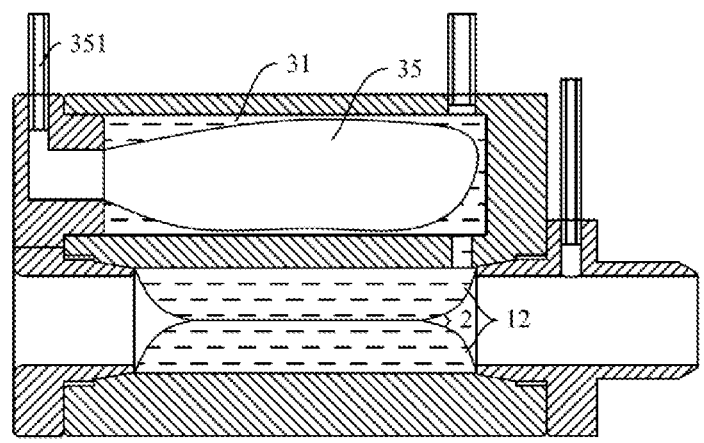
FIG. 4b is a schematic view of the hemostasis valve shown in FIG. 4a in the working state.
Figure 4C:
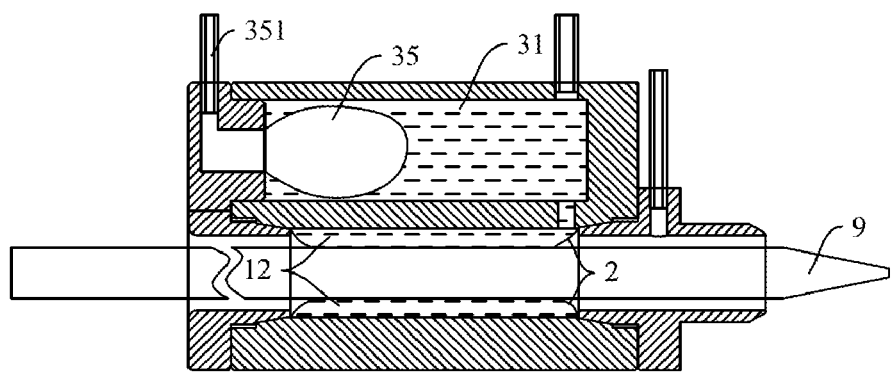
FIG. 4c is a schematic view of the instrument entering the hemostasis valve shown in FIG. 4b.

Referring to FIGS. 4a to 4c, in one embodiment, the elastic balloon 35 is fixed to the chamber wall of the balancing chamber 31, and a third pressure regulating hole 351 communicating with the elastic balloon 35 is opened in the chamber wall of the balancing chamber 31.

The third pressure regulating hole 351 allows a pressure regulation of the interior of the elastic balloon 35 from the external. In some applications, an external pressure source can be provided to regulate the pressure of the fluid in the elastic balloon 35. At the same time, the third pressure regulating hole 351 can be further served as an interface that can provide a structural basis for a particular application.

In one embodiment, a third regulating valve (not shown) is communicated with the third pressure regulating hole 351.

The third regulating valve is directly mounted to the third pressure regulating hole 351 or communicated with the third pressure regulating hole 351 through an external pipe line.

The third regulating valve can be flexibly mounted, depending on different cases. For example, the arrangement in which the third regulating valve is directly mounted to the third pressure regulating hole 351 can improve the integration of the hemostasis valve and facilitates the operations of the operator such as the medical worker. Alternatively, the arrangement in which the third regulating valve is connected to the third pressure regulating hole 351 through an external pipe line can reduce the external size of the hemostasis valve and improve the adaptability.

With regard to the detailed structure of the elastic balloon 35, in one embodiment, the elastic balloon 35 is a hollow structure filled with gas, and stores or releases the energy by means of the gas.

Compared with other elastic arrangements, the gas has a greater amount of deformation, and is easier to storage or release energy, and the elastic balloon 35 enables to confine the gas and reduce the risk of impact on the interventional procedure.

In one embodiment, the elastic balloon 35 is made of an elastic material, and stores or releases energy by deformation of the elastic material.

The elastic balloon 35 itself is made of an elastic material, which can avoid the influence of the gas on the interventional procedure and provide a safer interventional procedure. More importantly, by using the elasticity of the elastic balloon itself, a different technical effect from other embodiments can be realized. For example, a release hole can be opened in the housing and covered with an elastic balloon, wherein the fluid enters the elastic balloon under the pressure of the sealing membrane and drives the elastic balloon to deform and store energy, and in the energy release process, the elastic balloon deforms itself to press the fluid inside back into the housing, thereby releasing energy.

As exemplified above, in some cases, the energy storage element provided in the energy storage chamber 33 can be modified. The following several exemplary embodiments are therefore to be understood as equivalents of the present application.

A release hole is opened in the housing, and an elastic member covers over the release hole. The fluid enters the elastic balloon under the pressure of the sealing membrane and drives the elastic balloon to deform and store energy, which is similar to the process of blowing a common balloon, in which the elastic member expands the volume of the energy storage chamber; and in the energy release process, the elastic balloon self-deforms to press the internal fluid back to the housing, thereby realizing energy release. In this embodiment, the energy storage element is located at the edge of the energy storage chamber 33, and it can be understood that the energy storage element expands and enlarges the energy storage chamber during the energy storage process.

The energy storage element is a tension spring, which is arranged at the location of the balancing chamber shown in the figure. The fluid enters the energy storage chamber under the pressure of the sealing membrane and drives the tension spring to stretch and storage the energy, in which case the balancing chamber actually functions as an energy storage chamber. The energy storage chamber should be defined in terms of its actual function. In some arrangements, the energy storage chamber and the balancing chamber may share the same chamber.

Figure 6A:
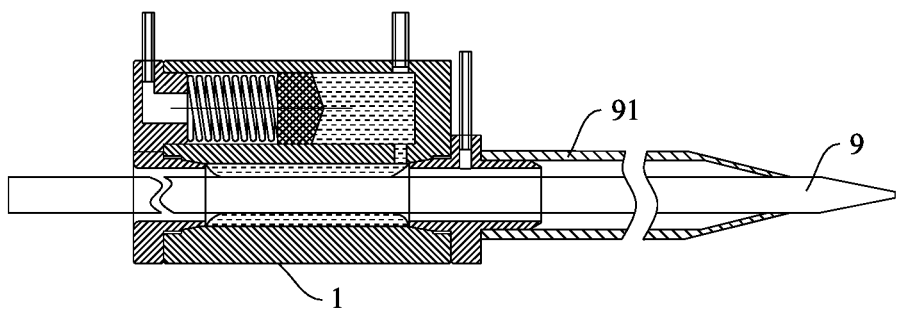
FIG. 6a and FIG. 6b are schematic views of the engagement between the sheath and the hemostasis valve of an embodiment of the catheter sheath.
Figure 6B:
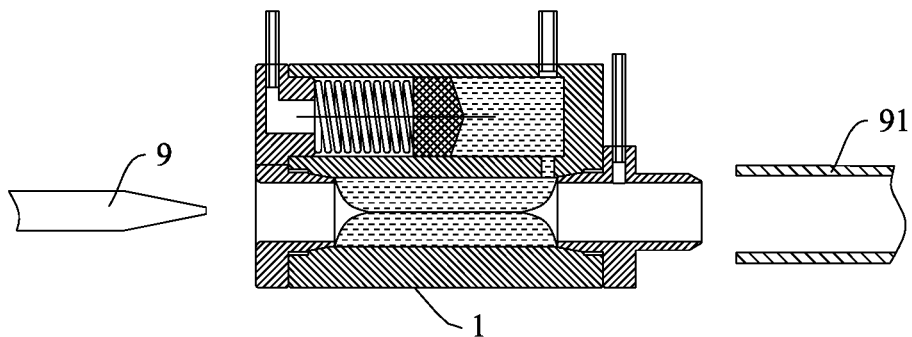

Referring to FIGS. 6a and 6b, the present application further discloses a catheter sheath including a sheath 91 and a hemostasis valve which are docked and communicated with each other, wherein the hemostasis valve is any one of the embodiments of the hemostasis valve as described above.

The sheath 91 is configured to be inserted into the interior of the human body, the hemostasis valve is configured to close the sheath, and the interventional instrument 9 is configured to enter the sheath 91 through the hemostasis valve, thereby entering the interior of the human body to perform treatment.

In one embodiment, the hemostasis valve is provided with a pipe joint connected to the sheath 91. The pipe joint is engaged with the sheath 91 through a sealing element, and is provided with an engaging structure for preventing separation of the sheath 91 from the pipe joint. In the present embodiment, the pipe joint is formed by an extension of the second end cap 15. By means of the engaging structure, it is possible to quickly assemble the sheath 91 and the hemostasis valve, and to separate the sheath 91 from the hemostasis valve in emergency.

In detail, the head of the sheath 91 is provided with a developing point, so that the medical worker can perform the procedure with the help of the medical equipment.

In use of the hemostasis valve, the sheath and the hemostasis valve are docked and communicated with each other to form an instrument passage 11. The sheath and the end caps on the two sides can be formed in one piece or separately. The end caps respectively extend away from the hemostasis valve and in the axial direction of the instrument passage 11, thereby further enclosing the instrument passage 11 for the passage of the interventional instrument 9.

The present application further disclose a method for sealing an interventional instrument, including providing an instrument passage with a deformable sealing membrane, and driving the sealing membrane to deform by fluid at the outer periphery of the sealing membrane to seal/close the instrument passage, wherein in the process of entry and exit the instrument passage of the interventional instrument, an energy storage mechanism linked in motion with the fluid is used to store or release energy when the sealing membrane is deformed, so as to maintain the sealing between the interventional instrument and the instrument passage.

In one embodiment, the method for sealing the interventional instrument is implemented by means of the hemostasis valves as described above. The detailed structure of the hemostasis valve refers to the above description, and will not be repeated here.

Figure 7A:
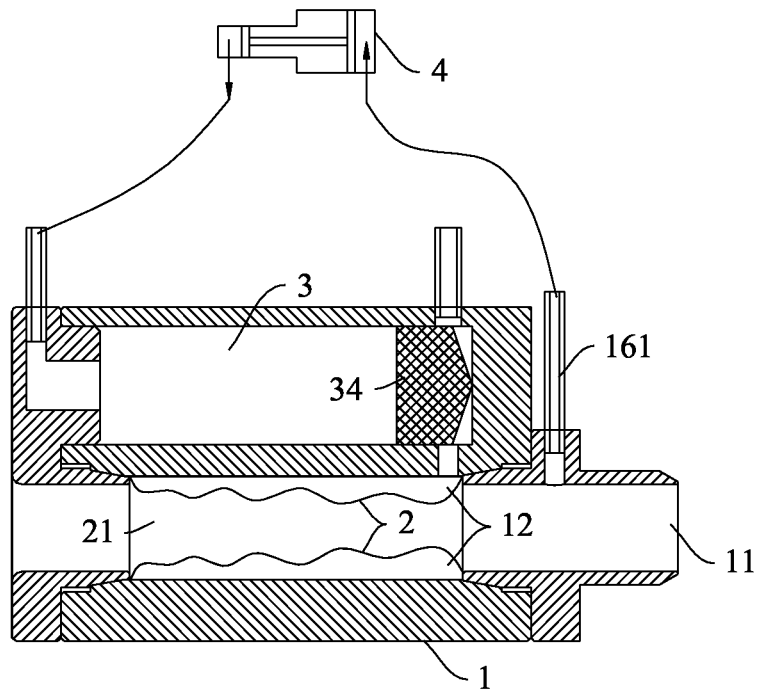
FIG. 7a is a schematic view of an embodiment of the hemostasis valve in an initial state.
Figure 7B:
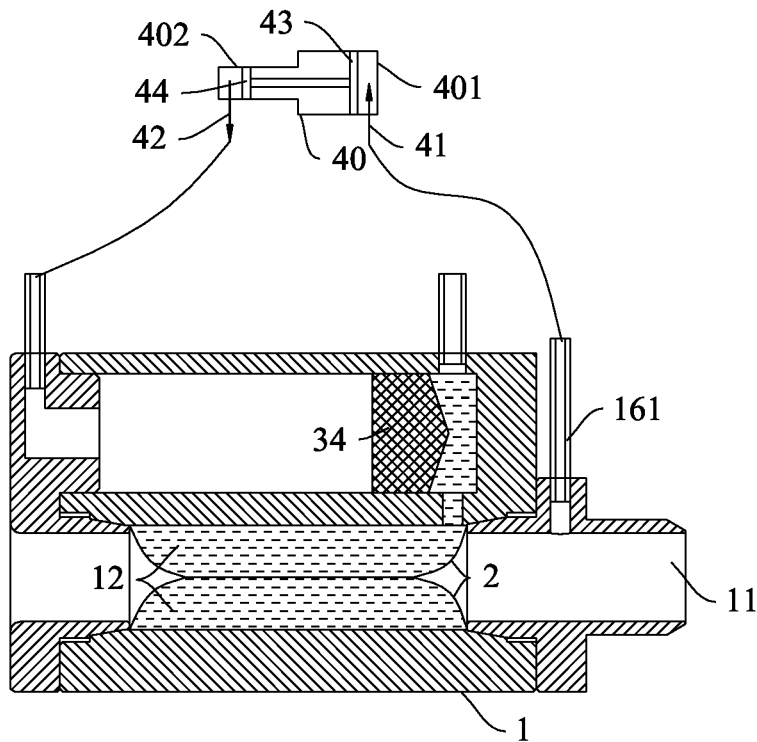
FIG. 7b is a schematic view of the hemostasis valve shown in FIG. 7a in a filled state.
Figure 7C:
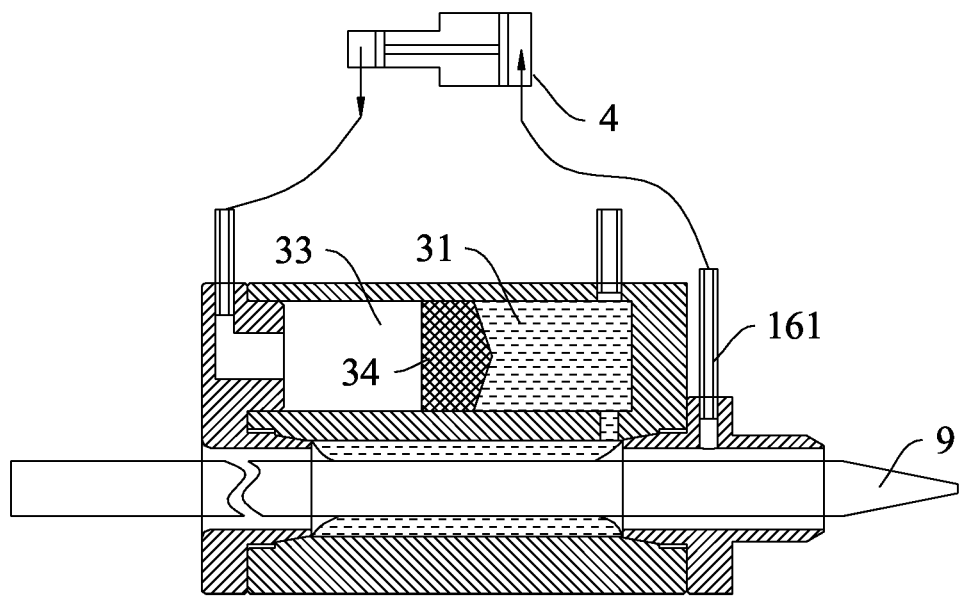
FIG. 7c is a schematic view of the hemostasis valve shown in FIG. 7a in an working state.

Referring to FIGS. 7a to 7c, the present application discloses a hemostasis valve including a housing 1 and a sealing membrane 2 provided in the housing 1 and having a tubular structure. A lumen 21 of the tubular structure serves as an instrument passage 11 and passes through the housing 1. A driving chamber 12 is provided within the housing 1 surrounding the sealing membrane 2 for filling fluid. The hemostasis valve further includes a pressure increase mechanism 4 for feeding back the change in blood pressure to the fluid.

The sealing membrane 2 separates two separate spaces within the housing 1, i.e., the instrument passage 11 and the driving chamber 12, which are isolated by the sealing membrane 2. The instrument passage 11 is open at two ends thereof for passage of an instrument.

It should be noted that the tubular structure of the sealing membrane 2 herein is not strictly limited to a round tube. In practice, the lumen diameter of the sealing membrane 2 may vary in the axial direction. In the cross section, the lumen of the sealing membrane 2 may have a regular shape such as a rectangular shape, or a shape with changed ends such as an hourglass shape, a pear shape, a spherical shape, or an irregular shape.

In one embodiment, the lumen of the sealing membrane 2 is provided with a hydrophilic lubricating coating (not shown). The lumen of the sealing membrane 2 is the portion in contact with the interventional instrument 9 in practice. The hydrophilic lubricating coating can reduce the friction force of the lumen of the sealing membrane 2, facilitating the passage of the interventional instrument 9 through the instrument passage 11 in the presence of a pressure differential inside and outside the sealing membrane 2. Further, the hydrophilic lubricating coating can also realize other function by adjusting the coating material.

With regard to the linkage in motion, the driving chamber 12 can drive the sealing membrane 2 to change its state, thereby closing or opening the instrument passage 11. The instrument passage 11 is a passage through which the interventional instrument 9, such as a catheter, a guide wire, or the like, enters and exits the human body during an interventional treatment. Therefore, it can be understood that the area surrounded by the tubular structure forms at least part of the instrument passage 11. In order to allow the entry of the interventional instrument 9, corresponding entrance and exit communicating with the instrument passage 11 can be opened in the housing 1, in which case the instrument passage 11 can also be regarded as passing through the housing 1. The driving chamber 12 functions to confine the fluid and direct the work from the fluid onto the sealing membrane 2. When the sealing membrane 2 closes the instrument passage 11, at least a portion of the tubular structure of the sealing membrane 2 tends to move radially, thereby reducing the lumen diameter of the instrument passage 11 to close the instrument passage 11. No matter the instrument is in or out of the instrument passage 11, the sealing membrane 2 can close the instrument passage 11 or open the instrument passage 11.

When the interventional instrument is located in the instrument passage 11, the sealing membrane 2 moves radially until the walls of the lumen 21 engages with the instrument so as to close the instrument passage 11.

When the interventional instrument is not in the instrument passage 11, the sealing membrane 2 moves radially until the walls of the lumen 21 contact against with each other so as to close the instrument passage 11.

In principle, the fluid drives the sealing membrane 2 primarily by pressure. When the fluid pressure in the driving chamber 12 is sufficient to overcome the resistance in the instrument passage 11, the driving chamber 12 can drive the sealing membrane 2 to deform to change the lumen 21 of the sealing membrane 2. The closing effect of the instrument passage 11 depends on the fluid pressure in the driving chamber 12. The fluid pressure in the driving chamber 12 can be changed by means of various methods, for example, by connecting an external pressure source, changing the fluid temperature, changing the physical properties of the fluid, or the like. In the present embodiment, the pressure increase mechanism 4 feeds back the blood pressure at one end of the hemostasis valve to the fluid, thereby changing the fluid pressure in the driving chamber 12 to further adjust the working state of the sealing membrane 2, thereby adjusting the closing effect of the instrument passage 11. This design can improve the effect of the sealing membrane 2 closing the instrument passage 11 when the interventional instrument 9 moves relative to the sealing membrane 2, improve the operating experience of the operator such as medical worker, provide a stable treatment procedure, and improve the effect of the treatment.

The housing 1 can limit the work of the driving chamber 12 in other undesired directions, so as to ensure that all the energy of the fluid works on the sealing membrane 2, thereby improving the deformation and the sealing effect of the sealing membrane 2 under a certain of energy. The rigidity mentioned in this embodiment is relative to the deformable flexible sealing membrane 2, and does not refer to the rigidity of a physically rigid body. In practice, the housing 1 can be made of plastic or the like, which may be slightly deformed under the action of the fluid, but the slight deformation does not affect the effect of the sealing membrane 2. The same applies to the rigidity described below. In various applications, the housing 1 can be made of a common material such as metal, plastic, or can be made of organic material or inorganic material, or can be made of synthetic material or natural material, or the like.

With regard to the specific arrangement of the pressure increase mechanism 4, in one embodiment, the pressure increase mechanism 4 has an input port 41 for collecting blood pressure, and an output port 42 posterior to the pressure being increased. The output of the pressure increase mechanism 4 acts directly or indirectly on the fluid in the driving chamber 12.

The energy input to the pressure increase mechanism comes from blood pressure, so a connection with the interior of the human body needs to be established. In the application of the hemostasis valve, the blood inside the human body can be easily accessed. Therefore, the pressure increase mechanism 4 can feed back the change in the blood pressure to the fluid through a simple communication. In the feedback process, the pressure increase mechanism 4 can act directly with the fluid, or be indirectly linked in motion with the fluid via transmission of components.

With regard to the structure of the pressure increase mechanism, in one embodiment, the pressure increase mechanism 4 includes a support body 40. Two cylindrical chambers having different cylinder diameters are defined inside the support body 40. Sliders are respectively and slidably arranged in the respective cylindrical chambers in a sealing manner. The sliders in the two cylindrical chambers are linked in motion with each other.

The input port 41 communicates with a first cylindrical chamber 401 having a larger cylinder diameter, and the output port 42 communicates with a second cylindrical chamber 402 having a smaller cylinder diameter.

The support body 40 provides a stable working environment, and the two cylindrical chambers can restrict the working stroke of the respective sliders. The slider acts with the fluid in the respective cylindrical chambers to transmit energy. It should be noted that the larger cylinder diameter of the first cylindrical chamber 401 and the smaller cylinder diameter of the second cylindrical chamber 402 refer to the comparison result between the first cylindrical chamber 401 and the second cylindrical chamber 402. The same applies below.

The two cylindrical chambers have different cylinder diameters, so that the pressure can be adjusted. Depending on the practical applications, the response between the blood pressure and the fluid can be adjusted.

The linkage in motion between the sliders in the two cylindrical chambers can be achieved by various methods. For example, in one embodiment, the sliders in the two cylindrical chambers are connected by a solid part, or by filling fluid there between. In one embodiment, the two cylindrical chambers communicate with each other, and the communicating portion is a linkage chamber located between the two sliders, in which the two sliders are linked in motion with each other by a common medium pressure in the linkage chamber 442. Alternatively, the two sliders are linked in motion with each other by an energy field or a force field, for example, in one embodiment, the sliders in the two cylindrical chambers are linked in motion with each other by a magnetic field.

Figure 10A:
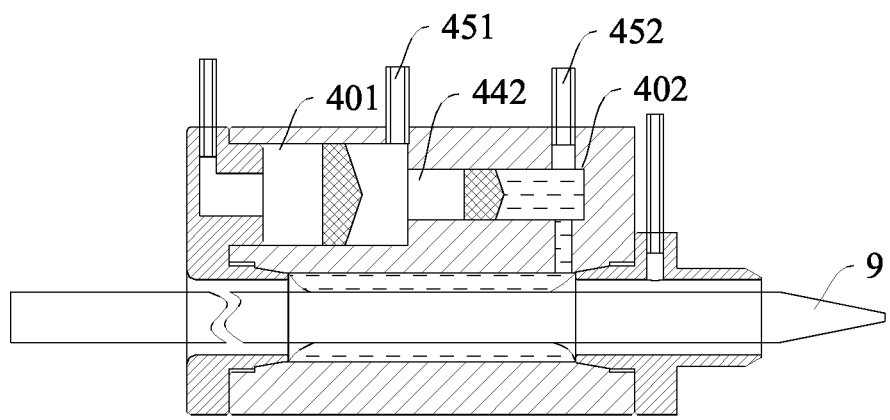
FIG. 10a is a schematic view of a pressure increase mechanism disposed in a hemostasis valve according to an embodiment.

Specifically, referring to FIG. 10a, in one embodiment, the slider in the first cylindrical chamber 401 is a first slider 43, wherein one side of the first slider 43 is an input chamber 431 communicating with the input port 41, and the other side is a common linkage chamber 442; and the slider in the second cylindrical chamber 402 is a second slider 44, wherein one side of the second slider 44 is an output chamber 441 communicating with the output port 42, and the other side is the common linkage chamber 442.

The common linkage chamber 442 functions to provide a space for the movement of the linked sliders in the two cylindrical chambers. When the sliders in the two cylindrical chambers move, the input chamber 431, the common linkage chamber 442 and the output chamber 441 may change. For example, when the first slider 43 is driven by the blood pressure to move towards the second slider 44, a space originally belonging to the common linkage chamber 442 is compressed and becomes a space of the input chamber 431.

Figure 8:
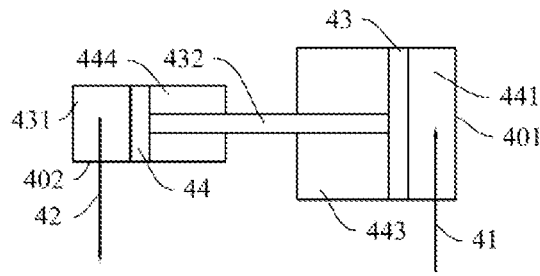
FIG. 8 is a schematic view of another embodiment of a pressure increase mechanism.

The common linkage chamber 442 can be modified to be separate linkage chambers. Referring to FIG. 8, in one embodiment, the two cylindrical chambers are isolated from each other, and the two sliders are directly connected by a connecting member 432, two ends of which are inserted into the respective cylindrical chambers in a sealing manner and connected to the respective sliders.

In one embodiment, the slider in the first cylindrical chamber 401 is a first slider 43, wherein one side of the first slider 43 is an input chamber 431 communicating with the input port 41, and the other side is a first linkage chamber 443.

The slider in the second cylindrical chamber 402 is a second slider 44, wherein one side of the second slider 44 is an output chamber 441 communicating with the output port 42, and the other side is a second linkage chamber 444.

The two ends of the connecting member 432 are inserted into the respective cylindrical chambers in a sealing manner and connected to the respective sliders.

The separate linkage chambers facilitate the arrangement of the pressure increase mechanism 4, so that the overall configuration of the hemostasis valve can be adjusted for different treatment cases.

The energy for the pressure increase mechanism 4 comes from the blood pressure. With regard to the configuration for input, in one embodiment, the hemostasis valve is provided with a blood pressure feedback hole 161 which can communicate with the blood vessel in use. The blood pressure feedback hole 161 communicates with the input port 41 through a feedback pipe line.

The blood pressure feedback hole 161 allows the blood pressure to be transmitted to the pressure increase mechanism 4, thereby transmitting the energy from the blood pressure to the pressure increase mechanism 4.

In principle, the blood pressure feedback hole 161 should be provided on the side of the hemostasis valve close to the human body, so as to achieve hemostasis while meeting the requirements for the use of the pressure increase mechanism 4. Specifically, in one embodiment, one end of the instrument passage 11 is an entrance for instrument and the other end is an exit for instrument, and the blood pressure feedback hole 161 is located adjacent to the exit for instrument.

The exit for instrument is closer to the human body, and the blood pressure feedback hole 161 is adjacent to the exit for instrument to facilitate the connection with the blood of the human body. In addition, the energy from the blood pressure can be transmitted to the pressure increase mechanism 4 by a shorter pipe line, so that the pressure increase mechanism 4 can work better dynamically.

In one embodiment, the hemostasis valve is provided with an exhaust vent (not shown), which is configured separately from the blood pressure feedback hole 161.

When using a medical instrument such as a catheter in the human body, it is usually necessary to remove gas from the interior of the instrument. The exhaust vent can solve the problem of the instrument carrying gas before use. At the same time, the operator can remove the gas in the hemostasis valve by injecting physiological saline into the exhaust vent 16 before use. Furthermore, the exhaust vent can be further served as an interface that can provide a structural basis for a particular application. Whether the exhaust vent and the blood pressure feedback hole 161 are separately arranged result in different advantages and limitations, which can be determined as desired. For example, the arrangement of the exhaust vent and the blood pressure feedback hole 161 separately provided can prevent the influence from the gas in the exhaust vent on the blood and improve the safety. In some applications, the exhaust vent and the blood pressure feedback hole 161 can be the same. In one embodiment, the hemostasis valve is provided with an exhaust vent which also serves as the blood pressure feedback hole 161, an exhaust bypass is communicated with the feedback pipe line, and the exhaust bypass is provided with an exhaust valve.

The exhaust vent also serves as the blood pressure feedback hole 161, which can improve the integration of the components of the hemostasis valve, and facilitates the control of the size of the hemostasis valve while increasing the functions. The exhaust gas from the exhaust valve can be further used for the pressure increase mechanism 4 to achieve a better closure of the instrument passage 11. It should be noted that a structure such as a one-way valve is required to avoid the influence from the gas discharged from the exhaust valve on the blood in the human body.

The exhaust valve can be flexibly arranged, depending on different cases. For example, the exhaust valve can be directly installed in the exhaust vent to improve the integration of the hemostasis valve and facilitate the operations of the operator such as the medical worker, or the exhaust valve can be connected to the exhaust vent through an external pipe line to further reduce the external size of the hemostasis valve and improve the adaptability.

With regard to the arrangement of the pressure increase mechanism 4, in one embodiment, the support body 40 and the housing 1 are formed in one piece or separate from each other.

Referring to FIG. 8, the support body 40 and the housing 1 are separate from each other so that the pressure increase mechanism 4 can be flexibly arranged with respect to the housing 1, thereby providing a more flexible hemostasis valve for the interventional site and improving the adaptability. Referring to FIG. 7a and FIG. 10a, the support body 40 and the housing 1 are formed in one piece so that the pressure increase mechanism 4 and the housing 1 can be formed in one piece, thereby reducing the arrangement of the pipe lines and the like for communication, facilitating the operations of the operator such as the medical worker, while reducing the risk of accident, especially related to the pipe line having pressure.

With regard to the detail of the interior of the pressure increase mechanism, in one embodiment, the two cylindrical chambers are arranged coaxially, side-by-side or one inserted into another.

Different arrangements of the two cylindrical chambers have different technical effects. For example, the arrangement of the two cylindrical chambers arranged coaxially can facilitate the arrangement of the two linked sliders, thereby reducing the difficulty of manufacture and assembly. For example, the arrangement of the two cylindrical chambers arranged side by side can effectively control the length of the pressure increase mechanism 4 in the sliding direction of the sliders, thereby improving the overall configuration of the hemostasis valve. For example, the arrangement of the two cylindrical chambers inserted one in another can effectively control the size of the pressure increase mechanism 4 in the sliding direction of the sliders and in the radial direction of the sliding direction of the sliders, thereby further improving the overall configuration of the hemostasis valve. The specific arrangement can be determined according to the requirements for different applications of the hemostasis valve.

From another perspective, in one embodiment, the two cylindrical chambers are arranged so that the axes of the two cylindrical chambers are parallel or oblique or perpendicular to each other.

The two cylindrical chambers function to transmit the pressure of blood to the fluid. The distribution of the axes of the two cylindrical chambers does not affect the functions of the two cylindrical chambers, but is more concerned with the overall configuration of the hemostasis valve. In practice, the axes of the two cylindrical chambers can be distributed as required. For example, the distribution that the axes of the two cylindrical chambers are parallel to each other can result in a more regular overall arrangement. For example, the distribution that the axes of the two cylindrical chambers are oblique or perpendicular to each other can result in a more compact and practical overall configuration in some particular applications.

Regardless of the arrangement of the two cylindrical chambers, the primary purpose of the pressure increase mechanism 4 is to reflect the blood pressure to the fluid, and in one embodiment, the output port 42 of the pressure increase mechanism 4 is in communication with the driving chamber 12.

The driving chamber 12 is configured to directly drive the sealing membrane 2 to deform, and the output port 42 of the pressure increase mechanism 4 communicates with the driving chamber 12, so that the change in the blood pressure can be directly reflected to the fluid in the driving chamber 12, thereby providing a more sensitive performance.

Figure 10B:
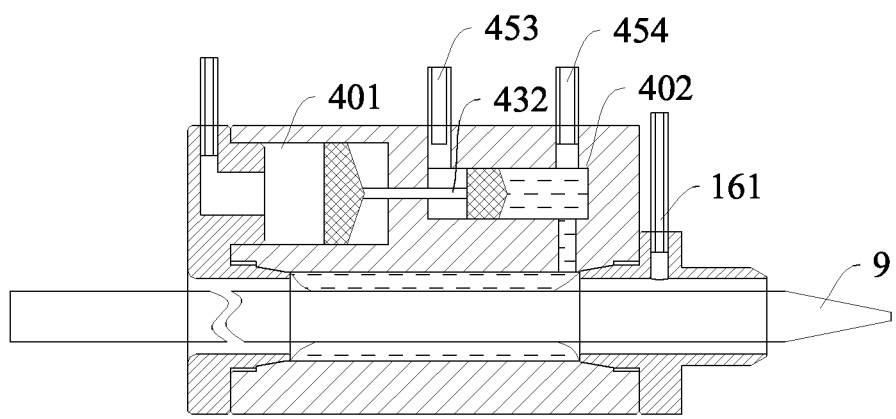

Referring to FIGS. 10a and 10b, the pressure increase mechanism 4 can be provided in the hemostasis valve. The two sliders of the pressure increase mechanism 4 can be linked in motion with each other by a connecting member 432, or by the medium pressure there between. Specifically, in one embodiment, the pressure increase mechanism 4 includes a support body 40. Two cylindrical chambers having different cylinder diameters are defined inside the support body 40. Sliders are respectively and slidably arranged in the respective cylindrical chambers in a sealing manner. The sliders in the two cylindrical chambers are linked in motion with each other.

The input port 41 communicates with a first cylindrical chamber 401 having a larger cylinder diameter, and the output port 42 communicates with a second cylindrical chamber 402 having a smaller cylinder diameter.

The two cylindrical chambers communicate with each other, and the communicating portion is a linkage chamber located between the two sliders, in which the two sliders are linked in motion with each other by the medium pressure in the linkage chamber.

The two sliders, which are linked in motion by the medium pressure, are free of the restriction of the connecting member 432, so that the arrangement can be provided more flexibly. More importantly, the medium pressure can be flexibly adjusted during the treatment procedure, resulting in more application methods.

In one embodiment, a fourth pressure regulating hole 451 communicating with the linkage chamber is opened in the chamber wall of the linkage chamber, and a fifth pressure regulating hole 452 communicating with the output port 42 is opened in the chamber wall of the cylindrical chamber having a smaller cylinder diameter.

The fourth pressure regulating hole 451 can adjust the medium pressure in the linkage chamber, thereby changing the linkage relationship in motion between the two sliders. For example, when the medium pressure in the linkage room is high, the two sliders are linked in motion by the medium pressure similar to a rigid transmission, and the pressure increase mechanism 4 has better dynamic response performance in the case where the blood pressure changes rapidly or has a large range. For example, when the medium pressure in the linkage chamber is low, the two sliders are linked in motion by the medium pressure similar to a flexible transmission, part of the motion energy of the two sliders, etc., is absorbed by the medium in the linkage chamber, thereby providing a more flexible pressure increase mechanism 4.

Compared with the fourth pressure regulating hole 451, the fifth pressure regulating hole 452 can work more effectively, through which the pressure of the output port 42 can be directly regulated, so that the external pressure source can directly regulate the operation of the pressure increase mechanism 4, thereby providing more adjustment choices for the hemostasis valve.

Similarly, the pressure regulating holes can also be provided in the pressure increase mechanism 4 having a connecting member 432 for linkage in motion. In one embodiment, the pressure increase mechanism 4 includes a support body 40. Two cylindrical chambers having different cylinder diameters are defined inside the support body 40. Sliders are respectively and slidably arranged in the respective cylindrical chambers in a sealing manner. The sliders in the two cylindrical chambers are linked in motion with each other.

The input port 41 communicates with a first cylindrical chamber 401 having a larger cylinder diameter, and the output port 42 communicates with a second cylindrical chamber 402 having a smaller cylinder diameter.

The two cylindrical chambers are isolated from each other, and the two sliders are directly connected through a connecting member 432, two ends of which are inserted into the respective cylindrical chambers in a sealing manner and connected to the respective sliders.

Specifically, in one embodiment, the chamber wall of the second cylindrical chamber 402 is provided with:

A sixth pressure regulating hole 453 that communicates with one side of the slider in the second cylindrical chamber 402, and a seventh pressure regulating hole 454 that communicates with the other side of the slider in the second cylindrical chamber 402, to which the output port 42 also communicates.

The sixth pressure regulating hole 453 regulates the pressure of the input port 41, and the seventh pressure regulating hole 454 regulates the pressure of the output port 42, thereby providing more adjustment choices.

The fourth pressure regulating hole 451, the fifth pressure regulating hole 452, the sixth pressure regulating hole 453, and the seventh pressure regulating hole 454 can be further served as interfaces that can provide structural basis for particular applications.

In one embodiment, the pressure regulating holes are respectively communicated with regulating valves, and the regulating valves are directly mounted to the respective pressure regulating holes or communicated with the respective pressure regulating holes through external pipe lines.

The regulating valves can be flexibly mounted, depending on different cases. For example, the arrangement in which the regulating valves are directly mounted to the pressure regulating holes can improve the integration of the hemo stasis valve and facilitates the operations of the operator such as the medical worker. Alternatively, the arrangement in which the regulating valves are connected to the pressure regulating holes through external pipe lines can reduce the external size of the hemostasis valve and improve the adaptability.

In one embodiment, a balancing chamber 31 is further provided in the housing 1, and the driving chamber 12 and the balancing chamber 31 communicate with each other.

The output port 42 of the pressure increase mechanism 4 communicates with the driving chamber 12 and/or the balancing chamber 31.

The balancing chamber 31 refers to a functional area. The balancing chamber 31 and the driving chamber 12 can be separated from and each other, and communicated with each other only through a pipe line. Alternatively, the same chamber with various functions can be used as the balancing chamber 31 and the driving chamber 12.

With regard to the balancing chamber 31, in one embodiment, the hemostasis valve further includes an energy storage mechanism 3 which is linked in motion with the fluid. The energy storage mechanism 3 stores or releases energy when the state of the sealing membrane 2 changes, in order to drive the sealing membrane 2 to close the instrument passage 11.

The fluid in the driving chamber 12 is linked in motion with the energy storage mechanism 3 via the balancing chamber 31.

The output of the pressure increase mechanism 4 acts directly on the energy storage mechanism 3, or the output port 42 of the pressure increase mechanism 4 communicates with the driving chamber 12 and/or the balancing chamber 31.

When the interventional instrument 9 enters the hemo stasis valve, the sealing membrane 2 needs to open the instrument passage 11 to avoid interference with the interventional instrument 9. The sealing membrane 2 thus works on the fluid in the driving chamber 12. If the preset pressure of the fluid in the driving chamber 12 is too high, the driving force required to deform the sealing membrane 2 will be too high, and a great driving force would be required for the interventional instrument 9 to press the sealing membrane 2 to open the instrument passage 11, which would affect the operations of the operator such as the medical worker. If the preset pressure of the fluid in the driving chamber 12 is too low, the closing pressure from the sealing membrane 2 when closing the instrument passage 11 would be insufficient, which would easily cause the sealing failure.

The energy storage mechanism 3 in this embodiment can well solve the above problems. When the interventional instrument 9 enters the hemo stasis valve, the sealing membrane 2 needs to open the instrument passage 11 to avoid interference with the interventional instrument 9. At this time, the sealing membrane 2 will work on the fluid in the driving chamber 12, and the energy storage mechanism 3 will store and absorb the energy from the fluid to reduce the difficulty of the entry of the interventional instrument 9, which provides a good operating experience for the entrance for instrument. When the interventional instrument 9 exits the hemostasis valve, the sealing membrane 2 needs to close the instrument passage 11 to perform hemostasis. At this time, the fluid in the driving chamber 12 will work on the sealing membrane 2, and the energy storage mechanism 3 releases energy to work on the fluid, so as to ensure the sealing effect of the sealing membrane 2 on the instrument passage 11. By means of the cooperation between the pressure increase mechanism 4 and the energy storage mechanism 3, the sealing effect on the instrument passage 11 and the operation experience for the interventional instrument 9 entering the hemostasis valve can be both ensured.

Figure 11A:
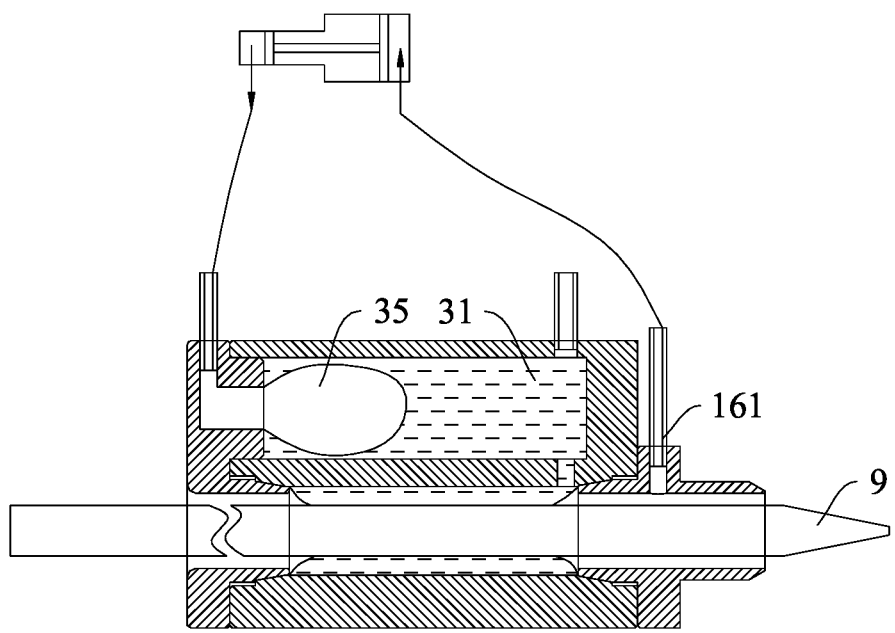
FIG. 11a is a schematic view of a hemostasis valve with another energy storage mechanism according to an embodiment.
Figure 11B:
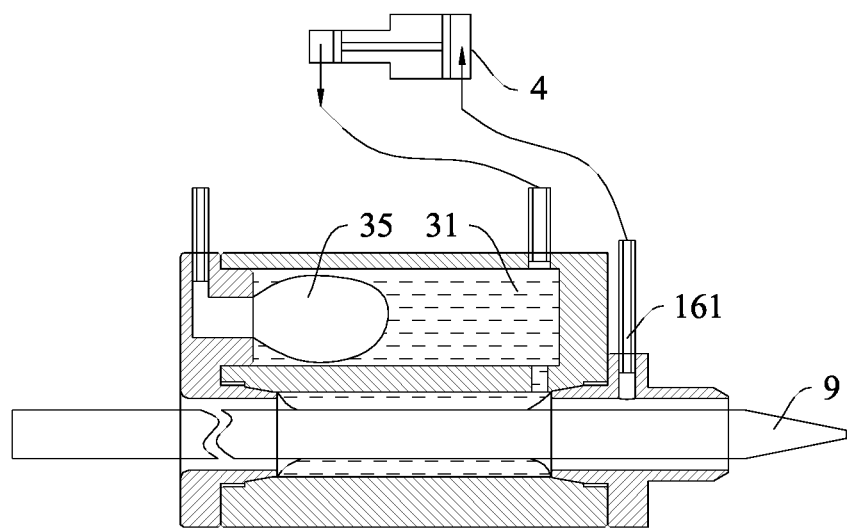

Referring to FIGS. 11a and 11b, in one embodiment, the energy storage mechanism 3 includes an elastic balloon 35 disposed within the balancing chamber 31.

The output port 42 of the pressure increase mechanism 4 communicates with the balancing chamber 31.

The elastic balloon 35 can store or release energy to improve the energy storage or release performance. The output port 42 of the pressure increase mechanism 4 communicates with the balancing chamber 31. During the energy release process, in addition to the elasticity of the sealing membrane 2, the elastic balloon 35 and the pressure increase mechanism 4 can work cooperatively to increase the energy to the fluid. The output port 42 of the pressure increase mechanism 4 can be arranged in other manner. In one embodiment, the energy storage mechanism 3 includes the elastic balloon 35 disposed in the balancing chamber 31, and the output port 42 of the pressure increase mechanism 4 communicates with the elastic balloon 35.

When the output port 42 of the pressure increase mechanism 4 communicates with the elastic balloon 35, the energy output by the pressure increase mechanism 4 is released to the elastic balloon 35. As an energy storage component of the energy storage mechanism 3, the elastic balloon 35 can cushion the energy released by the pressure increase mechanism 4, so as to allow the pressure of the fluid to change more smoothly and thus improve the performance of the hemostasis valve.

The energy storage mechanism 3 can be arranged in other ways. Referring to FIGS. 7a to 7c, in one embodiment, the energy storage mechanism 3 includes:

an energy storage chamber 33 communicating with the balancing chamber 31;

a piston 34 that is slidably arranged between the balancing chamber 31 and the energy storage chamber 33 in a sealing manner; and a compressible gas and/or spring member located in the energy storage chamber 33 and interacting with the piston 34; wherein the output port 42 of the pressure increase mechanism 4 communicates with the energy storage chamber 33.

In this embodiment, the pressure increase mechanism 4 and the energy storage mechanism 3 share the same components, wherein the linkage chamber functions as the energy storage chamber 33, and the second cylindrical chamber 402 functions as the balancing chamber 31. When the position of the piston 34 changes, the energy storage mechanism 3 stores or releases energy. During the energy storage process, energy is absorbed by the compressible gas and/or the spring member, and during the energy release process, the compressible gas and/or the spring member does work to release energy. The energy storage chamber 33 is a functional term in connection with the energy storage process of the energy storage mechanism 3. During the energy release process, energy is actually released from the energy storage chamber 33.

The output port 42 of the pressure increase mechanism 4 communicates with the energy storage chamber 33, and the energy output by the pressure increase mechanism 4 is released through the piston 34 during the energy release process. The piston 34 can cushion the energy released from the pressure increase mechanism 4, so as to allow the pressure of the fluid to change more smoothly and thus improve the performance of the hemostasis valve. The output port 42 of the pressure increase mechanism 4 can be arranged in other manners.

Figure 9:
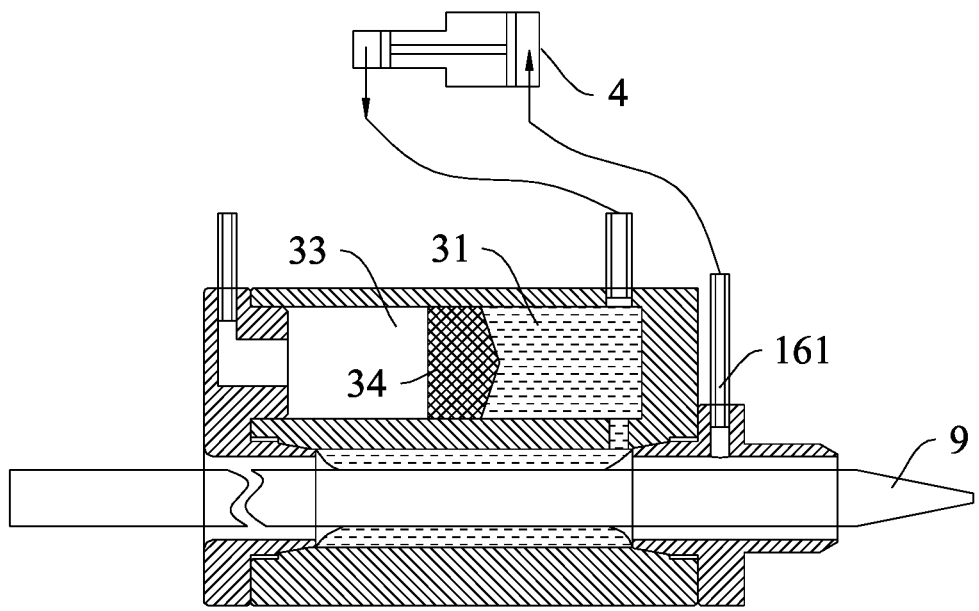
FIG. 9 is a schematic view showing another communication of an embodiment of the pressure increase mechanism.

Referring to FIG. 9, in one embodiment, the energy storage mechanism 3 includes:

an energy storage chamber 33 communicating with the balancing chamber 31;

a piston 34 that is slidably arranged between the balancing chamber 31 and the energy storage chamber 33 in a sealing manner; and a compressible gas and/or spring member located in the energy storage chamber 33 and interacting with the piston 34; wherein the output port 42 of the pressure increase mechanism 4 communicates with the balancing chamber 31.

The output port 42 of the pressure increase mechanism 4 communicates with the balancing chamber 31. During the energy release process, in addition to the elasticity of the sealing membrane 2, the elastic balloon 35 and the pressure increase mechanism 4 can work cooperatively to increase the energy to the fluid. The pressure increase mechanism 4 can output more effectively and is more suitable for some applications requiring better dynamic performance.

The pressure increase mechanism 4 communicates with the blood of the human body so that other functions are also possible. In one embodiment, the hemostasis valve further includes a blood pressure indicating device (not shown) connected to the input port 41.

The blood pressure is an important index for the treatment procedure. Compared with a monitoring apparatus with a sensor and an output device arranged separately, the blood pressure indicating device based on the pressure increase mechanism 4 has a simple structure, is stable and easy to read, and facilities the implementation.

In one embodiment, the blood pressure indicating device is a sphygmomanometer independent from the pressure increase mechanism 4. Alternatively, the blood pressure indicating device and the pressure increase mechanism 4 are formed in one piece.

In one embodiment, the pressure increase mechanism 4 is provided with at least a movable element reflecting the blood pressure, and a blood pressure indicator which indicates the position of the movable element.

In one embodiment, the pressure increase mechanism 4 includes a support body 40.

Two cylindrical chambers having different cylinder diameters are defined inside the support body 40. Sliders are respectively and slidably arranged in the respective cylindrical chambers in a sealing manner. The sliders in the two cylindrical chambers are linked in motion with each other.

The input port 41 communicates with a first cylindrical chamber 401 having a larger cylinder diameter, and the output port 42 communicates with a second cylindrical chamber 402 having a smaller cylinder diameter.

The movable element is a slider in the first cylindrical chamber 401 and/or a slider in the second cylindrical chamber 402.

Figure 12A:
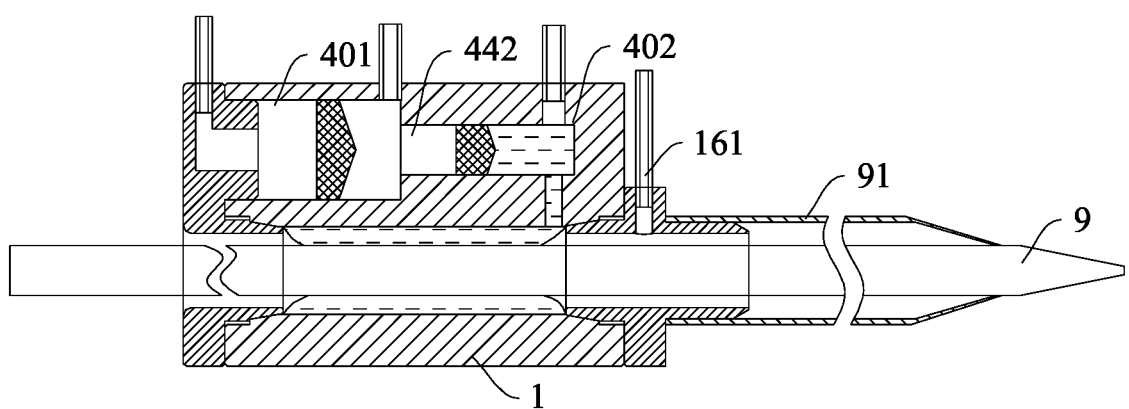
FIGS. 12a and 12b are schematic views of the engagement between the sheath and the hemostasis valve of a catheter sheath.
Figure 12B:
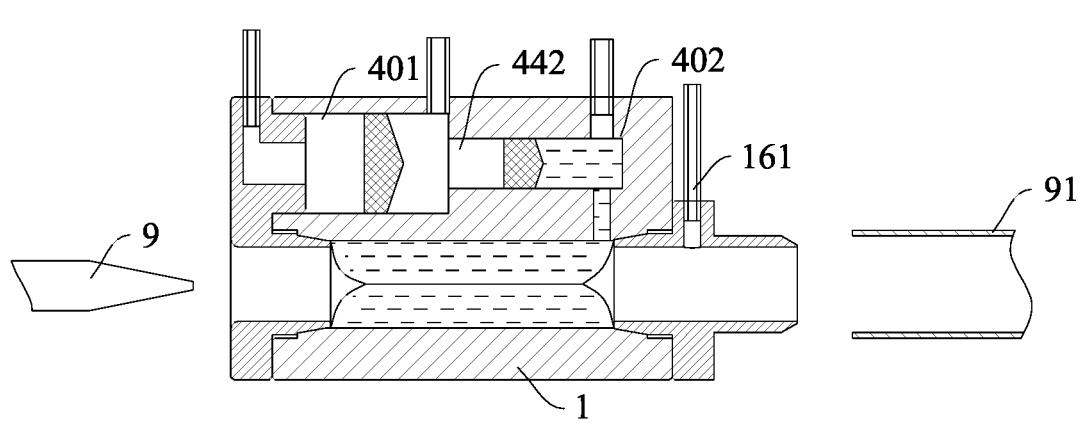

Referring to FIG. 12*a* to FIG. 12*b*, the present application further discloses a catheter sheath including a sheath 91 and a hemostasis valve which are docked and communicated with each other, wherein the hemostasis valve is any one of the embodiments of the hemostasis valve as described above.

The sheath 91 is configured to be inserted into the interior of the human body, the hemostasis valve is configured to close the sheath, and the interventional instrument 9 is configured to enter the sheath 91 through the hemostasis valve, thereby entering the interior of the human body to perform treatment.

In one embodiment, the hemostasis valve is provided with a pipe joint connected to the sheath 91. The pipe joint is engaged with the sheath 91 through a sealing element, and is provided with an engaging structure for preventing separation of the sheath 91 from the pipe joint. In the present embodiment, the pipe joint is formed by an extension of the second end cap 15. By means of the engaging structure, it is possible to quickly assemble the sheath 91 and the hemostasis valve, and to separate the sheath 91 from the hemostasis valve in emergency.

In detail, the head of the sheath 91 is provided with a developing point, so that the medical worker can perform the procedure with the help of the medical equipment.

In use of the hemostasis valve, the sheath 91 and the hemostasis valve are docked and communicated with each other to form an instrument passage 11. The sheath 91 and the end caps on two sides can be formed in one piece or separately. The end caps respectively extend away from the hemostasis valve and in the axial direction of the instrument passage 11, thereby further enclosing the instrument passage 11 for the passage of the interventional instrument 9.

The present application further disclose a method for sealing an interventional instrument, including providing an instrument passage with a deformable sealing membrane, and driving the sealing membrane to deform by fluid at the outer periphery of the sealing membrane to seal/close the instrument passage, wherein in the process of entry and exit the instrument passage of the interventional instrument, an energy storage mechanism linked in motion with the fluid is used to store or release energy when the sealing membrane is deformed, so as to maintain the sealing between the interventional instrument and the instrument passage.

In one embodiment, the method for sealing the interventional instrument is implemented by means of the hemostasis valves as described above. The detailed structure of the hemostasis valve refers to the above description, and will not be repeated here.

As shown in FIGS. 13 to 16, an externally balanced hemostasis valve includes a housing 100 and a sealing membrane 130 arranged in the housing 100 and having a tubular structure. A lumen of the tubular structure serves as an instrument passage 131. A driving chamber 150 is provided in the housing surrounding the sealing membrane. A balancing hole 151 communicating with the driving chamber is opened in the housing. An elastic balloon 140 communicating with the balancing hole 151 is provided outside the housing 100. The elastic balloon 140 is deformable to adapt to the pressure change in the driving chamber 150 in such a way that the sealing membrane 130 closes or opens the instrument passage 131.

The instrument passage 131 is a passage through which the interventional instrument 160, such as a catheter, a guide wire, or the like, enters and exits the human body during an interventional treatment. Therefore, it can be understood that the area surrounded by the tubular structure forms at least part of the instrument passage 131. In order to allow the entry of the interventional instrument 7, corresponding entrance and exit communicating with the instrument passage 3 can be opened in the housing 1, in which case the instrument passage 3 can also be regarded as passing through the housing 1.

In order to reduce the frictional resistance between the interventional instrument and the sealing membrane 130 as the former enters and exits the hemostasis valve, the sealing membrane 130 is made of a non-elastomeric material, such as expanded polytetrafluoroethylene (EPTFE).

Figure 14:
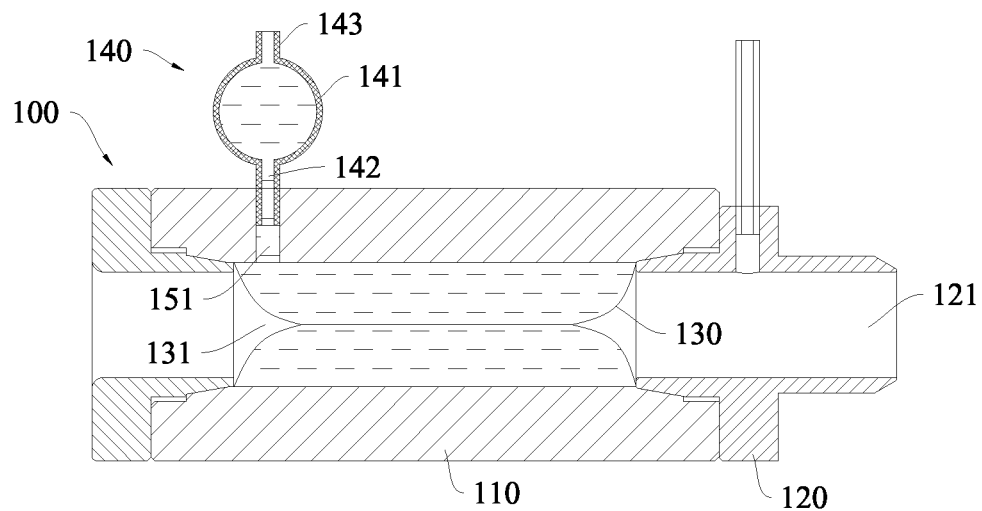
FIG. 14 is a schematic view of an embodiment of an externally balanced hemostasis valve with a balancing medium injected.

Before using the hemostasis valve, a balancing medium such as a fluid or hydrogel is injected into the driving chamber 150 through the elastic balloon 140 and the balancing hole 151. In order to improve the safety, physiological saline is used as the fluid. The hemostasis valve with the driving chamber 150 injected with the balancing medium is shown in FIG. 14. The balancing medium fills the elastic balloon 140 and transmits the pressure from the deflated elastic balloon 140 to the driving chamber 150, until the sealing membrane 130 closely contacts the interventional instrument, thereby preventing blood from flowing through the hemo stasis valve.

Figure 15:
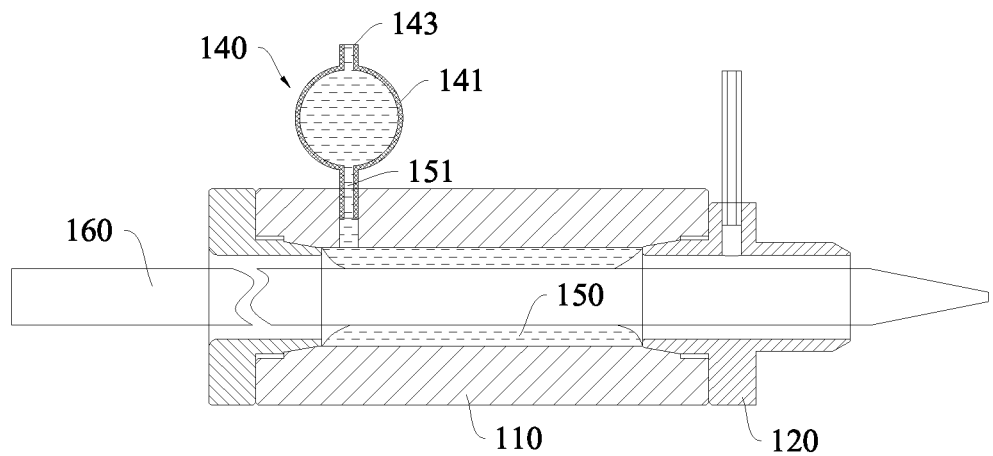
Figure 16:
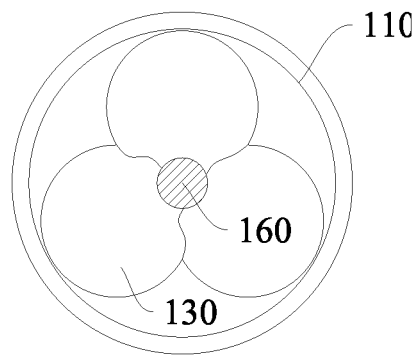
FIG. 16 is a schematic view of the internal structure shown in FIG. 15.

As shown in FIG. 15, when the interventional instrument 160 is inserted into the hemo stasis valve, the interventional instrument 160 presses the sealing membrane 130 outward in the radial direction of the sealing membrane 130, reducing the volume of the driving chamber 150, so that the excess balancing medium in the driving chamber 150 flows into the elastic balloon 140 through the balancing hole 151, and the elastic balloon 140 expands and stores elastic potential energy.

Inside the housing, the balancing medium drives the sealing membrane 130 to press against the outer periphery of the interventional instrument 160. Outside the housing, the elastic balloon 140 is elastically deflated to exert pressure to the balancing medium. The two pressures inside and outside the housing are balanced by the balancing medium flowing through the balancing hole 151.

Figure 13:
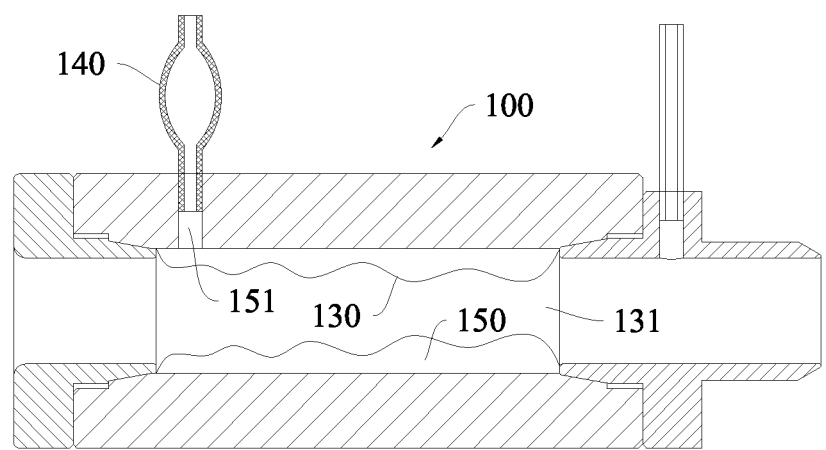
FIG. 13 is a schematic view of an embodiment of an externally balanced hemostasis valve with the balancing medium not filled.

When the interventional instrument 160 exits the hemostasis valve, the space within the sealing membrane 130 occupied by the interventional instrument 160 gradually decreases. In order to keep the balance between the two pressures inside and outside the housing, the elastic balloon 140 is elastically deflated to squeeze the balancing medium in the elastic balloon 140, so that the balancing medium flows back into the driving chamber 150, the volume of the elastic balloon 140 decreases accordingly, and the volume of the driving chamber 150 increases accordingly. In this process, the elastic balloon 140 does not completely return to the natural state as shown in FIG. 13, but remains certain elastic deformation and deflation pressure, so that the sealing membrane 130 always presses against the outer periphery of the interventional instrument 160, thereby remaining the instrument passage 131 sealed.

After the interventional instrument 160 completely exits the hemo stasis valve, the hemostasis valve is restored to the initial state as shown in FIG. 14 by the stored elastic potential energy of the elastic balloon 140, in which the inner surfaces of the sealing membrane 130 closely contact against each other to prevent blood from flowing through the hemostasis valve.

In the present embodiment, the housing is provided with a balloon outside, and the pressure inside and outside the housing is balanced through the balancing medium and the balancing hole, so that there is no need to provide a specific pressure regulating device connected at the outside of the hemostasis valve, the hemostasis valve has a smaller size, and is portable and easy to operate.

In one embodiment, as shown in FIG. 14, the housing has a rigid cylindrical structure and surrounds the outer periphery of the sealing membrane. The two axial ends of the sealing membrane are connected with the housing in a sealing manner, and a driving chamber is defined between an axial middle portion of the sealing membrane and the inner wall of the housing. The rigid material of the housing has a better protection for the sealing membrane 130, and can also avoid deformation of the housing due to pressure from the human body or the external environment, which would fluctuate the pressure of the balancing medium in the driving chamber 150.

In one embodiment, as shown in FIG. 14, the housing includes a support portion 110 and two end caps 120. The balancing hole 151 extends through the side wall of the support portion 110. The two end caps are respectively docked to the two axial ends of the support portion 110, and each end cap defines an avoidance hole 121 corresponding to the instrument passage. The end caps 120 and the support portion 110 can be formed in one piece or connected detachably, wherein the one-piece structure has better sealing performance and higher safety, while the detachable structure facilitates the assembly of the sealing membrane 130 and the balloon within the housing at a lower cost.

To facilitate the operation on the hemostasis valve, in one embodiment, as shown in FIG. 14, the balancing hole 151 is located adjacent to the entrance of the instrument passage 131. By providing the balancing hole 151 adjacent to the entrance of the instrument passage 131, the balancing hole 151 can be extended as far as possible in the radial direction, reducing the processing difficulty of the product, and the housing has a large holding space outside, thereby preventing the finger from accidentally touching the elastic balloon 140 during operation.

In particular, in one embodiment, the two axial ends of the sealing membrane are connected with the housing in at least one of the following ways: being adhered and fixed to the support portion 110, being respectively adhered and fixed to the respective end caps 120 at the respective sides, being respectively sandwiched and fixed between the support portion 110 and the respective end caps 120 at the respective sides, being inserted in the support portion and sealed and fixed by inserts, being respectively inserted in the respective end caps at the respective sides and sealed and fixed by inserts, and being respectively inserted between the support portion and the respective end caps at the respective sides and sealed and fixed by inserts.

In the case where the sealing membrane is adhered and fixed to the support portion 110, the end cap 120 would not contact the sealing membrane 130 during the assembly, so that the sealing membrane 130 would not be easily damaged. In the case where the sealing membrane 130 is adhered and fixed to the end caps 120, the sealing performance at the outer periphery of the instrument passage 131 can be ensured more easily. In the case where the sealing membrane 130 is sandwiched and fixed between the support portion and the end caps at the respective sides, the sealing membrane 130 and the balloon can be easily assembled, and a good sealing performance can be obtained between the sealing membrane 130 and the end caps 120. Alternatively, in order to ensure both the sealing performance and the assembly convenience, grooves can be provided in the support portion 110 or the end caps 120, and the two end edges of the sealing membrane 130 can be inserted into the respective grooves and then inserts can be inserted into the respective grooves so as to fix the sealing membrane 130.

In one embodiment, the elastic balloon 140 includes a balloon body 141, a first connector 142, and a second connector 143. The balloon body 141 is made of an elastic material and has a hollow structure. The first connector 142 communicates with the balloon body 141 and the balancing hole 151. The second connector 143 communicates with the balloon body 141, by means of which the balancing medium that can flow between the elastic balloon 140 and the driving chamber 150 can be injected. In assembly, the first connector 142 is inserted into the balancing hole 151, and then the balancing medium is filled into the balloon body 141 through the second connector 143, and the opening at the upper end of the second connector 143 is closed. The first connector 142 and the second connector 143 are respectively located at two opposite sides of the balloon body 141, so that it is easier to fill the balloon body 141 with the balancing medium, reducing the intake air.

Specifically, in one embodiment, the first connector 142 and the second connector 143 are formed in one piece with the balloon body, so that the sealing performance is better, and the balancing medium is not easy to leak. In another embodiment, the first connector 142 and the second connector 143 are separate from the balloon body. For example, the two end of the balloon body 141 respectively form tubular diameter reduced portions, the first connector 142 and the second connector 143 are made of a material having higher rigidity than the balloon body 141, and are inserted into the respective diameter reduced portions to ensure the sealing between the first connector 142 and the balancing hole 151.

In order to close the second connector 143 and maintain a constant volume of medium in the hemostasis valve, in one embodiment, a sealing plug is arranged at the opening of the second connector 143. After the balloon body 141 is filled with the balancing medium, the injection port at the second connector 143 is closed by the sealing plug.

To facilitate the injection and occluding of the balancing medium, in one embodiment, a control valve (not shown) is connected to the second connector. The control valve can be a separate valve. Alternatively, the control valve can be a structure adaptive to the second connector, for example being a Luer.

In use, depending on the outer peripheral size of the interventional instrument, a corresponding amount of balancing medium is first injected into the balloon body 141, and then the control valve on the second connector 143 is closed to keep the balancing medium in the balloon body 141 and the driving chamber 150, resulting in a relatively stable contact pressure. The pressure of the balloon can also be adjusted instantaneously by the control valve.

Figure 17:
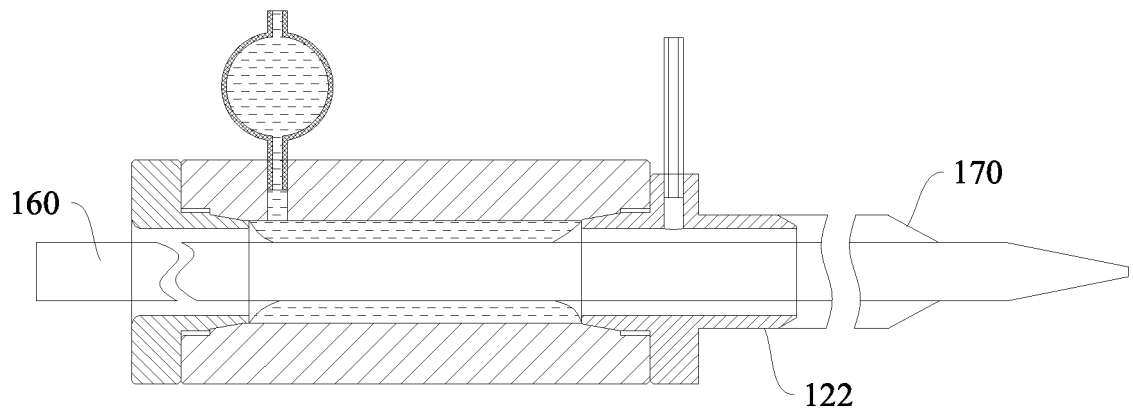
FIG. 17 is a schematic view of an embodiment of a catheter sheath.
Figure 18:
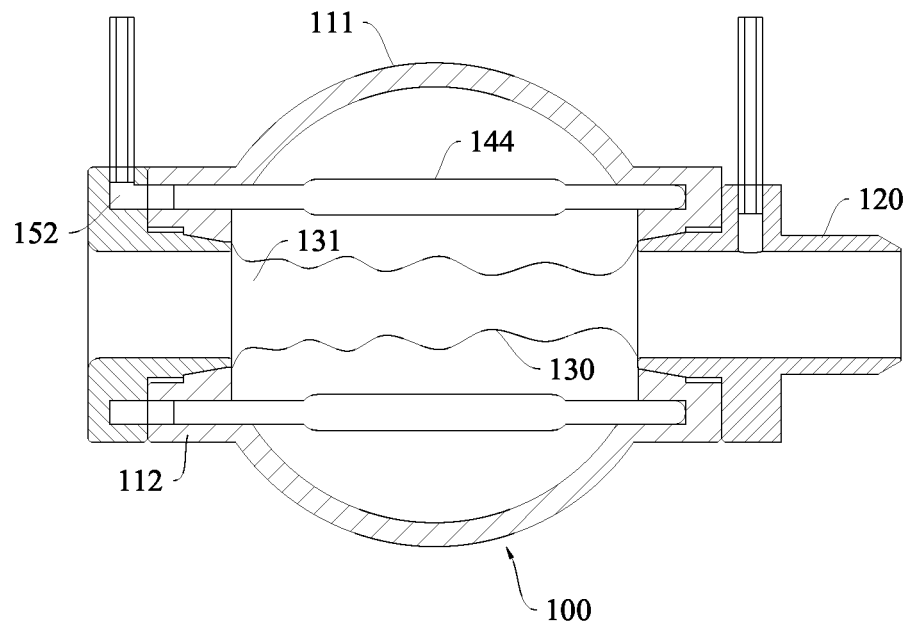
FIG. 18 is a schematic view of an embodiment of an internally balanced hemostasis valve without filler.

The present application further provides a catheter sheath, as shown in FIG. 17, which includes a sheath 170 and a hemostasis valve which are docked and communicated with each other. The hemostasis valve is the externally balanced hemostasis valve according to the above embodiments. In use, the sheath can be inserted into the human body at the predetermined puncture site, and the hemostasis valve of the present application used can prevent blood from flowing out through the instrument passage in the process of entrance and exit of the interventional instrument. In order to allow the engagement of the hemostasis valve with the sheath, a pipe joint 122 can be provided on one of the end caps in the form of one-piece or separately, with the sheath 170 surrounded and fixed on the pipe joint 122.

As shown in FIGS. 18-21, in one embodiment, an internally balanced hemostasis valve includes a housing 100 and a sealing membrane 130 provided in the housing 100 and having a tubular structure. A lumen of the tubular structure serves as an instrument passage 131 and passes through the housing. A driving chamber is provided in the housing 100 surrounding the sealing membrane. A balloon 144 is disposed in the driving chamber for interacting with the sealing membrane 130. The balloon 144 and the sealing membrane 130 abut against each other to close or open the instrument passage.

The instrument passage 131 is a passage through which the interventional instrument 160 enters and exits the human body during an interventional treatment. Therefore, it can be understood that the area surrounded by the tubular structure forms at least part of the instrument passage 11. In order to allow the entry of the interventional instrument 7, corresponding entrance and exit communicating with the instrument passage 3 are opened in the housing 1, in which case the instrument passage 3 can also be regarded as passing through the housing 1.

In the initial state and in the longitudinal direction of the instrument passage 131, the sealing membrane 130 is at least locally pressed by the balloon 144 to close the instrument passage 131.

When the interventional instrument passes through the hemostasis valve, the balloon 144 is pressed by the outer periphery of the interventional instrument 160 and thus deformed or moved, and the lumen of the sealing membrane 130 becomes larger, thereby opening the instrument passage 131.

The balloon 144 can use either a solid or hollow structure. In the case where the balloon 144 uses a solid structure, an elastic material such as silicone can be used. When the interventional instrument 160 enters the lumen of the sealing membrane 130, the balloon 144 deforms to store elastic potential energy. When the interventional instrument 160 is withdrawn, the balloon 144 releases energy and returns to the initial state.

In the case where the balloon 144 uses a hollow structure, the balloon 144 can be made of an elastic material, and is filled with fluid, hydrogel, or other water absorbing and swelling materials. In order to improve safety, the fluid can be physiological saline.

As the interventional instrument 160 enters the lumen of the sealing membrane 130, the balloon 144 deforms to store the elastic potential energy. After the interventional instrument 160 passes through the hemostasis valve, the elastic potential energy stored by the balloon 144 is released, and the sealing membrane 130 is deformed in whole or in part to contract the lumen until closing the instrument passage.

During the opening and closing of the instrument passage, the balloon 144 will always press against the sealing membrane 130, so as to ensure that, in the longitudinal direction of the instrument passage, at least one section of the sealing membrane 130 closely contacts with the outer periphery of the interventional instrument 160, thereby preventing the blood from flowing out.

In this embodiment, as the balloon 144 is disposed inside the housing 100, there is no need to connect a special pressure regulating device outside the hemostasis valve, the hemostasis valve has a smaller size, and is more portable and easier to operate.

In one embodiment, the balloon has an inflated state maintained by its own elasticity and/or by filler. The balloon in the inflated state presses the sealing membrane to close the instrument passage. As the interventional instrument 160 passes through the instrument passage, the balloon has a yielding state achieved by its own deformation and/or by displacement, in which state the balloon allows the sealing membrane to deform to open the instrument passage.

In order to simplify the structure of the hemostasis valve as much as possible and facilitate the assembly, in one embodiment, there is only one balloon 144 that surrounds the instrument passage at least once. In order to improve the compatibility of the hemostasis valve for interventional instruments 160 with different sizes, in one embodiment, there are a plurality of balloons distributed around the instrument passage and around the outer periphery of the sealing membrane, wherein the balloons can be distributed uniformly or non-uniformly in circumferential direction, and the shapes of the balloons can be the same or different.

The plurality of balloons cooperate with each other to seal the outer periphery of the interventional instrument 160, so that each balloon engages with the corresponding portion of the sealing membrane to seal a portion of the outer periphery of the interventional instrument 160, thereby effectively reducing wrinkles and improving the sealing effect.

Figure 19:
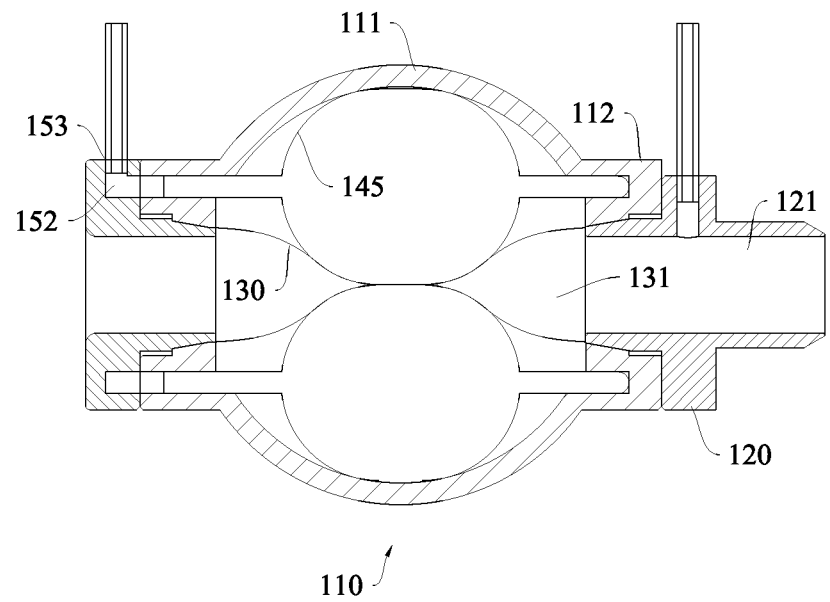
FIG. 19 is a schematic view of an embodiment of an internally balanced hemostasis valve with filler.
Figure 20:
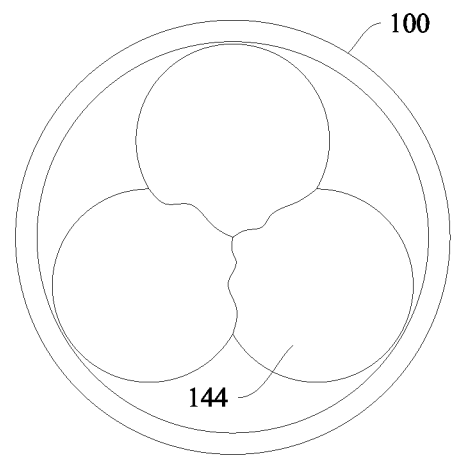

Considering the cost and the sealing performance of the hemostasis valve, in one embodiment, as shown in FIGS. 19 and 20, the number of balloons is 2, 3 or 4. Specifically, in the longitudinal direction of the instrument passage 131, at least the middle portion of the balloon 144 is configured as a deformation portion 145, and the deformation portions of the balloons act on the sealing membrane 130 together.

The instrument passage 131 is closed and opened by deformation of the sealing membrane 130. Therefore, the sealing membrane 130 needs to be made of a deformable material, for example, a flexible and foldable material.

In order to prevent the sealing membrane 130 from been pulled out of the housing by the interventional instrument 160 due to adhesion or excessive friction there between when the interventional instrument 160 enters and exit the human body through the sealing membrane 130, the sealing membrane 130 is made of a non-elastic material so as to minimize the elastic deformation.

In one embodiment, that sealing membrane 130 is made of expanded polytetrafluoroethylene (EPTFE). Further, in one embodiment, the thickness of the sealing membrane 130 ranges from 0.1 to 0.3 mm.

The balloon 144 is made of an elastic material, such as rubber.

In order to restrict the radial deformation of the balloon 144 and effectively store energy, the housing 100 has a rigid cylindrical structure and surrounds around the outer periphery of the sealing membrane 130. The two axial ends of the sealing membrane 130 are connected with the housing 100 in a sealing manner, and the driving chamber is defined between the axial middle portion of the sealing membrane 130 and the inner wall of the housing 100.

The cross-sectional shape of the cylindrical structure is not strictly limited. For example, the cross-sectional shape of the cylindrical structure can be circular or elliptical. The cross-sectional areas of the different portions of the housing in the longitudinal direction of the instrument passage can vary to match the profile of the balloon 144. In order to allow entry or exit the instrument passage, the housing 100 has at least two openings and surrounds the outer periphery of the sealing membrane 130.

In one embodiment, as shown in FIG. 19, the housing 100 includes a support portion 110 and two end caps 120. The instrument passage 131 passes through the support portion 110. The two end caps 120 are respectively docked on two axial ends of the support portion 110, and each end cap 120 defines an avoidance hole 121 corresponding to the instrument passage.

The end caps 120 and the support portion 110 can be formed in one piece or connected detachably, wherein the one-piece structure has better sealing performance and higher safety, while the detachable structure facilitates the assembly of the sealing membrane 130 and the balloon within the housing at a lower cost. In an embodiment of the present invention, the two axial ends of the sealing membrane 130 are connected with the housing 100 in at least one of the following ways: being adhered and fixed to the support portion 110, being respectively adhered and fixed to the respective end caps at the respective sides, being respectively sandwiched and fixed between the support portion and the respective end caps at the respective sides, being inserted in the support portion, being respectively inserted in the respective end caps at the respective sides, and being respectively inserted between the support portion and the respective end caps at the respective sides.

In the case where the sealing membrane is adhered and fixed to the support portion 110, the end cap 120 would not contact the sealing membrane 130 during the assembly, so that the sealing membrane 130 would not be easily damaged. In the case where the sealing membrane 130 is adhered and fixed to the end caps 120, the sealing performance at the outer periphery of the instrument passage 131 can be ensured more easily. In the case where the sealing membrane 130 is sandwiched and fixed between the support portion and the end caps at the respective sides, the sealing membrane 130 and the balloon 144 can be easily assembled, and a good sealing performance can be obtained between the sealing membrane 130 and the end caps 120. Alternatively, in order to ensure both the sealing performance and the assembly convenience, grooves can be provided in the support portion 110 or the end caps 120, and the two end edges of the sealing membrane 130 can be inserted into the respective grooves and then insertion strips or rings can be inserted into the respective grooves so as to fix the sealing membrane 130.

In one embodiment, the support portion 110 includes a spherical middle section 111 and two diameter reduced sections 112 respectively connected to the two sides of the middle section. Two end caps 120 are respectively inserted and fixed to the corresponding diameter reduced sections 112, and the driving chamber is located inside the middle section.

In the longitudinal direction of the instrument passage 131, the middle portion of the hemostasis valve is expanded relative to the two ends and forms the driving chamber, providing an accommodate space for the balloon 144. The end caps 120 are arranged in a plug-in manner, which facilitates the assembly of the product. Specifically, one end of the sealing membrane 130 is set around on the outer periphery of one of the end caps 120, the other end of the sealing membrane 130 is inserted into the inner hole of the diameter reduced section 112, and the other end cap is inserted into the sealing membrane 130, so that the sealing membrane 130 is sandwiched between the diameter reduced section 112 and the end caps 120. In order to further ensure the connection strength, the end cap 120 and the diameter reduced section 112 can be configured as a bolt or a screw.

In another embodiment, the diameter reduced section 112 and the end cap 120 can be engaged with each other in a thread-fit. For example, two ends of the sealing membrane 130 can be fixed to the support portion 110, and the end cap 120 is connected to the diameter reduced section 112 in a thread-fit.

Specifically, the housing 100 and/or the end caps are provided with positioning grooves, the balloon extends along the longitudinal direction of the instrument passage, and the two ends of the balloon are respectively inserted and fixed in the respective positioning grooves at the respective sides. In one embodiment, as shown in FIG. 19, the positioning grooves are opened in the inner wall of the housing 100.

In one embodiment, the support portion or at least one end cap is opened with an injection channel 152, at least one end of the balloon is opened and communicates with the injection channel 152, and the support portion or at least one end cap defines an injection port 153 communicating with the injection channel 152.

The lumen of the balloon 144 can be communicated to the outside of the housing 100 through the injection channel 152 and the injection port 153, so that in the case where the interventional instrument 160 with a different peripheral size is used or the balloon pressure needs to be adjusted, gas or liquid can be injected into or removed out of the balloon 144 directly through the injection channel 152 and the injection port 153.

Figure 21:
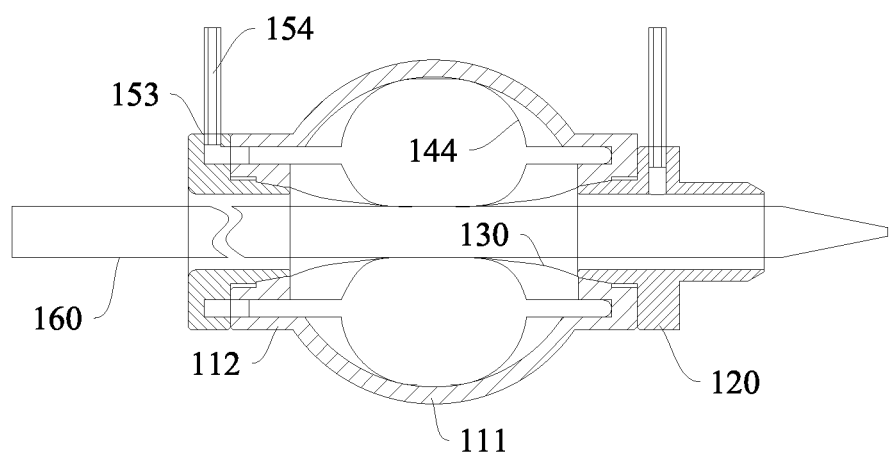

Specifically, in one embodiment, as shown in FIG. 21, the injection port 153 is fitted with a sealing plug, or the injection port is inserted with a connection tube 154 in a sealing manner, and the connection tube 154 is fitted with a control valve (not shown). The control valve can be a separate valve. Alternatively, the control valve can be a structure adaptive to the connection tube, for example being a Luer.

In use, depending on the outer peripheral size of the interventional instrument 160, a corresponding amount of filler is first injected into the balloon 144, and then the control valve on the connection tube 154 is closed to keep the filler in the balloon 144, resulting in a relatively stable contact pressure. The pressure of the balloon 144 can also be adjusted instantaneously by the control valve.

Figure 23A:
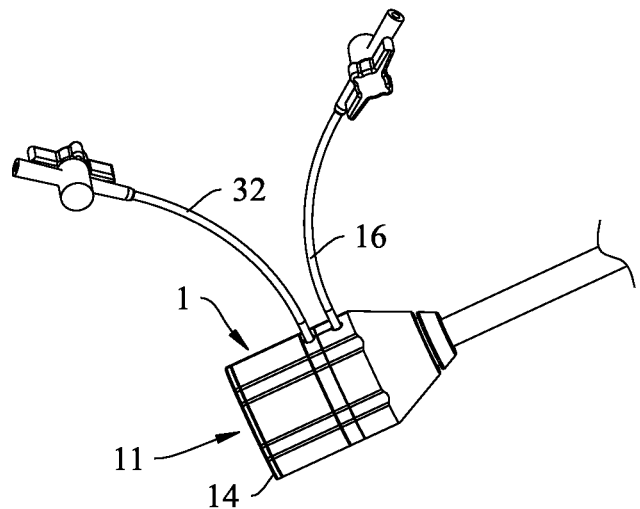
FIGS. 23a to 23b are schematic views of an embodiment of a hemostasis valve having multi chambers.
Figure 23B:
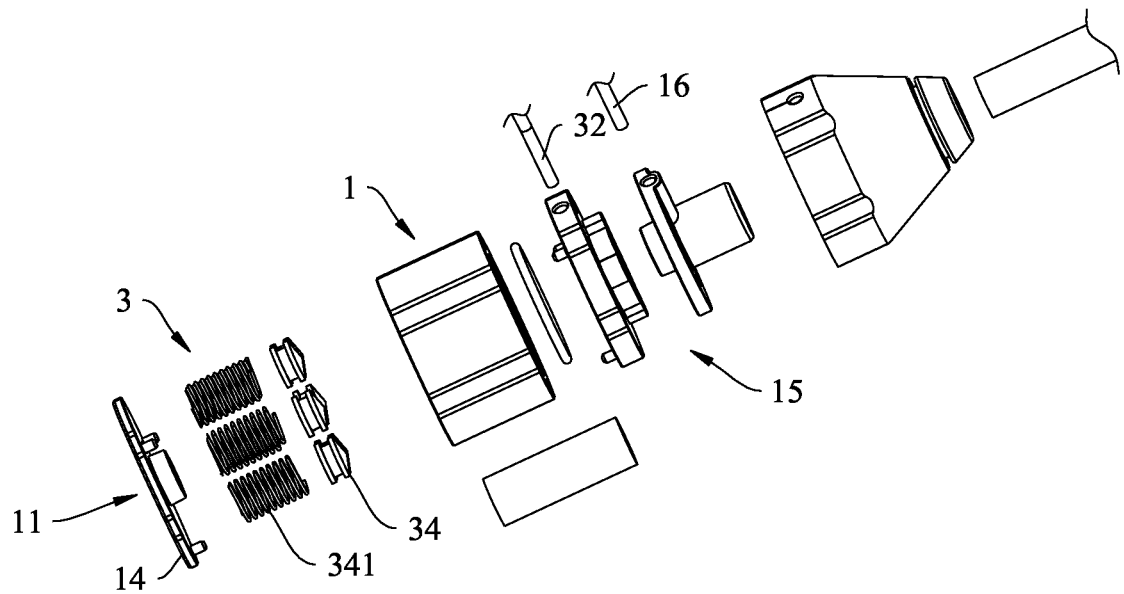
Figure 24A:
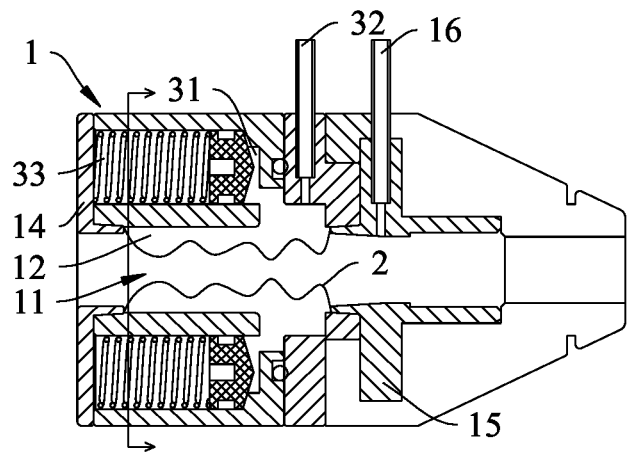
Figure 24B:
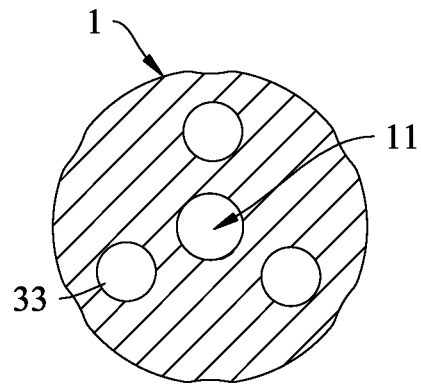
Figure 24C:
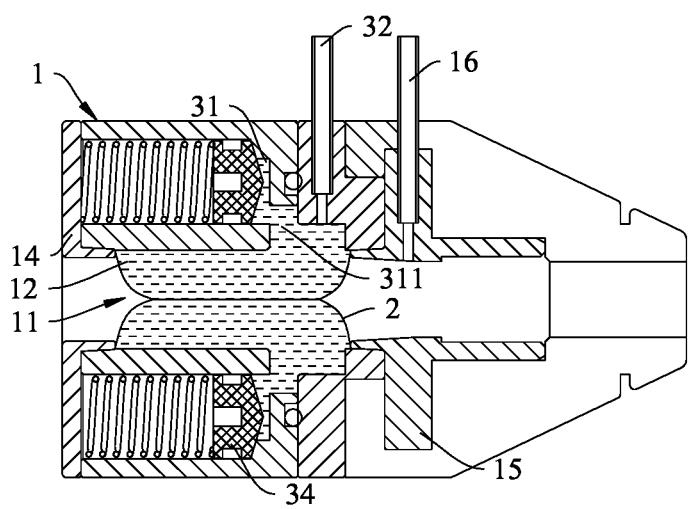
Figure 24D:
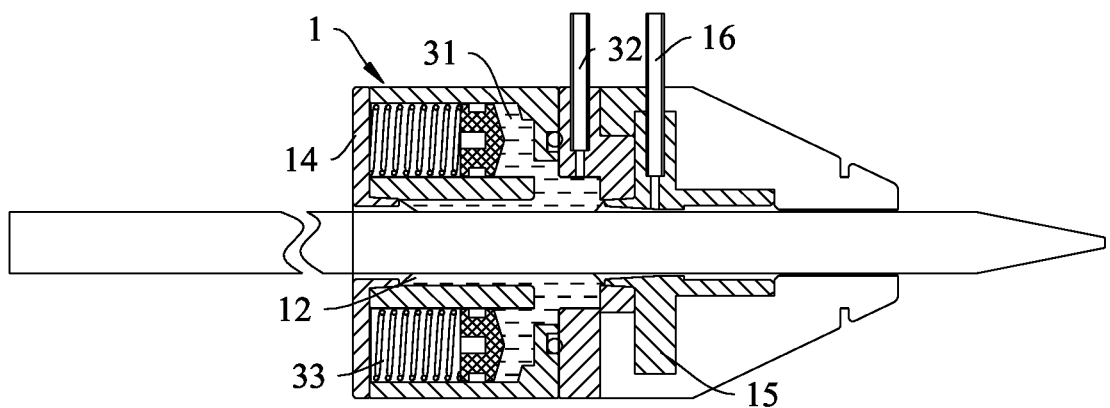
Figure 25A:
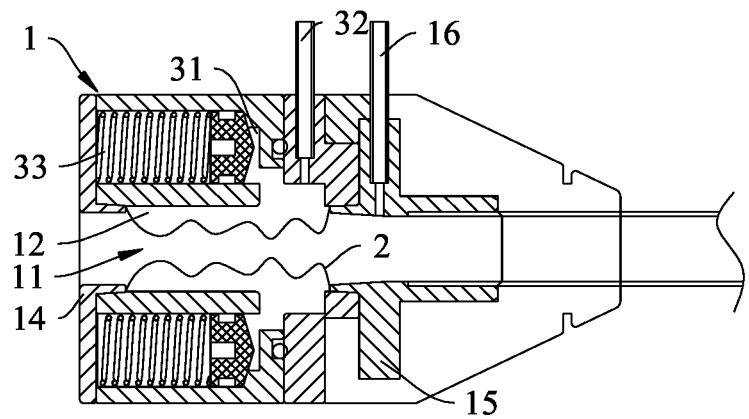
Figure 25B:
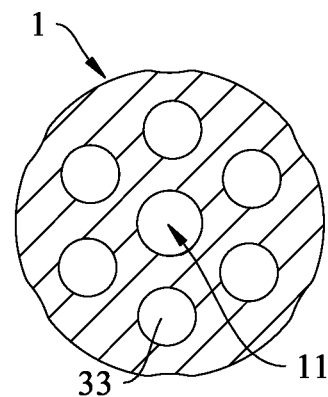
Figure 25C:
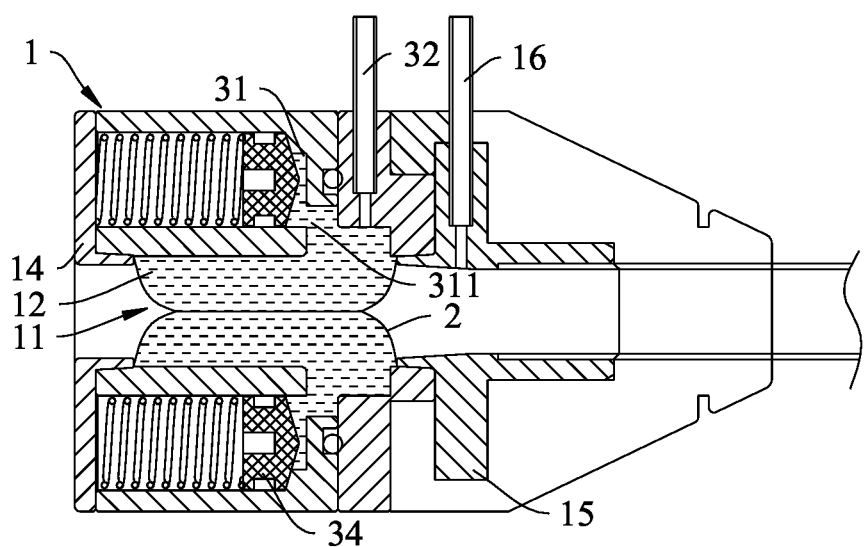
Figure 25D:
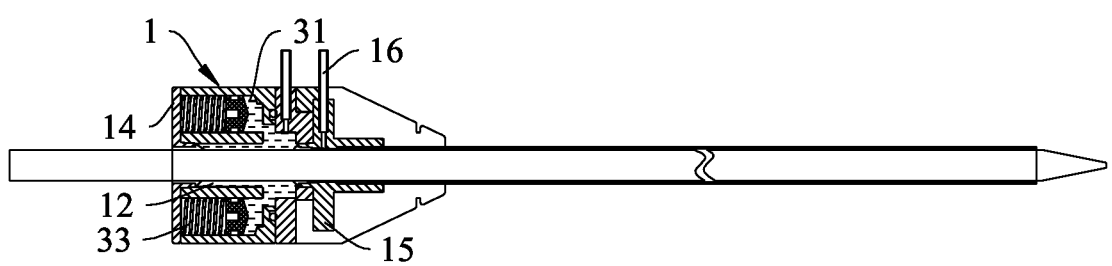
Figure 26A:
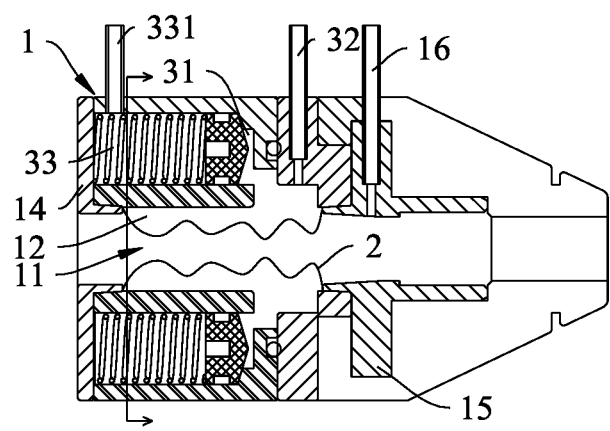
Figure 26B:
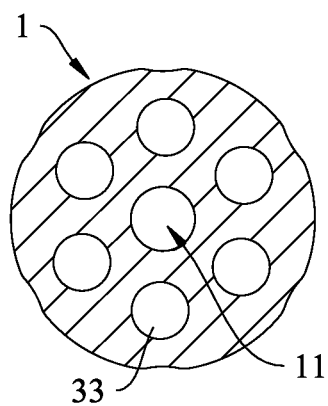
Figure 26C:
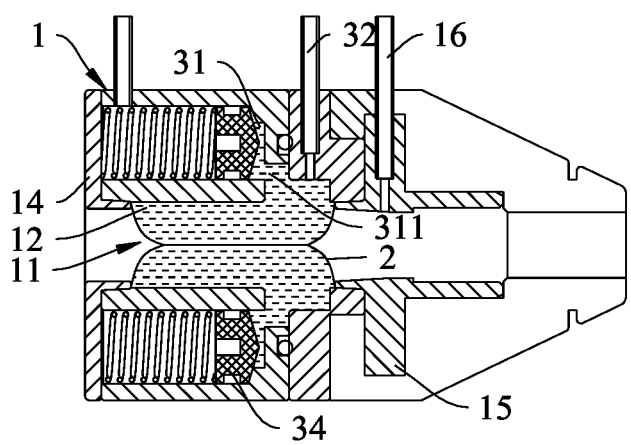
Figure 26D:
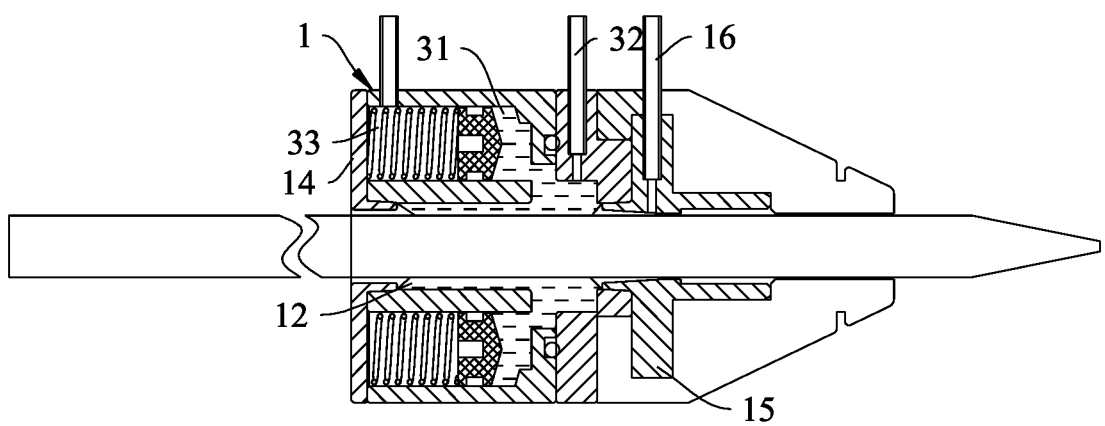

Referring to FIGS. 23a and 23b, the present application further discloses a hemostasis valve having multi chambers, including a housing 1 and a sealing membrane 2 provided in the housing 1 and having a tubular structure. A lumen 21 of the tubular structure serves as an instrument passage 11. In the radial direction of the instrument passage 11 and in the housing 1, a driving chamber 12 surrounding the outer periphery of the sealing membrane 2 for filling fluid and balancing chambers 31 located outside the driving chamber 12 are provided, wherein the driving chamber 12 and the balancing chambers 31 communicate with each other and the balancing chambers 31 surrounds the outer periphery of the driving chamber 12.

The hemostasis valve further includes energy storage mechanisms 3 which are linked in motion with the fluid. The fluid in the driving chamber 12 is linked in motion with the energy storage mechanisms 3 through the balancing chambers 31. The energy storage mechanisms 3 store or release energy when the state of the sealing membrane 2 changes, and drive the sealing membrane 2 to close the instrument passage 11 when releasing energy.

The balancing chambers 31, which surround the outer periphery of the driving chamber 12, are capable of supplying fluid to the driving chamber 12 from multiple directions for driving the sealing membrane 2 to move, thereby closing the instrument passage 11. The energy storage mechanisms 3 function to drive the fluid in the balancing chambers 31 to move, so that during assembly, energy can be pre-supplied to the energy storage mechanisms 3 to increase the adaptability of the hemo stasis valve to the interventional instruments 9 with different outer diameters.

Referring to FIGS. 24a to 27b, the present application further discloses a hemostasis valve having multi chambers, including a housing 1 and a sealing membrane 2 provided in the housing 1 and having a tubular structure. A lumen 21 of the tubular structure serves as an instrument passage 11. In the radial direction of the instrument passage 11 and in the housing 1, a driving chamber 12 surrounding the outer periphery of the sealing membrane 2 for filling fluid and balancing chambers 31 located outside the driving chamber 12 are provided, wherein the driving chamber 12 and the balancing chambers 31 communicate with each other and the balancing chambers 31 surrounds the outer periphery of the driving chamber 12.

The hemostasis valve further includes energy storage mechanisms 3 which are linked in motion with the fluid. The fluid in the driving chamber 12 is linked in motion with the energy storage mechanisms 3 through the balancing chambers 31. The energy storage mechanisms 3 store or release energy when the state of the sealing membrane 2 changes, and drive the sealing membrane 2 to close the instrument passage 11 when releasing energy.

The balancing chambers 31, which surround the outer periphery of the driving chamber 12, are capable of supplying fluid to the driving chamber 12 from multiple directions for driving the sealing membrane 2 to move, thereby closing the instrument passage 11. The balancing chambers 31 can surround the outer periphery of the driving chamber 12 in various ways. For example, in one embodiment, a plurality of balancing chambers 31 are arranged at intervals on the outer periphery of the driving chamber 12, and each balancing chambers 31 is respectively provided with an energy storage mechanism 3. Further, the balancing chambers 31 can be arranged at uniform or non-uniform intervals on the outer periphery of the driving chamber 12. For another example, the balancing chambers 31 communicate with the driving chamber 12 through separate balancing holes 311, or at least two balancing chambers 31 communicate with the driving chamber 12 by a common balancing hole 311. Further, the balancing chambers 31 communicate with the driving chamber 12 through the same balancing hole 311. For another example, in one embodiment, the number of balancing chambers 31 is 2 to 8.

Different arrangements of the energy storage mechanism 3 and different configurations of the energy storage mechanism 3 have different effects. In one embodiment, for example, the energy storage mechanism 3 includes: an energy storage chamber 33, wherein a balancing chambers 31 is provided in the housing 1, and a driving chamber 12 and the balancing chambers 31 communicate with each other; a piston 34, which is slidably arranged between the balancing chambers 31 and the energy storage chamber 33 in a sealing manner; and an energy storage element, which is a compressible gas and/or a spring member 341 located in the energy storage chamber 33 and interacting with the piston 34; wherein the housing 1 is provided with at least two cylindrical chambers for the piston 34 to slide: the balancing chambers 31 and the energy storage chamber 33 divided by the piston 34. For another example, in one embodiment, each piston 34 is engaged with the inner wall of the respective cylindrical chamber in a sealing manner by means of the sealing edge thereof, and in the sliding direction of the piston 34, at least two circles of sealing portions are formed between the sealing edge and the inner wall of the cylindrical chamber.

For another example, the housing 1 is provided with at least two cylindrical chambers for the piston 34 to slide, each cylindrical chamber is provided with a separate energy storage element, and the energy storage performances of the energy storage elements can be the same or different.

The detail configurations and the corresponding technical effects refer to the embodiments illustrated by way of example below.

In the embodiment referring to FIGS. 24a to 24d, the number of the balancing chambers 31 is preferably three, the balancing chambers 31 are disposed and spaced from each other uniformly on the outer periphery of the driving chamber 12, and respectively communicate with the driving chamber 12 through separate balancing holes 311. Each balancing chambers 31 is provided with an energy storage mechanism 3. The energy storage mechanism 3 includes: an energy storage chamber 33, wherein a balancing chambers 31 is provided in the housing 1, and a driving chamber 12 and the balancing chambers 31 communicate with each other; a piston 34, which is slidably arranged between the balancing chambers 31 and the energy storage chamber 33 in a sealing manner; and an energy storage element, which is a compressible gas and/or a spring member 341 located in the energy storage chamber 33 and interacting with the piston 34; each piston 34 is engaged with the inner wall of the respective cylindrical chamber in a sealing manner by means of the sealing edge thereof, and in the sliding direction of the piston 34, at least two circles of sealing portions are formed between the sealing edge and the inner wall of the cylindrical chamber.

In principle, balancing chambers 31 having an increased number can provide a more uniform, fine driving effect on the sealing membrane 2. However, if the number is too great, the processing of the housing 1 will be difficult. Further, within the same size of the housing 1, the side walls between the adjacent balancing chambers 31 will be thinned, thereby causing potential accidents. Therefore, the number of the balancing chambers 31 is preferably 2 to 8. The balancing chambers 31 disposed and spaced from each other uniformly on the outer periphery of the driving chamber 12 have a good appearance, while also providing a relatively stable force on the instrument passage 11 in all directions. In some special applications, the balancing chambers 31 can be provided at non-uniform intervals on the outer periphery of the driving chamber 12 so as to provide a non-uniform driving force to achieve a particular effect. In this embodiment, each of the balancing chambers 31 communicates with the driving chamber 12 through a separate balancing hole 311, which prevents the working processes of the balancing chambers 31 from interfering with each other, thereby providing a finer adjustment effect. In some special applications, the balancing chambers 31 can share the balancing hole 311 to communicate with the driving chamber 12, which facilitates the synchronization of the working processes of the different balancing chambers 31. The specific configuration can be adjusted according to different conditions and the required arrangement. With regard to the configuration of the energy storage mechanism 3, the piston 34 is the main working component, and in this embodiment, the energy storage element is a spring member 341, two ends of which respectively press against the piston 34 and the third end cap 332 to store and release energy. Therefore, the piston 34 needs to ensure a good seal with the cylindrical chamber to avoid leakage of the fluid, which in this embodiment is achieved by the two sealing edges of the piston 34 itself. In order to avoid the resistance caused by an excessively large sealing contact area, a sealing gap is further provided between the sealing edges, which sealing gap allows the deformation of the sealing edges, thereby improving the sealing effect.

In a specific product, in addition to whether the balancing chambers 31 are uniformly disposed on the outer periphery of the driving chamber 12, different arrangements among the different balancing chambers 31 can also result in different effects. For example, in this embodiment, the cylindrical chambers have the same diameter and length, and the elastic coefficients of the spring members 341 are the same, so as to obtain a more balanced fluid driving effect. In other embodiments, the cylindrical chambers can have different diameters and lengths, and the elastic coefficients of the spring members 341 can be different, so that the specific configuration can be adjusted according to different conditions and the required arrangement. Similarly, when the energy storage element uses a compressible gas, the physical and chemical indexes of the compressible gas can be adjusted. For example, parameters such as a preset working pressure and a preset working temperature of the compressible gas can be adjusted accordingly.

The product according to this embodiment can be operated during the assembly in such a manner that: a certain amount of liquid is injected from the first pressure regulating hole 32, so as to move the pistons 34 slightly to the left, keeping the stable state, in which state the pressure in the balancing chambers 31 and the pressure in the energy storage chambers 33 are balanced, and the sealing membrane 2 is pressed by the liquid in the driving chamber 12 to come into close contact therewith, thereby sealing the instrument passage 11.

The gas from the instrument passage 11 entering the human body is exhausted through the exhaust vent 16, and then the product is inserted into the blood vessel, which communicates with the catheter sheath to form an opening for the entry of the instrument, and the blood is occluded in the human body by the sealing membrane 2.

When the product according to this embodiment is subjected to an interventional procedure, the instrument enters the human body from the center of the sealing membrane 2 and is tightly wrapped by the sealing membrane 2, and blood is still occluded in the human body by the sealing membrane 2. As the instrument passes through the passage, the pressure in the driving chamber 12 increases as the volume becomes smaller, so that the pistons 34 are moved to the left by the liquid, the spring members 341 are compressed to store energy, and the internal pressure reaches a new balance, with the sealing effect remained. After the instrument exits, the spring members 341 release energy, pushing the pistons 34 to the right, returning to the initial state. During the entry and exit of the instrument, the sealing membrane 2 is always pressed, with the sealing effect continuously remained.

Referring to FIGS. 25a to 25d, the present application further discloses a hemostasis valve having multi chambers, including a housing 1 and a sealing membrane 2 provided in the housing 1 and having a tubular structure. A lumen 21 of the tubular structure serves as an instrument passage 11. In the radial direction of the instrument passage 11 and in the housing 1, a driving chamber 12 surrounding the outer periphery of the sealing membrane 2 for filling fluid and balancing chambers 31 located outside the driving chamber 12 are provided, wherein the driving chamber 12 and the balancing chambers 31 communicate with each other and the balancing chambers 31 surround the outer periphery of the driving chamber 12.

The hemostasis valve further includes energy storage mechanisms 3 which are linked in motion with the fluid. The fluid in the driving chamber 12 is linked in motion with the energy storage mechanisms 3 through the balancing chambers 31. The energy storage mechanisms 3 store or release energy when the state of the sealing membrane 2 changes, and drive the sealing membrane 2 to close the instrument passage 11 when releasing energy. The number of the balancing chambers 31 is preferably six. In principle, if the size of the product, the assembly, and the like are not taken into account, more balancing chambers 31 are theoretically better. Considering the volume of the driving chamber 12 and the balancing chambers 31, the structural configuration, the spring selection, the mass production, the function and the cost, the number of balancing chambers is preferred 5 to 6.

This embodiment main differs in the number of balancing chambers 31. Six balancing chambers 31 have better instrument compatibility, and the resistance on the instrument when the instrument passes through the instrument passage is smaller than that in the embodiment with fewer balancing chambers 31.

In addition to the various arrangements of the balancing chambers 31, the energy storage element can also be varied and adjusted accordingly. Referring to FIGS. 26a to 26d, the present application further discloses a hemo stasis valve having multi chambers, including a housing 1 and a sealing membrane 2 provided in the housing 1 and having a tubular structure. A lumen 21 of the tubular structure serves as an instrument passage 11. In the radial direction of the instrument passage 11 and in the housing 1, a driving chamber 12 surrounding the outer periphery of the sealing membrane 2 for filling fluid and balancing chambers 31 located outside the driving chamber 12 are provided, wherein the driving chamber 12 and the balancing chambers 31 communicate with each other and the balancing chambers 31 surround the outer periphery of the driving chamber 12.

The hemostasis valve further includes energy storage mechanisms 3 which are linked in motion with the fluid. The fluid in the driving chamber 12 is linked in motion with the energy storage mechanisms 3 through the balancing chambers 31. The energy storage mechanisms 3 store or release energy when the state of the sealing membrane 2 changes, and drive the sealing membrane 2 to close the instrument passage 11 when releasing energy. The energy storage element includes a spring member 341 and a compressible gas.

The housing 1 is a solid body having a plurality of cylindrical chambers, with an instrument passage 11 in the middle. The cylindrical chambers around the instrument passage 11 are provided with a plurality of pistons 34 to form energy storage chambers 33 and balancing chambers 31, wherein the balancing chambers 31 are connected to the driving chamber 12. Each energy storage chamber 33 has a spring therein, and the energy storage chamber 33 has a second pressure regulating hole 331 for injecting gas in this embodiment. The housing 1 is connected to a second end cap 15, with a sealing element arranged therein for sealing, wherein the second end cap 15 is provided with a first pressure regulating hole 32, and the second end cap 15 and the first end cap 14 fix the sealing membrane 2 in the housing 1 in a sealing manner. The exhaust port 16 is in communication with the blood for exhausting the gas in the instrument passage 11.

Compared with the arrangement in which the energy storage element is a single spring member 341, the present embodiment further provides gas as a compressible medium to facilitate the adjustment of the resistance of instruments with different diameters, which improves the flexibility. However, the energy storage chambers 33, the balancing chambers 31 and the components involved have high sealing requirements, and the production is more complex.

In the present embodiment, it can be seen from the figures that the balancing chambers 31 can be communicated with each other by means of the driving chamber 12, i.e. the sealing membrane 2 is formed as one piece, and the driving chamber 12 surrounds the sealing membrane 2 and communicates with the balancing chambers 31. In other embodiment, a plurality of sealing membranes 2 that are not formed as one piece can be provided, which together close the instrument passage 11; in this case, the driving chambers 12 corresponding to the different sealing membranes 2 may not be communicated with each other, and accordingly, the balancing chambers 31 corresponding to the different driving chambers 12 may not be communicated with each other.

Similarly, the energy storage element can be further varied. Referring to FIGS. 27a to 27d, the present application further discloses a hemostasis valve having multi chambers, including a housing 1 and a sealing membrane 2 provided in the housing 1 and having a tubular structure. A lumen 21 of the tubular structure serves as an instrument passage 11. In the radial direction of the instrument passage 11 and in the housing 1, a driving chamber 12 surrounding the outer periphery of the sealing membrane 2 for filling fluid and balancing chambers 31 located outside the driving chamber 12 are provided, wherein the driving chamber 12 and the balancing chambers 31 communicate with each other and the balancing chambers 31 surrounds the outer periphery of the driving chamber 12.

The hemostasis valve further includes energy storage mechanisms 3 which are linked in motion with the fluid. The fluid in the driving chamber 12 is linked in motion with the energy storage mechanisms 3 through the balancing chambers 31. The energy storage mechanisms 3 store or release energy when the state of the sealing membrane 2 changes, and drive the sealing membrane 2 to close the instrument passage 11 when releasing energy. The energy storage element is a compressible gas.

The product according to this embodiment can be operated as follows during the assembly:

First, a predetermined volume of gas is injected from the second pressure regulating hole 331. Further, a certain amount of liquid is injected from the first pressure regulating hole 32, so as to move the pistons 34 slightly to the left, keeping the stable state, in which state the pressure in the energy storage chambers 33 and the pressure in the driving chambers 12 are balanced, and the sealing membrane 2 is pressed by the liquid in the driving chamber 12 to come into close contact therewith, thereby sealing the instrument passage 11.

The product according to this embodiment can be operated in use in such a manner that: the gas from the instrument passage 11 entering the human body is exhausted through the first pressure regulating hole 32, and then the product is inserted into the blood vessel, which communicates with the catheter sheath to form an instrument passage for the entry of the instrument, and the blood is occluded in the human body by the sealing membrane 2. When the product according to this embodiment is subjected to an interventional procedure, the instrument enters the human body from the center of the sealing membrane 2 and is tightly wrapped by the sealing membrane 2, and blood is still occluded in the human body by the sealing membrane 2. As the instrument passes through the passage, the pressure in the driving chamber 12 increases as the volume becomes smaller, so that the pistons 34 are moved to the left by the liquid, the compressible gas is compressed to store energy, and the internal pressure reaches a new balance, with the sealing effect remained. After the instrument exits, the compressible gas releases energy, pushing the pistons 34 to the right, returning to the initial state. During the entry and exit of the instrument, the sealing membrane 2 is always pressed, with the sealing effect continuously remained.

Compared with the arrangement in which the energy storage element includes the spring member 341 and the compressible gas, in this embodiment, only the compressible gas is used as the resilient medium, so that the instruments with different diameters can pass through the passage more smoothly, facilitating the adjustment of the resistance of instruments with different diameters, which improves the flexibility. However, the energy storage chambers, the balancing chambers and the components involved have high sealing requirements, and the production is more complex.

The above several embodiments in which multi-chamber structures are provided referring to the plurality of balancing chambers 31 has the following advantages as compared with the embodiments in which a single balancing chamber is provided:

1. The structure is simple and reliable, and low spring performance for the spring is required, facilitating the mass production;
2. The multi-chamber structure has strong compatibility with different instruments, and the resistance of passing through the passage can be stabilized in a small range, which can be considered that the resistance on the instruments is almost the same; and
3. The optimum number of chambers is calculated according to the volume of the driving chamber 12 and the volume of the balancing chambers 31. The maximum instrument enters into the instrument passage 11 in such a way that the volume of liquid discharged from the driving chamber 12 causes the pistons 34 within the plurality of balancing chambers 31 to move by less than 5 mm, with the smaller movement, the better.

The above third end cap 332 is used to close the energy storage chamber 33. In this embodiment, the arrangement of the plurality of balancing chambers 31 will increase the number of the third end caps 332, resulting in a complex assembly, and causing unnecessary stability hazards. Therefore, the third end caps 332 are replaced by the first end cap 14 in this embodiment.

In the present embodiment, the second end cap 15 is also modified in detail. In order to facilitate the assembly and achieve a compact fit among the components, the second end cap 15 has two parts for engagement with the housing 1 and the sheath, respectively. The first pressure regulating hole 32 and the exhaust vent 16 mentioned above are respectively provided on the two parts.

Viewed from the overall product, the hemostasis valve further includes a pressure regulating structure (not shown) for delivering fluid. Referring to an embodiment, the hemostasis valve further includes a pressure regulating structure provided with a fluid line for providing fluid, wherein the fluid line is directly or indirectly communicated with the balancing chamber(s) or the driving chamber or the balancing hole(s).

The fluid line can be directly communicated with any one or more of the balancing chamber(s), the driving chamber, or the balancing hole(s), or can be indirectly communicated with the balancing chamber(s), the driving chamber, and the balancing hole(s) through the communication among the balancing chamber(s), the driving chamber, and the balancing hole(s). The practical product can have many variants, provided that, in principle, the fluid in the fluid line needs to be able to filling the driving chamber. The fluid in the fluid line is provided by the pressure regulating structure. The pressure regulating mechanism can be in the form of a plunger pump or a peristaltic pump commonly used in clinic. Alternatively, the pressure regulating mechanism can be simplified, reducing the production cost. For example, it can be a delivery cylinder in the form of a needle cylinder commonly used in clinic. Alternatively, it can be a separate delivery device. The specific arrangement can be flexibly selected according to practical requirements.

With regard to the specific connection, reference is made to an embodiment in which a plurality of balancing chambers are arranged and distributed circumferentially outside the driving chamber. Each balancing chamber communicates with the driving chamber through a separate balancing hole. One side of each balancing hole is linked in motion with the driving chamber, and the other side extends radially to the outer peripheral wall of the housing, in which the balancing hole is closed or communicated with the fluid line in the outer peripheral wall. The balancing hole is extended to form a passage which can communicate with the driving chamber and the balancing chamber. The end of the balancing hole extending to the outer peripheral wall of the housing can be closed by a sealing material or opened to communicate with the fluid line for receiving the fluid. The number of the balancing holes with the end closed or opened can be adjusted as needed.

The present invention further discloses a catheter sheath assembly including an axially extending sheath having an axial through-chamber, the sheath having a proximal end and a distal end, and the proximal end of the sheath being connected with the above hemostasis valve.

In one embodiment, the distal end of the sheath is provided with a development ring.

The present invention further discloses a method for sealing interventional instrument with a hemo stasis valve, the hemo stasis valve including a housing and a sealing membrane provided in the housing and having a tubular structure, a lumen of the tubular structure serving as an instrument passage and passing through the housing. In the housing, a driving chamber surrounding the outer periphery of the sealing membrane for filling fluid and an energy storage mechanism linked in motion with the fluid are provided. The sealing method for the interventional instrument includes:
The fluid is injected into the driving chamber. The fluid drives the sealing membrane to close the instrument passage, and also acts on the energy storage mechanism, so that the energy storage mechanism stores energy to maintain the configuration of the sealing membrane;
As the interventional instrument is inserted into the instrument passage, the sealing membrane is pressed and deformed by the interventional instrument and the energy storage mechanism is driven by the fluid to store energy;
When the interventional instrument is withdrawn from the instrument passage, the energy storage mechanism releases energy and the sealing membrane is driven by the fluid to deform, thereby closing the instrument passage.

The hemostasis valve includes:
A housing and a sealing membrane provided in the housing and having a tubular structure;
The sealing membrane has an inner surface and an outer surface, and the inner surface of the sealing membrane forms an instrument passage for insertion of the instrument;
The housing has an inner wall, the inner wall of the housing and the outer surface of the sealing membrane form a driving chamber for filling fluid;
The hemostasis valve further includes an energy storage mechanism which is linked in motion with the fluid;
Driving chamber and/or fluid line connected thereto.
The sealing method of the hemostasis valve includes:
A predetermined amount of fluid is injected into the driving chamber through the fluid line, the fluid in the driving chamber is linked in motion with the energy storage mechanism, the energy storage mechanism stores energy, the sealing membrane is closed, and thus the instrument passage is closed;
The instrument is inserted into the instrument passage, the fluid in the driving chamber is linked in motion with the energy storage mechanism, and the energy storage mechanism further stores energy.

In this embodiment, the energy storage mechanism improves the variety of the hemo stasis valve, instruments with different outer diameters can be allowed to pass through the instrument passage while ensuring the sealing effect, the contradiction between the experience of moving the interventional instrument and the compatibility of the interventional instruments varying in size is avoided, the pressure in the driving chamber can be automatically adjusted, and the passage performance of the instrument is improved.

In one embodiment, the driving chamber is further in communication with a fluid line through which an external fluid source is connected. With regard to the specific configuration of the fluid line, reference is made to an embodiment in which the fluid line is provided with a control valve. The control valve can regulate the flow in the fluid line, and the like. With regard to the specific communication arrangement of the fluid line, reference is made to an embodiment in which the driving chamber is further communicated with a balancing chamber, through which the fluid in the driving chamber is linked in motion with the energy storage mechanism. The fluid line can be communicated with the driving chamber in at least one of the following ways:
Directly communicated with the driving chamber; or
Directly communicated with the balancing chamber; or
Directly communicated with and between the driving chamber and the balancing chamber.

The fluid line needs a fluid source to provide driving force to supply fluid. Referring to one embodiment, the external fluid source is provided by a pressure regulating structure. The pressure regulating structure has various arrangements. In one embodiment, the pressure regulating structure is driven manually, electrically or pneumatically. With regard to the specific selection, the pressure regulating mechanism can be in the form of a plunger pump or a peristaltic pump commonly used in clinic. The specific arrangement can be flexibly selected according to practical requirements. Viewed from the principle of the pressure regulating mechanism, reference is made to an embodiment in which the pressure regulating structure has at least one storage chamber with which the fluid line is in communication.

With regard to the specific arrangement of the balancing chamber and the driving chamber, referring to an embodiment, a cylindrical chamber is formed in the housing, and the energy storage mechanism includes:

A piston slidably disposed in the cylindrical chamber and dividing the cylindrical chamber into a balancing chamber and an energy storage chamber; and An energy storage element in the energy storage chamber, the energy storage element being a gas and/or a spring element interacting with the piston.

With regard to the engagement between the cylindrical chamber and the housing, reference is made to an embodiment in which the housing has an annular shape and has an annular wall within which the cylindrical chamber is located.

The cylindrical chamber has various forms. For example, the cylindrical chamber can be configured as an irregular cylinder the axis of which is in the form of a curve and the cross section of which varies. In order to ensure the smooth operation of the energy storage mechanism and reduce the processing difficulty, the cylindrical chamber is a straight cylindrical structure, and the axis of the straight cylindrical structure and the axis of the housing are parallel to each other. Reference is made to an embodiment in which one or more cylindrical chambers are provided. The number of cylindrical chambers is 2 to 8. The cylindrical chambers are distributed along the circumferential direction of the housing one after another.

The cylindrical structure provides the space for the balancing chamber and the driving chamber. With reference to one embodiment, the instrument passage extends through the housing along the axis of the housing.

Figure 22:
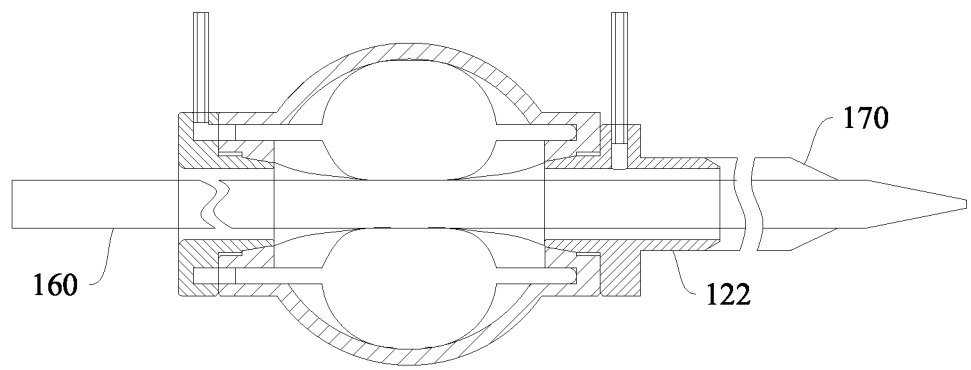
FIG. 22 is a schematic view of an embodiment of a catheter sheath.

The present application further provides a catheter sheath, as shown in FIG. 22, which includes a sheath 170 and a hemo stasis valve which are docked and communicated with each other. The hemostasis valve is the internally balanced hemostasis valve according to the above embodiments. In use, the sheath 170 can be inserted into the human body at the predetermined puncture site, and the hemostasis valve of the present application used can prevent blood from flowing out through the instrument passage in the process of entrance and exit of the interventional instrument 160. In order to allow the engagement of the hemostasis valve with the sheath, a pipe joint 122 can be provided on one of the end caps in the form of one-piece or separately, with the sheath 170 surrounded and fixed on the pipe joint 122.

The hemostasis valves according to the above embodiments can be engaged with the sheath. The present application further discloses a sheath including a tubular wall 204, the tubular wall 204 having a coiled wall structure and a coiled cross section. The tubular wall 204 has an expanded configuration in which a corresponding portion of the coiled wall structure is expanded and a pre-defined configuration in which the coiled wall structure is restored by itself.

In one embodiment, the tubular wall 204 is made of an elastic material capable of automatically switching between the expanded configuration and the pre-defined configuration.

In one embodiment, the outer diameter of the tubular wall 204 in the pre-defined configuration is 4 to 9 mm.

In one embodiment, the tubular wall 204 in the pre-defined configuration is coiled more than one circle, wherein an exceeding portion extending beyond 360 degrees overlaps with a partial portion within 360 degrees.

In one embodiment, the overlapped portions have smooth contact surfaces.

In one embodiment, the tubular wall 204 in the pre-defined configuration is coiled less than 720 degrees.

In an embodiment, the starting end 209 and the terminal end 210 of the coiled wall structure in the circumferential direction are connected by a flexible surrounding film.

In one embodiment, the turning portion of the flexible surrounding film is provided with a crease line.

In one embodiment, the flexible surrounding film has a wall thickness of 0.1 to 1 mm.

In one embodiment, the flexible surrounding film is a circumferentially closed tubular structure having a cross-sectional perimeter greater than the cross-sectional perimeter of the tubular wall 204 that is fixedly attached to the outer wall of the flexible surrounding film.

In one embodiment, the distal periphery of the tubular wall 204 is surrounded with an elastic sleeve 206.

In one embodiment, the distal end of the tubular wall 204 is connected to the sheath handle and the connection is surrounded by the elastic sleeve 206.

In one embodiment, the elastic sleeve 206 has an axial length of 5 to 50 cm.

In one embodiment, the outer side of the tubular wall 204 is surrounded with a constraint sleeve for constrain the tubular wall 204 in the pre-defined configuration, and the constraint sleeve is expanded and torn in the expanded configuration of the tubular wall 204.

In one embodiment, the constraint sleeve extends axially along the tubular wall 204 and beyond the proximal end of the tubular wall 204, where the portion exceeding the proximal end of the tubular wall 204 has a shrunken structure.

In one embodiment, the coiled wall structure has a chamfered structure adjacent the proximal end of the tubular wall 204 at the terminal end 210 in the circumferential direction.

Specifically, referring to FIGS. 28a to 29f, in this embodiment, the tubular wall 204 of the sheath has a coiled wall structure with a coiled cross section. The tubular wall 204 has an expanded configuration in which a corresponding portion of the coiled wall structure is expanded and a pre-defined configuration in which the coiled wall structure is restored.

In the predetermine configuration, the outer diameter of the sheath is 5 mm (15 Fr) and the inner diameter is 4 mm. In the expanded configuration, the inner diameter can be up to 8 mm (24 Fr), and the sheath with the corresponding diameter can be delivered.

Figure 28A:
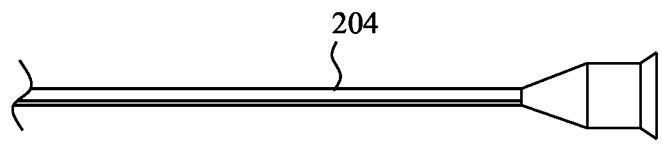
FIGS. 28a to 29f are schematic views of an embodiment of a sheath.
Figure 28B:
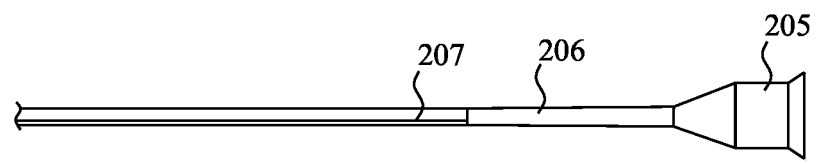
Figure 28C:
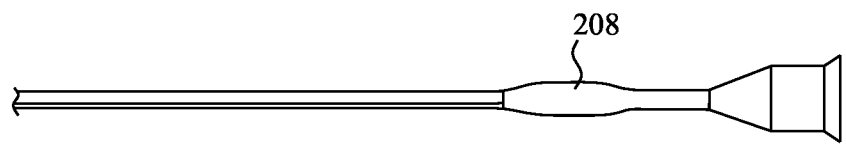
Figure 28D:
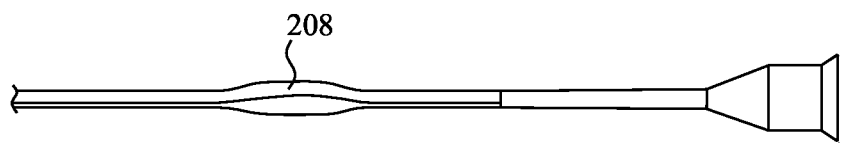
Figure 28E:
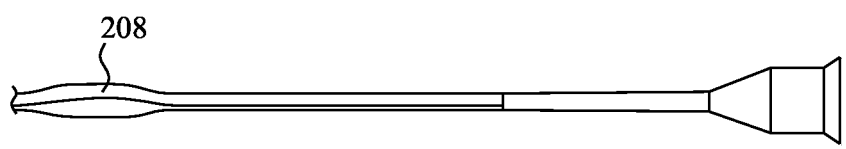
Figure 28F:
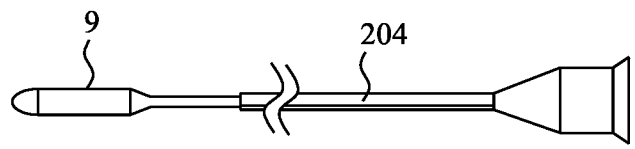

Referring to FIG. 28b, the distal end of the sheath is fitted with a joint 205 for engagement with a delivery device, and the connection between the sheath and the joint 205 is surrounded by an elastic sheath 206, which prevents blood (or body fluid) from escaping from the gap between the overlapping portions of the tubular wall. The elastic sleeve is made of elastic nylon with a thickness of 0.1 to 0.2 mm.

In the circumferential direction, the coiled wall structure extends helically from the starting end to the terminal end. The terminal end edge can extend axially along the sheath or helically around the sheath axis. FIG. 28b shows that the terminal end edge 207 is straight and extends along the axial direction of the sheath. In the case where the helical configuration is used, the force on the bent sheath is more uniform.

Referring to FIGS. 28c-28f, when the interventional instrument passes from right to left, the inner side of the tubular wall is pressed by the interventional instrument, so that the coiled wall structure of the tubular wall is expanded, and the pressed portion 208 is transferred into the expanded configuration.

After the interventional instrument 9 exits, the tubular wall 204 recovers itself due to its own elasticity and returns to the initial pre-defined configuration.

In this embodiment, the material of the tubular wall is HDPE or Pebax, etc. In order to ensure that the tubular wall can recover automatically and maintain certain strength and compliance, the thickness of the tubular wall is 0.5 mm.

Figure 29A:
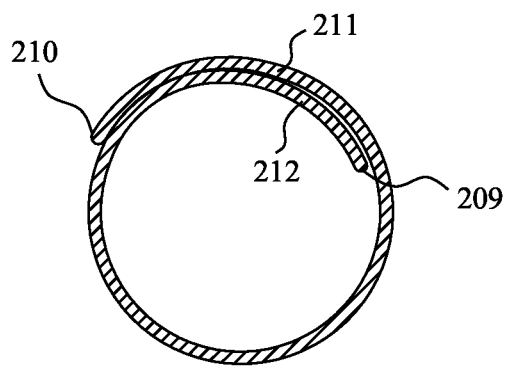

FIG. 29a is a schematic cross-sectional view of the sheath in the pre-defined configuration (initial state) without instrument implanted. In order to wrap and form a passage for the delivery sheath, the wall in the pre-defined configuration is coiled more than 360 degrees. That is, the wall extends more than 360 degrees in the circumferential direction from the starting end 209 to the terminal end 210, wherein an exceeding portion extending beyond 360 degrees overlaps with a partial portion within 360 degrees.

As can be seen in FIG. 29a, the exceeding portion 211 overlaps with the non-exceeding portion 212, and the exceeding portion 211 covers the outer periphery of the non-exceeding portion 212, as a result, a circumferentially enclosed passage is formed in the interior of the tubular wall.

Figure 29B:
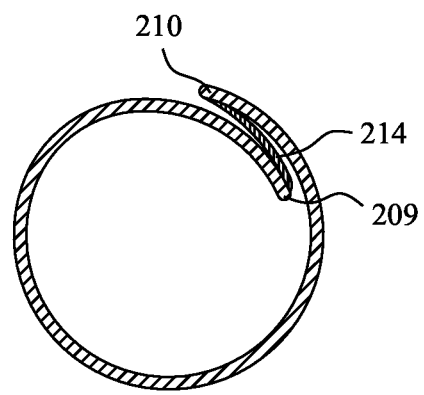
Figure 29C:
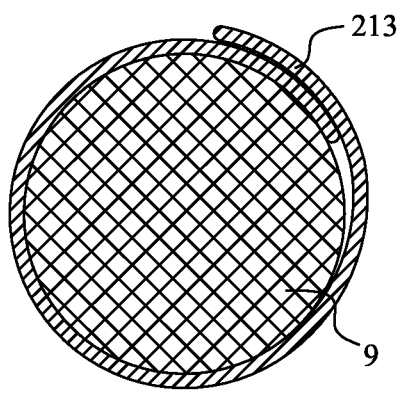

FIG. 29c is a schematic cross-sectional view of the expanded sheath with the interventional instrument 9 implanted. In order to prevent the implanted instrument from being exposed in the expanded configuration, as shown in FIG. 29c, the tubular wall in the expanded configuration is coiled more than or equal to 360 degrees, i.e., there is still an overlapping region 213.

Figure 29D:
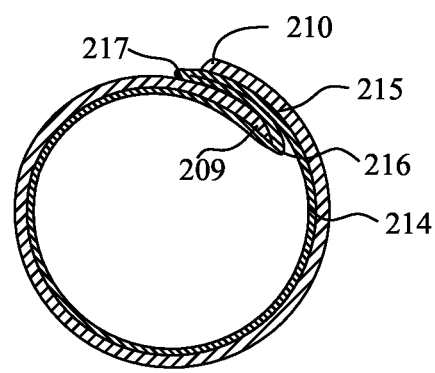
Figure 29E:
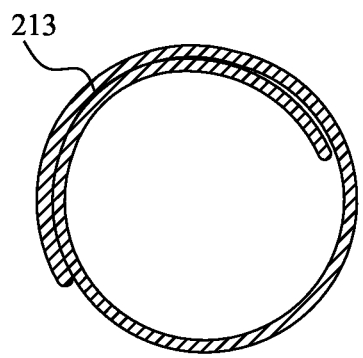

In FIG. 29e, the overlapping region 213 is enlarged, and the coiled degree of tubular wall, i.e., the corresponding central angle, is further increased to 540 degrees, resulting in a larger inner diameter after being expanded, allowing passage of a thicker interventional instrument 9.

As shown in FIG. 29a, although the exceeding portion 211 and the non-exceeding portion 212 overlap with each other, but are not fixed with each other, which are movable relative to each other so as to form a gap, through which blood or body fluid can enter and exit the tubular wall. In order to provide a closed passage for the interventional instrument, the present invention provides another embodiment in which a flexible surrounding film is provided extending from the starting end to the terminal end of the tubular wall for closing the tubular wall.

In FIG. 29b, the starting end 209 and the terminal end 210 of the coiled tubular wall are connected by a flexible surrounding film 214. The flexible surrounding film mainly provides a radial support force, constraining the implanted instrument and thus preventing the implanted instrument to be exposed, while also preventing blood or body fluids from flowing out of the tubular wall.

As the flexible surrounding film 214 will be folded or twisted when the tubular wall switches its state, the flexible surrounding film 214 has a smaller wall thickness and a lower stiffness than the tubular wall. In this embodiment, the flexible surrounding film 214 is made of PTFE and has a wall thickness of 0.25 to 0.5 mm.

Regardless of the state of the tubular wall, the flexible surrounding film 214 can keep the sheath closed, and the flexible surrounding film 214 can be fixed to the tubular wall by welding or the like.

To receive the flexible surrounding film 214, the flexible surrounding film 214 is sandwiched between the overlapping portions of the tubular wall. The flexible surrounding film 214 can extend in the circumferential direction for a section, i.e., it does not surround the lumen of the tubular wall by 360 degrees. In the pre-defined configuration, the flexible surrounding film 214 is stretched between the starting end 209 and the terminal end 210 of the coiled tubular wall. The flexible surrounding film 214 functions to close the gap formed between the starting end 209 and the terminal end 210, preventing blood or body fluid from flowing into and out of the tubular wall. Therefore, the fixing points of the flexible surrounding film 214 with the tubular wall are not strictly limited at the starting end 209 and the terminal end 210, and can be adjusted appropriately.

In FIG. 29d, shown another embodiment, the flexible surrounding film 214 has a circumferentially closed tubular structure. The tubular wall is fixedly attached to the outer wall of the flexible surrounding film 214. A portion of the flexible surrounding film 214 is a folded portion 215 which is located between the starting end 209 and the terminal end 210 of the tubular wall.

The turning portion 216 and 217 of the folded portion 215 are respectively provided with a crease line, and the crease line can be processed by means of thermoforming, and thus, the turning portions in the pre-defined configuration can be flatter.

Figure 29F:
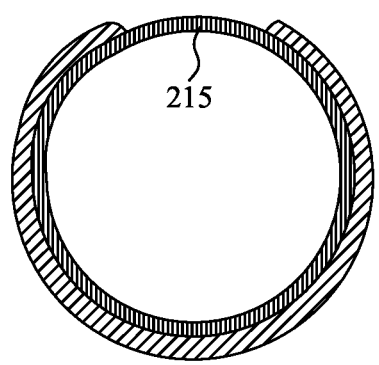

Referring to FIG. 29f, the folded portion 215 is expanded in the expanded configuration of the tubular wall, so that the tubular wall has a larger range of deformation.

The features described in the above various embodiments can be combined. In order to simplify the descriptions, not all possible combinations of the features in the above embodiments have been described. However, any combinations of the features should be within the scope of the invention as long as no conflict resides among these features. In the case where the features in different embodiments are shown in the same drawing, it may be considered that this drawing discloses a combination of the various embodiments involved.

The above embodiments are only several implementations of the present invention which are described specifically and in detail, without limitation to the scope claimed by the present invention. Those skilled in the art can make various modifications and variations to the embodiments without departing from the spirit and scope of the present invention, and these modifications and variations should fall into the scope claimed by the present invention.

What is claimed is:

1. A hemostasis valve, comprising a housing and a sealing membrane disposed in the housing and having a tubular structure, a lumen of the tubular structure configured as an instrument passage, the housing being provided with a driving chamber at an outer periphery of the sealing membrane for filling fluid; the hemostasis valve further comprising an energy storage mechanism linked in motion with the fluid, the energy storage mechanism configured for storing or releasing energy when state of the sealing membrane is changed and driving the sealing membrane to close the instrument passage when releasing energy;
wherein the housing is further provided with a balancing chamber, and the driving chamber and the balancing chamber communicate with each other, and wherein the fluid in the driving chamber is linked in motion with the energy storage mechanism via the balancing chamber; and
wherein the driving chamber has an outer periphery, a plurality of balancing chambers are provided at intervals on the outer periphery of the driving chamber, and the energy storage mechanism is provided for each balancing chamber.

2. The hemostasis valve according to claim 1, wherein the sealing membrane has a first state of being pressed by an interventional instrument to open the instrument passage, in which state the energy storage mechanism is driven by the fluid to store energy; and the sealing membrane has a second state of being driven by the fluid to close the instrument passage, in which state the energy storage mechanism releases energy to maintain a fluid pressure that keeps the sealing membrane in the second state.

3. The hemostasis valve according to claim 2, wherein the driving chamber has an outer periphery, and the housing has a rigid structure at least at the outer periphery of the driving chamber.

4. The hemostasis valve according to claim 1, wherein a through-region is opened in the housing, and the sealing membrane is arranged in the through-region, and wherein the driving chamber is defined between the outer periphery of the sealing membrane and an inner wall of the through-region; and wherein a first end cap and a second end cap are respectively arranged at two open ends of the through section in a sealing manner, and each end cap is provided with an avoidance hole corresponding to the instrument passage.

5. The hemostasis valve according to claim 4, wherein one end of the instrument passage is configured as an entrance for instrument and the other end is configured as an exit for instrument, and the end cap on the exit for instrument is provided with a radially break-through exhaust vent.

6. The hemostasis valve according to claim 1, wherein the instrument passage has a radial direction, the balancing chamber is located outside the driving chamber in the radial direction of the instrument passage.

7. The hemostasis valve according to claim 1, wherein the driving chamber and the balancing chamber are isolated from each other and communicated with each other only through a balancing hole.

8. The hemostasis valve according to claim 1, wherein the balancing chamber has a chamber wall and the driving chamber has a chamber wall, and the chamber wall of the balancing chamber or the driving chamber is provided with a first pressure regulating hole.

9. The hemostasis valve according to claim 1, wherein the number of the balancing chambers is 2 to 8, and the balancing chambers are arranged at uniform or non-uniform intervals on the outer periphery of the driving chamber.

10. The hemostasis valve according to claim 1, wherein the balancing chambers communicate with the driving chamber through separate balancing holes; at least two of the balancing chambers communicate with the driving chamber through a common balancing hole; or the balancing chambers communicate with the driving chamber through the same balancing hole.

11. The hemostasis valve according to claim 1, wherein the energy storage mechanism comprises: an energy storage chamber; a piston slidably arranged between the balancing chamber and the energy storage chamber in a sealing manner; and an energy storage element, the energy storage element being at least one of a compressible gas and a spring member located in the energy storage chamber and interacting with the piston; and wherein the housing is provided with at least two cylindrical chambers for the piston sliding, and the cylindrical chambers are divided into the balancing chamber and the energy storage chamber by the piston.

12. The hemostasis valve according to claim 11, wherein the cylindrical chambers have respective inner walls and the piston has an outer periphery, the piston is engaged with the inner wall of the respective cylindrical chamber in a sealing manner by a sealing edge at the outer periphery of the piston, and in a sliding direction of the piston, at least two circles of sealing portions are provided between the sealing edge and the inner wall of the cylindrical chamber.

\* \* \* \* \*